US012470885B2

(12) United States Patent
Southwell et al.

(10) Patent No.: US 12,470,885 B2
(45) **Date of Patent: *Nov. 11, 2025**

(54) ORCHESTRATION OF ACOUSTIC DIRECT SEQUENCE SPREAD SPECTRUM SIGNALS FOR ESTIMATION OF ACOUSTIC SCENE METRICS

(71) Applicant: Dolby Laboratories Licensing Corporation, San Francisco, CA (US)

(72) Inventors: Benjamin John Southwell, Gledswood Hills (AU); David Gunawan, Sydney (AU); Mark R.P. Thomas, Walnut Creek, CA (US); Christopher Graham Hines, Sydney (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 202 days.

This patent is subject to a terminal disclaimer.

(21) Appl. No.: 18/255,499

(22) PCT Filed: Dec. 2, 2021

(86) PCT No.: PCT/US2021/061614

§ 371 (c)(1),
(2) Date: Jun. 1, 2023

(87) PCT Pub. No.: WO2022/120051

PCT Pub. Date: Jun. 9, 2022

(65) Prior Publication Data

US 2024/0048931 A1 Feb. 8, 2024

Related U.S. Application Data

(60) Provisional application No. 63/260,953, filed on Sep. 7, 2021, provisional application No. 63/201,561, filed
(Continued)

(51) Int. Cl.
*H04S 7/00* (2006.01)
*H04R 5/02* (2006.01)
*H04R 5/04* (2006.01)

(52) U.S. Cl.
CPC ............... *H04S 7/301* (2013.01); *H04R 5/02* (2013.01); *H04R 5/04* (2013.01); *H04S 7/307* (2013.01); *H04S 2400/15* (2013.01)

(58) Field of Classification Search
CPC ...... H04S 7/301; H04S 7/307; H04S 2400/15; H04R 5/02; H04R 5/04
See application file for complete search history.

(56) References Cited

U.S. PATENT DOCUMENTS 6,301,287 B1 10/2001 Walley
8,503,362 B2 8/2013 Wee
(Continued)

FOREIGN PATENT DOCUMENTS

CN 112866863 A 5/2021
EP 2899997 A1 7/2015
(Continued)

OTHER PUBLICATIONS

Getreuer, Pascal, et al.; "Ultrasonic Communication Using Consumer Hardware"; IEEE Transactions on Multimedia; vol. 20, No. 6; Jun. 1, 2018; pp. 1277-1290, 14 Pages.
(Continued)

*Primary Examiner* — Andrew Sniezek

(57) ABSTRACT

Some methods may involve receiving a first content stream that includes first audio signals, rendering the first audio signals to produce first audio playback signals, generating first direct sequence spread spectrum (DSSS) signals, generating first modified audio playback signals by inserting the first DSSS signals into the first audio playback signals, and causing a loudspeaker system to play back the first modified
(Continued)

audio playback signals, to generate first audio device playback sound. The method(s) may involve receiving microphone signals corresponding to at least the first audio device playback sound and to second through $N^{th}$ audio device playback sound corresponding to second through $N^{th}$ modified audio playback signals (including second through Nth DSSS signals) played back by second through Nth audio devices, extracting second through $N^{th}$ DSSS signals from the microphone signals and estimating at least one acoustic scene metric based, at least partly, on the second through $N^{th}$ DSSS signals.

21 Claims, 25 Drawing Sheets

Related U.S. Application Data on May 4, 2021, provisional application No. 63/121,085, filed on Dec. 3, 2020, provisional application No. 63/120,887, filed on Dec. 3, 2020.

(56) References Cited

U.S. PATENT DOCUMENTS

| | | | | |
|---|---|---|---|---|
| 9,270,807 | B2 | 2/2016 | Shivappa | |
| 9,451,361 | B2 | 9/2016 | Bar Bracha | |
| 9,552,840 | B2 | 1/2017 | Kim | |
| 9,807,534 | B2 | 10/2017 | Schneider | |
| 10,003,900 | B2 | 6/2018 | Cartwright | |
| 10,490,205 | B1 | 11/2019 | Iyengar | |
| 12,273,698 | B2 * | 4/2025 | Southwell | G01S 15/42 |
| 2005/0123143 | A1 | 6/2005 | Platzer | |
| 2014/0358532 | A1 | 12/2014 | Lin | |
| 2015/0341973 | A1 | 11/2015 | El-Hoiydi | |
| 2020/0234719 | A1 | 7/2020 | Filler | |

FOREIGN PATENT DOCUMENTS

| | | | |
|---|---|---|---|
| KR | 100656550 | B1 | 12/2006 |
| WO | 02/03754 | A1 | 1/2002 |
| WO | 2021127286 | A1 | 6/2021 |

OTHER PUBLICATIONS

Leng, Mei et al.; “Modified CRLB for Cooperative Geolocation of Two Devices Using Signals of Opportunity”; IEEE Transactions on Wireless Communications, IEEE Service Center, Piscatway, NJ, US, vol. 13, No. 7; Jul. 1, 2014; pp. 3636-3649, 14 Pages.

Pursley, M. B. et al.; “High-rate direct-sequence spread spectrum”; 2003 IEEE Military Communications Conference, Milcom 2003. Boston, MA, Oct. 13-16, 2003, vol. 2; , New York, NY, IEEE, US, pp. 1101-1106, 6 Pages.

* cited by examiner

ORCHESTRATION OF ACOUSTIC DIRECT SEQUENCE SPREAD SPECTRUM SIGNALS FOR ESTIMATION OF ACOUSTIC SCENE METRICS

This application is a U.S. National Stage of International Application No. PCT/US2021/061614, filed Dec. 2, 2021, which claims the benefit of priority to U.S. Provisional Patent Application No. 63/121,085 filed 3 Dec. 2020; U.S. Provisional Patent Application No. 63/260,953 filed 7 Sep. 2021; U.S. Provisional Patent Application No. 63/120,887 filed 3 Dec. 2020; and U.S. Provisional Patent Application No. 63/201,561 filed 4 May 2021, the contents of which are hereby incorporated by reference.

TECHNICAL FIELD

This disclosure pertains to audio processing systems and methods.

BACKGROUND

Audio devices and systems are widely deployed. Although existing systems and methods for estimating acoustic scene metrics (e.g., audio device audibility) are known, improved systems and methods would be desirable.

NOTATION AND NOMENCLATURE

Throughout this disclosure, including in the claims, the terms "speaker," "loudspeaker" and "audio reproduction transducer" are used synonymously to denote any sound-emitting transducer (or set of transducers). A typical set of headphones includes two speakers. A speaker may be implemented to include multiple transducers (e.g., a woofer and a tweeter), which may be driven by a single, common speaker feed or by multiple speaker feeds. In some examples, the speaker feed(s) may undergo different processing in different circuitry branches coupled to the different transducers.

Throughout this disclosure, including in the claims, the expression performing an operation "on" a signal or data (e.g., filtering, scaling, transforming, or applying gain to, the signal or data) is used in a broad sense to denote performing the operation directly on the signal or data, or on a processed version of the signal or data (e.g., on a version of the signal that has undergone preliminary filtering or pre-processing prior to performance of the operation thereon).

Throughout this disclosure including in the claims, the expression "system" is used in a broad sense to denote a device, system, or subsystem. For example, a subsystem that implements a decoder may be referred to as a decoder system, and a system including such a subsystem (e.g., a system that generates X output signals in response to multiple inputs, in which the subsystem generates M of the inputs and the other X-M inputs are received from an external source) may also be referred to as a decoder system.

Throughout this disclosure including in the claims, the term "processor" is used in a broad sense to denote a system or device programmable or otherwise configurable (e.g., with software or firmware) to perform operations on data (e.g., audio, or video or other image data). Examples of processors include a field-programmable gate array (or other configurable integrated circuit or chip set), a digital signal processor programmed and/or otherwise configured to perform pipelined processing on audio or other sound data, a programmable general purpose processor or computer, and a programmable microprocessor chip or chip set.

Throughout this disclosure including in the claims, the term "couples" or "coupled" is used to mean either a direct or indirect connection. Thus, if a first device couples to a second device, that connection may be through a direct connection, or through an indirect connection via other devices and connections.

As used herein, a "smart device" is an electronic device, generally configured for communication with one or more other devices (or networks) via various wireless protocols such as Bluetooth, Zigbee, near-field communication, Wi-Fi, light fidelity (Li-Fi), 3G, 4G, 5G, etc., that can operate to some extent interactively and/or autonomously. Several notable types of smart devices are smartphones, smart cars, smart thermostats, smart doorbells, smart locks, smart refrigerators, phablets and tablets, smartwatches, smart bands, smart key chains and smart audio devices. The term "smart device" may also refer to a device that exhibits some properties of ubiquitous computing, such as artificial intelligence.

Herein, we use the expression "smart audio device" to denote a smart device which is either a single-purpose audio device or a multi-purpose audio device (e.g., an audio device that implements at least some aspects of virtual assistant functionality). A single-purpose audio device is a device (e.g., a television (TV)) including or coupled to at least one microphone (and optionally also including or coupled to at least one speaker and/or at least one camera), and which is designed largely or primarily to achieve a single purpose. For example, although a TV typically can play (and is thought of as being capable of playing) audio from program material, in most instances a modern TV runs some operating system on which applications run locally, including the application of watching television. In this sense, a single-purpose audio device having speaker(s) and microphone(s) is often configured to run a local application and/or service to use the speaker(s) and microphone(s) directly. Some single-purpose audio devices may be configured to group together to achieve playing of audio over a zone or user configured area.

One common type of multi-purpose audio device is an audio device that implements at least some aspects of virtual assistant functionality, although other aspects of virtual assistant functionality may be implemented by one or more other devices, such as one or more servers with which the multi-purpose audio device is configured for communication. Such a multi-purpose audio device may be referred to herein as a "virtual assistant." A virtual assistant is a device (e.g., a smart speaker or voice assistant integrated device) including or coupled to at least one microphone (and optionally also including or coupled to at least one speaker and/or at least one camera). In some examples, a virtual assistant may provide an ability to utilize multiple devices (distinct from the virtual assistant) for applications that are in a sense cloud-enabled or otherwise not completely implemented in or on the virtual assistant itself. In other words, at least some aspects of virtual assistant functionality, e.g., speech recognition functionality, may be implemented (at least in part) by one or more servers or other devices with which a virtual assistant may communication via a network, such as the Internet. Virtual assistants may sometimes work together, e.g., in a discrete and conditionally defined way. For example, two or more virtual assistants may work together in the sense that one of them, e.g., the one which is most confident that it has heard a wakeword, responds to the wakeword. The connected virtual assistants may, in some implementations, form a sort of constellation, which may be managed by one main application which may be (or implement) a virtual assistant.

Herein, "wakeword" is used in a broad sense to denote any sound (e.g., a word uttered by a human, or some other sound), where a smart audio device is configured to awake in response to detection of ("hearing") the sound (using at least one microphone included in or coupled to the smart audio device, or at least one other microphone). In this context, to "awake" denotes that the device enters a state in which it awaits (in other words, is listening for) a sound command In some instances, what may be referred to herein as a "wakeword" may include more than one word, e.g., a phrase.

Herein, the expression "wakeword detector" denotes a device configured (or software that includes instructions for configuring a device) to search continuously for alignment between real-time sound (e.g., speech) features and a trained model. Typically, a wakeword event is triggered whenever it is determined by a wakeword detector that the probability that a wakeword has been detected exceeds a predefined threshold. For example, the threshold may be a predetermined threshold which is tuned to give a reasonable compromise between rates of false acceptance and false rejection. Following a wakeword event, a device might enter a state (which may be referred to as an "awakened" state or a state of "attentiveness") in which it listens for a command and passes on a received command to a larger, more computationally-intensive recognizer.

As used herein, the terms "program stream" and "content stream" refer to a collection of one or more audio signals, and in some instances video signals, at least portions of which are meant to be heard together. Examples include a selection of music, a movie soundtrack, a movie, a television program, the audio portion of a television program, a podcast, a live voice call, a synthesized voice response from a smart assistant, etc. In some instances, the content stream may include multiple versions of at least a portion of the audio signals, e.g., the same dialogue in more than one language. In such instances, only one version of the audio data or portion thereof (e.g., a version corresponding to a single language) is intended to be reproduced at one time.

SUMMARY

At least some aspects of the present disclosure may be implemented via one or more audio processing methods. In some instances, the method(s) may be implemented, at least in part, by a control system and/or via instructions (e.g., software) stored on one or more non-transitory media. Some methods involve causing, by a control system, a first audio device of an audio environment to generate first direct sequence spread spectrum (DSSS) signals. According to some implementations, the control system may be, or may include, an orchestrating device control system. Some such methods involve causing, by the control system, the first DSSS signals to be inserted into first audio playback signals corresponding to a first content stream, to generate first modified audio playback signals for the first audio device. Some such methods involve causing, by the control system, the first audio device to play back the first modified audio playback signals, to generate first audio device playback sound.

Some such methods involve causing, by the control system, a second audio device of the audio environment to generate second DSSS signals. Some such methods involve causing, by the control system, the second DSSS signals to be inserted into a second content stream to generate second modified audio playback signals for the second audio device. Some such methods involve causing, by the control system, the second audio device to play back the second modified audio playback signals, to generate second audio device playback sound. Some methods may involve causing each of a plurality of audio devices in the audio environment to simultaneously play back modified audio playback signals.

Some such methods involve causing, by the control system, at least one microphone of the audio environment to detect at least the first audio device playback sound and the second audio device playback sound, and to generate microphone signals corresponding to at least the first audio device playback sound and the second audio device playback sound. Some such methods involve causing, by the control system, the first DSSS signals and the second DSSS signals to be extracted from the microphone signals. Some such methods involve causing, by the control system, at least one acoustic scene metric to be estimated based, at least in part, on the first DSSS signals and the second DSSS signals. Some methods may involve controlling one or more aspects of audio device playback based, at least in part, on the at least one acoustic scene metric.

In some examples, the at least one acoustic scene metric may include one or more of a time of flight, a time of arrival, a range, an audio device audibility, an audio device impulse response, an angle between audio devices, an audio device location, audio environment noise or a signal-to-noise ratio. According to some examples, causing the at least one acoustic scene metric to be estimated may involve estimating the at least one acoustic scene metric. Alternatively, or additionally, causing the at least one acoustic scene metric to be estimated may involve causing another device to estimate the at least one acoustic scene metric.

In some examples, a first content stream component of the first audio device playback sound may cause perceptual masking of a first DSSS signal component of the first audio device playback sound. In some examples, a second content stream component of the second audio device playback sound may cause perceptual masking of a second DSSS signal component of the second audio device playback sound.

Some methods may involve causing, by a control system, three or more audio devices of the audio environment to generate three or more direct sequence spread spectrum (DSSS) signals. Some such methods may involve causing, by the control system, the three or more DSSS signals to be inserted into three or more content streams, to generate three or more modified audio playback signals for the three or more audio devices. Some such methods may involve causing, by the control system, the three or more audio devices to play back a corresponding instance of the three or more modified audio playback signals, to generate three or more instances of audio device playback sound.

Some such methods may involve causing, by a control system, third through $N^{th}$ audio devices of the audio environment to generate third through $N^{th}$ direct sequence spread spectrum (DSSS) signals. Some such methods may involve causing, by the control system, the third through $N^{th}$ DSSS signals to be inserted into third through $N^{th}$ content streams, to generate third through $N^{th}$ modified audio playback signals for the third through $N^{th}$ audio devices. Some such methods may involve causing, by the control system, the third through $N^{th}$ audio devices to play back a corresponding instance of the third through $N^{th}$ modified audio playback signals, to generate third through $N^{th}$ instances of audio device playback sound.

Some methods may involve causing, by the control system, at least one microphone of each of the first through $N^{th}$ audio devices to detect first through $N^{th}$ instances of audio device playback sound and to generate microphone signals corresponding to the first through $N^{th}$ instances of audio device playback sound. In some examples, the first through $N^{th}$ instances of audio device playback sound may include the first audio device playback sound, the second audio device playback sound and at least a third instance (in some examples, third through $N^{th}$ instances) of audio device playback sound.

Some such methods may involve causing, by the control system, the first through $N^{th}$ DSSS signals to be extracted from the microphone signals. In some examples, the at least one acoustic scene metric may be estimated based, at least in part, on first through $N^{th}$ DSSS signals.

Some methods may involve determining one or more DSSS parameters for a plurality of audio devices in the audio environment. In some examples, the one or more DSSS parameters may be useable for generation of DSSS signals. Some such methods may involve providing the one or more DSSS parameters to each audio device of the plurality of audio devices.

In some examples, determining the one or more DSSS parameters may involve scheduling a time slot for each audio device of the plurality of audio devices to play back modified audio playback signals. In some such examples, a first time slot for a first audio device may be different from a second time slot for a second audio device.

According to some examples, determining the one or more DSSS parameters may involve determining a frequency band for each audio device of the plurality of audio devices to play back modified audio playback signals. In some such examples, a first frequency band for a first audio device may be different from a second frequency band for a second audio device.

In some examples, determining the one or more DSSS parameters may involve determining a spreading code for each audio device of the plurality of audio devices. According to some such examples, a first spreading code for a first audio device may be different from a second spreading code for a second audio device.

Some methods may involve determining at least one spreading code length that is based, at least in part, on an audibility of a corresponding audio device. In some examples, determining the one or more DSSS parameters may involve applying an acoustic model that is based, at least in part, on mutual audibility of each of a plurality of audio devices in the audio environment.

According to some examples, determining the one or more DSSS parameters may involve determining a current playback objective. Some such methods may involve applying an acoustic model that is based, at least in part, mutual audibility of each of a plurality of audio devices in the audio environment, to determine an estimated performance of DSSS signals in the audio environment. Some such methods may involve applying a perceptual model based on human sound perception, to determine a perceptual impact of DSSS signals in the audio environment. Some such methods may involve determining the one or more DSSS parameters based, at least in part, on one or more of the current playback objectives, the estimated performance and the perceptual impact.

In some examples, determining the one or more DSSS parameters may involve detecting a DSSS parameter change trigger. Some such methods may involve determining one or more new DSSS parameters corresponding to the DSSS parameter change trigger. Some such methods may involve providing the one or more new DSSS parameters to one or more audio devices of the audio environment.

According to some examples, detecting the DSSS parameter change trigger may involve detecting one or more of a new audio device in the audio environment, a change of an audio device location, a change of an audio device orientation, a change of an audio device setting, a change in a location of a person in the audio environment, a change in a type of audio content being reproduced in the audio environment, a change in background noise in the audio environment, an audio environment configuration change, including but not limited to a changed configuration of a door or window of the audio environment, a clock skew between two or more audio devices of the audio environment, a clock bias between two or more audio devices of the audio environment, a change in the mutual audibility between two or more audio devices of the audio environment, or a change in a playback objective.

Some methods may involve processing received microphone signals to produce preprocessed microphone signals. In some such examples, DSSS signals may be extracted from the preprocessed microphone signals. Processing the received microphone signals may, for example, involve one or more of beamforming, applying a bandpass filter or echo cancellation.

According to some examples, causing at least the first DSSS signals and the second DSSS signals to be extracted from the microphone signals may involve applying a matched filter to the microphone signals or to a preprocessed version of the microphone signals, to produce delay waveforms. In some examples, the delay waveforms may include at least a first delay waveform based on the first DSSS signals and a second delay waveform based on the second DSSS signals. Some methods may involve applying a low-pass filter to the delay waveforms. According to some examples, applying the matched filter may be part of a demodulation process. In some examples, an output of the demodulation process may be a demodulated coherent baseband signal.

Some methods may involve estimating a bulk delay and providing a bulk delay estimation to the demodulation process. Some methods may involve performing baseband processing on the demodulated coherent baseband signal. In some examples, the baseband processing may output at least one estimated acoustic scene metric.

According to some examples, the baseband processing may involve producing an incoherently integrated delay waveform based on demodulated coherent baseband signals received during an incoherent integration period. In some examples, producing the incoherently integrated delay waveform may involve squaring the demodulated coherent baseband signals received during the incoherent integration period, to produce squared demodulated baseband signals. Some such examples may involve integrating the squared demodulated baseband signals. In some examples, the baseband processing may involve applying one or more of a leading edge estimating process, a steered response power estimating process or a signal-to-noise estimating process to the incoherently integrated delay waveform.

Some methods may involve estimating a bulk delay. Some such examples may involve providing a bulk delay estimation to the baseband processing.

Some methods may involve estimating at least a first noise power level at a first audio device location and estimating a second noise power level at a second audio device location. In some examples, estimating the first noise power level may be based on the first delay waveform and estimating the second noise power level may be based on the second delay waveform. Some such examples may involve producing a distributed noise estimate for the audio environment based, at least in part, on an estimated first noise power level and an estimated second noise power level.

Some methods may involve performing an asynchronous two-way ranging process for cancellation of an unknown clock bias between two asynchronous audio devices. In some examples, the asynchronous two-way ranging process may be based on DSSS signals transmitted by each of the two asynchronous audio devices. Some such examples may involve performing the asynchronous two-way ranging process between each of a plurality of audio device pairs of the audio environment.

Some methods may involve performing a clock bias estimation process for determining an estimated clock bias between two asynchronous audio devices. In some examples, the clock bias estimation process may be based on DSSS signals transmitted by each of the two asynchronous audio devices. Some such examples may involve compensating for the estimated clock bias.

Some methods may involve performing the clock bias estimation process between each of a plurality of audio devices of the audio environment, to produce a plurality of estimated clock biases. Some such examples may involve compensating for each estimated clock bias of the plurality of estimated clock biases.

Some methods may involve performing a clock skew estimation process for determining an estimated clock skew between two asynchronous audio devices. In some examples, the clock skew estimation process may be based on DSSS signals transmitted by each of the two asynchronous audio devices. Some such examples may involve compensating for the estimated clock skew. Some methods may involve performing the clock skew estimation process between each of a plurality of audio devices of the audio environment, to produce a plurality of estimated clock skews. Some such examples may involve compensating for each estimated clock skew of the plurality of estimated clock skews.

Some methods may involve detecting a DSSS signal transmitted by an audio device. In some examples, the DSSS signal may correspond with a first spreading code. Some such examples may involve providing the audio device with a second spreading code. In some examples, the first spreading code may be, or may include, a first pseudo-random number sequence that is reserved for newly-activated audio devices.

In some examples, at least a portion of the first audio playback signals, at least a portion of the second audio playback signals, or at least portions of each of the first audio playback signals and the second audio playback signals, correspond to silence.

At least some aspects of the present disclosure may be implemented via apparatus. For example, one or more devices may be capable of performing, at least in part, the methods disclosed herein. In some implementations, an apparatus is, or includes, an audio processing system having an interface system and a control system. The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof.

According to some implementations, the apparatus also may include a loudspeaker system comprising at least one loudspeaker. In some implementations, the apparatus also may include a microphone system comprising at least one microphone.

In some implementations, the control system may be configured to receive a first content stream. The first content stream may include first audio signals. In some such examples, the control system may be configured to render the first audio signals to produce first audio playback signals. In some such implementations, the control system may be configured to generate first direct sequence spread spectrum (DSSS) signals. In some such examples, the control system may be configured to insert the first DSSS signals into the first audio playback signals, to generate first modified audio playback signals. In some examples, inserting the first DSSS signals into the first audio playback signals may involve mixing the first DSSS signals and the first audio playback signals. In some such implementations, the control system may be configured to cause the loudspeaker system to play back the first modified audio playback signals, to generate first audio device playback sound.

According to some examples, the control system may include a DSSS signal generator configured to generate DSSS signals. In some examples, the control system may include a DSSS signal modulator configured to modulate DSSS signals generated by the DSSS signal generator, to produce the first DSSS signals. In some examples, the control system may include a DSSS signal injector configured to insert the first DSSS signals into the first audio playback signals, to generate the first modified audio playback signals.

In some examples, the control system may be configured to receive, from the microphone system, microphone signals corresponding to at least the first audio device playback sound and second audio device playback sound. In some examples, the second audio device playback sound may correspond to second modified audio playback signals played back by a second audio device. In some instances, the second modified audio playback signals may include second DSSS signals. In some examples, the control system may be configured to extract at least the second DSSS signals from the microphone signals.

In some implementations, the control system may be configured to receive, from the microphone system, microphone signals corresponding to at least the first audio device playback sound and to second through $N^{th}$ audio device playback sound. In some examples, the second through $N^{th}$ audio device playback sound may correspond to second through $N^{th}$ modified audio playback signals played back by second through $N^{th}$ audio devices. In some examples, the second through $N^{th}$ modified audio playback signals may include second through $N^{th}$ DSSS signals. In some implementations, the control system may be configured to extract at least the second through $N^{th}$ DSSS signals from the microphone signals.

In some examples, the control system may be configured to estimate at least one acoustic scene metric based, at least in part, on the second through $N^{th}$ DSSS signals. In some examples, the at least one acoustic scene metric may include one or more of a time of flight, a time of arrival, a range, an audio device audibility, an audio device impulse response, an angle between audio devices, an audio device location, audio environment noise or a signal-to-noise ratio. In some implementations, the control system may be configured to control one or more aspects of audio device playback based, at least in part, on the at least one acoustic scene metric and/or at least one audio device characteristic.

In some examples, the control system may be configured to determine one or more DSSS parameters for each audio device of a plurality of audio devices in the audio environment. In some examples, the one or more DSSS parameters may be useable for generation of DSSS signals. In some such implementations, the control system may be configured to provide the one or more DSSS parameters to each audio device of the plurality of audio devices.

In some examples, determining the one or more DSSS parameters may involve scheduling a time slot for each audio device of the plurality of audio devices to play back modified audio playback signals. In some such examples, a first time slot for a first audio device may be different from a second time slot for a second audio device.

According to some examples, determining the one or more DSSS parameters may involve determining a frequency band for each audio device of the plurality of audio devices to play back modified audio playback signals. In some instances, a first frequency band for a first audio device may be different from a second frequency band for a second audio device.

In some implementations, determining the one or more DSSS parameters may involve determining a spreading code for each audio device of the plurality of audio devices. In some instances, a first spreading code for a first audio device may be different from a second spreading code for a second audio device. In some examples, the control system may be configured to determine at least one spreading code length that is based, at least in part, on an audibility of a corresponding audio device. According to some implementations, determining the one or more DSSS parameters may involve applying an acoustic model that is based, at least in part, mutual audibility of each of a plurality of audio devices in the audio environment.

In some implementations, determining the one or more DSSS parameters may involve determining a current playback objective. In some such examples, determining the one or more DSSS parameters may involve applying an acoustic model that is based, at least in part, mutual audibility of each of a plurality of audio devices in the audio environment, to determine an estimated performance of DSSS signals in the audio environment. In some such examples, determining the one or more DSSS parameters may involve applying a perceptual model based on human sound perception, to determine a perceptual impact of DSSS signals in the audio environment. In some such examples, determining the one or more DSSS parameters may be based, at least in part, on one or more of the current playback objective, the estimated performance or the perceptual impact. In some examples, determining the one or more DSSS parameters may be based, at least in part, on the current playback objective, the estimated performance and the perceptual impact.

According to some implementations, determining the one or more DSSS parameters may involve detecting a DSSS parameter change trigger. In some such implementations, the control system may be configured to determine one or more new DSSS parameters corresponding to the DSSS parameter change trigger. In some such implementations, the control system may be configured to provide the one or more new DSSS parameters to one or more audio devices of the audio environment.

In some implementations, detecting the DSSS parameter change trigger may involve detecting one or more of a new audio device in the audio environment, a change of an audio device location, a change of an audio device orientation, a change of an audio device setting, a change in a location of a person in the audio environment, a change in a type of audio content may be reproduced in the audio environment, a change in background noise in the audio environment, an audio environment configuration change, including but not limited to a changed configuration of a door or window of the audio environment, a clock skew between two or more audio devices of the audio environment, a clock bias between two or more audio devices of the audio environment, a change in the mutual audibility between two or more audio devices of the audio environment, or a change in a playback objective.

In some implementations, the control system may be configured to process received microphone signals, to produce preprocessed microphone signals. In some such examples, the control system may be configured to extract DSSS signals from the preprocessed microphone signals. In some implementations, processing the received microphone signals may involve one or more of beamforming, applying a bandpass filter or echo cancellation.

According to some examples, extracting at least the second through $N^{th}$ DSSS signals from the microphone signals may involve applying a matched filter to the microphone signals or to a preprocessed version of the microphone signals, to produce second through $N^{th}$ delay waveforms. In some such examples, the second through $N^{th}$ delay waveforms may correspond to each of the second through $N^{th}$ DSSS signals. In some examples, the control system may be configured to apply a low-pass filter to each of the second through $N^{th}$ delay waveforms.

In some implementations, the control system may be configured to implement a demodulator. In some such implementations, applying the matched filter may be part of a demodulation process performed by the demodulator. In some such examples, an output of the demodulation process may be a demodulated coherent baseband signal.

In some examples, the control system may be configured to estimate a bulk delay and to provide a bulk delay estimation to the demodulator. In some implementations, the control system may be configured to implement a baseband processor configured for baseband processing of the demodulated coherent baseband signal. In some such examples, the baseband processor may be configured to output at least one estimated acoustic scene metric.

According to some examples, the baseband processing may involve producing an incoherently integrated delay waveform based on demodulated coherent baseband signals received during an incoherent integration period. In some examples, producing the incoherently integrated delay waveform may involve squaring the demodulated coherent baseband signals received during the incoherent integration period, to produce squared demodulated baseband signals, and integrating the squared demodulated baseband signals. According to some examples, the baseband processing may involve applying one or more of a leading edge estimating process, a steered response power estimating process or a signal-to-noise estimating process to the incoherently integrated delay waveform. In some examples, the control system may be configured to estimate a bulk delay and to provide a bulk delay estimation to the baseband processor.

In some implementations, the control system may be configured to estimate second through $N^{th}$ noise power levels at second through $N^{th}$ audio device locations based on the second through $N^{th}$ delay waveforms. In some such examples, the control system may be configured to produce a distributed noise estimate for the audio environment based, at least in part, on the second through $N^{th}$ noise power levels.

In some examples, the control system may be configured to perform an asynchronous two-way ranging process for cancellation of an unknown clock bias between two asynchronous audio devices. According to some examples, the asynchronous two-way ranging process may be based on DSSS signals transmitted by each of the two asynchronous audio devices. In some examples, the control system may be further configured to perform the asynchronous two-way ranging process between each of a plurality of audio devices of the audio environment.

In some implementations, the control system may be configured to perform a clock bias estimation process for determining an estimated clock bias between two asynchronous audio devices. In some examples, the clock bias estimation process may be based on DSSS signals transmitted by each of the two asynchronous audio devices. In some implementations, the control system may be configured to compensate for the estimated clock bias.

In some examples, the control system may be configured to perform the clock bias estimation process between each of a plurality of audio devices of the audio environment, to produce a plurality of estimated clock biases. In some implementations, the control system may be configured to compensate for each estimated clock bias of the plurality of estimated clock biases.

In some implementations, the control system may be configured to perform a clock skew estimation process for determining an estimated clock skew between two asynchronous audio devices. In some implementations, the clock skew estimation process may be based on DSSS signals transmitted by each of the two asynchronous audio devices. In some such examples, the control system may be configured to compensate for the estimated clock skew.

In some examples, the control system may be configured to perform the clock skew estimation process between each of a plurality of audio devices of the audio environment, to produce a plurality of estimated clock skews. In some such examples, the control system may be configured to compensate for each estimated clock skew of the plurality of estimated clock skews.

In some implementations, the control system may be configured to detect a DSSS signal transmitted by an audio device. In some such examples, the DSSS signal may correspond with a first spreading code. In some such examples, the first spreading code may be, or may include, a first pseudo-random number sequence that is reserved for newly-activated audio devices. In some implementations, the control system may be configured to provide the audio device with a second spreading code for future transmissions.

In some examples, the control system may be configured to cause each of a plurality of audio devices in the audio environment to simultaneously play back modified audio playback signals.

Some additional aspects of the present disclosure may be implemented via one or more methods. In some instances, the method(s) may be implemented, at least in part, by a control system and/or via instructions (e.g., software) stored on one or more non-transitory media. Some methods may involve receiving, by a control system, a first content stream. The first content stream may include first audio signals. Some such methods involve rendering, by the control system, the first audio signals to produce first audio playback signals. Some such methods involve generating, by the control system, first direct sequence spread spectrum (DSSS) signals. Some such methods involve inserting, by the control system, the first DSSS signals into the first audio playback signals to generate first modified audio playback signals. Some such methods involve causing, by the control system, a loudspeaker system to play back the first modified audio playback signals, to generate first audio device playback sound.

Some methods may involve receiving, by the control system and from a microphone system, microphone signals corresponding to at least the first audio device playback sound and second audio device playback sound. In some examples, the second audio device playback sound may correspond to second modified audio playback signals played back by a second audio device. In some examples, the second modified audio playback signals may include second DSSS signals. Some methods may involve extracting, by the control system, at least the second DSSS signals from the microphone signals.

Some methods may involve receiving, by the control system and from the microphone system, microphone signals corresponding to at least the first audio device playback sound and to second through $N^{th}$ audio device playback sound. In some examples, the second through $N^{th}$ audio device playback sound may correspond to second through $N^{th}$ modified audio playback signals played back by second through $N^{th}$ audio devices. In some examples, the second through $N^{th}$ modified audio playback signals may include second through $N^{th}$ DSSS signals. Some methods may involve extracting, by the control system, at least the second through $N^{th}$ DSSS signals from the microphone signals.

Some methods may involve estimating, by the control system, at least one acoustic scene metric based, at least in part, on the second through $N^{th}$ DSSS signals. In some examples, the at least one acoustic scene metric includes one or more of a time of flight, a time of arrival, a range, an audio device audibility, an audio device impulse response, an angle between audio devices, an audio device location, audio environment noise or a signal-to-noise ratio.

Some methods may involve controlling, by the control system, one or more aspects of audio device playback based, at least in part, on the at least one acoustic scene metric, at least one audio device characteristic, or on both the at least one acoustic scene metric and the at least one audio device characteristic.

In some examples, a first content stream component of the first audio device playback sound may cause perceptual masking of a first DSSS signal component of the first audio device playback sound.

Some methods may involve determining, by the control system, one or more DSSS parameters for each audio device of a plurality of audio devices in the audio environment. In some examples, the one or more DSSS parameters may be useable for generation of DSSS signals. Some methods may involve providing, by the control system, the one or more DSSS parameters to each audio device of the plurality of audio devices.

In some examples, determining the one or more DSSS parameters may involve scheduling a time slot for each audio device of the plurality of audio devices to play back modified audio playback signals. In some examples, a first time slot for a first audio device may be different from a second time slot for a second audio device. According to some examples, determining the one or more DSSS parameters may involve determining a frequency band for each audio device of the plurality of audio devices to play back modified audio playback signals. In some examples, a first frequency band for a first audio device may be different from a second frequency band for a second audio device.

According to some examples, determining the one or more DSSS parameters may involve determining a spreading code for each audio device of the plurality of audio devices. In some instances, a first spreading code for a first audio device may be different from a second spreading code for a second audio device. Some examples may involve determining at least one spreading code length that is based, at least in part, on an audibility of a corresponding audio device. In some examples, determining the one or more DSSS parameters may involve applying an acoustic model that is based, at least in part, mutual audibility of each of a plurality of audio devices in the audio environment.

In some examples, at least a portion of the first audio signals may correspond to silence.

Some or all of the operations, functions and/or methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented via one or more non-transitory media having software stored thereon.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION OF EMBODIMENTS

Figure 1A:
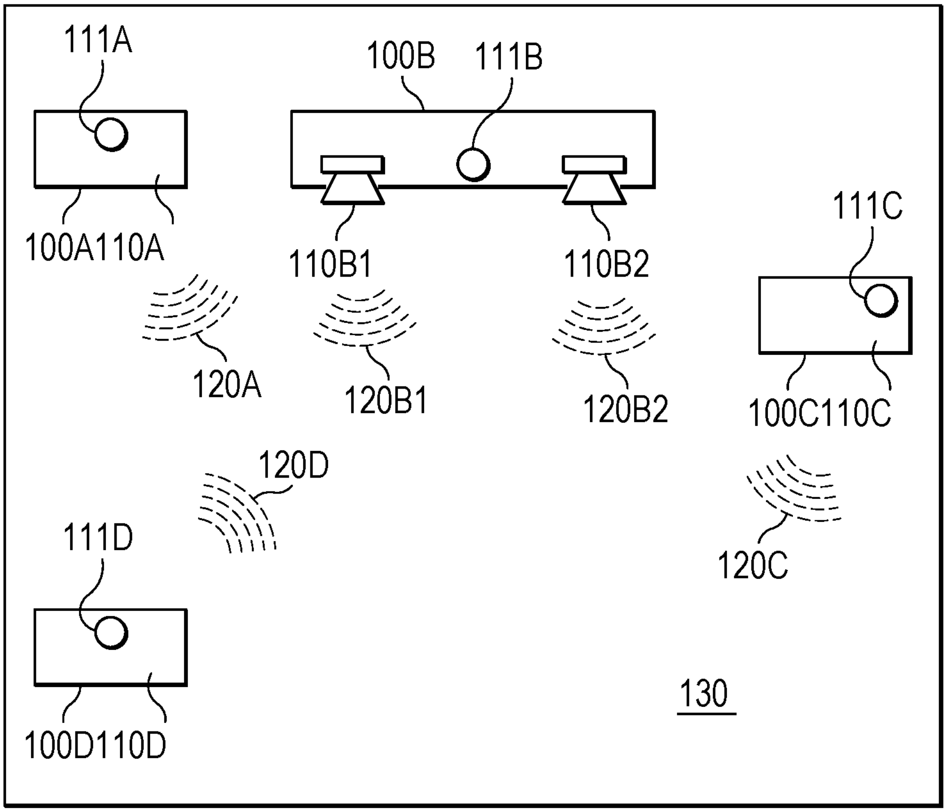
FIG. 1A shows an example of an audio environment.

To achieve compelling spatial playback of media and entertainment content the physical layout and relative capabilities of the available speakers should be evaluated and taken into account. Similarly, in order to provide high-quality voice-driven interactions (with both virtual assistants and remote talkers) users need both to be heard and to hear the conversation as reproduced via loudspeakers. It is anticipated that as more co-operative devices are added to an audio environment, the combined utility to the user will increase, as devices will be within convenient voice range more commonly. A larger number of speakers allows for greater immersion as the spatiality of the media presentation may be leveraged.

Sufficient co-ordination and co-operation between devices could potentially allow these opportunities and experiences to be realized. Acoustic information about each audio device is a key component of such co-ordination and co-operation. Such acoustic information may include the audibility of each loudspeakers from various positions in the audio environment, as well as the amount of noise in the audio environment.

Some previous methods of mapping and calibrating a constellation of smart audio devices require a dedicated calibration procedure, whereby known stimulus is played from the audio devices (often one audio device playing at a time) while one or more microphones records. Though this process can be made appealing to a select demographic of users through creative sound design, the need to repeatedly re-perform the process as devices are added, removed or even simply relocated presents a barrier to widespread adoption. Imposing such a procedure on users will interfere with the normal operation of the devices and may frustrate some users. An even more rudimentary approach that is also popular is manual user intervention via a software application ("app") and/or a guided process in which users indicate the physical location of audio devices in an audio environment. Such approaches present further barriers to user adoption and may provide relatively less information to the system than a dedicated calibration procedure.

Calibration and mapping algorithms generally require some basic acoustic information for each audio device in an audio environment. Many such methods have been proposed, using a range of different basic acoustic measurements and acoustic properties being measured. Examples of acoustic properties (also referred to herein as "acoustic scene metrics") derived from microphone signals for use in such algorithms include:

- Estimates of physical distance between devices (acoustic ranging);
- Estimates of angle between devices (direction of arrival (DoA));
- Estimates of impulse responses between devices (e.g., through swept sine wave stimulus or other measurement signals); and
- Estimates of background noise.

However, existing calibration and mapping algorithms are not generally implemented so as to be responsive to changes in the acoustic scene of an audio environment, such as the movement of people within the audio environment, the repositioning of audio devices within the audio environment, etc.

This disclosure describes techniques involving direct sequence spread spectrum (DSSS) signals that are injected into the content being rendered by audio devices. Such methods can enable the audio devices to produce observations after receiving signals transmitted by other audio devices in an audio environment. In some implementations, each participating audio device in an audio environment may be configured to generate the DSSS signals, to inject the DSSS signals into rendered loudspeaker feed signals to produce modified audio playback signals, and to causing a loudspeaker system to play back the modified audio playback signals, to generate first audio device playback sound. In some implementations, each participating audio device in an audio environment may be configured to do the foregoing whilst also detecting audio device playback sound from other orchestrated audio devices in the audio environment and processing the audio device playback sound to extract DSSS signals.

DSSS signals have previously been deployed in the context of telecommunications. When DSSS signals are used in the context of telecommunications, DSSS signals are used to spread out the transmitted data over a wider frequency range before it is sent over a channel to a receiver. Most or all of the disclosed implementations, by contrast, do not involve using DSSS signals to modify or transmit data. Instead, such disclosed implementations involve sending DSSS signals between audio devices of an audio environment. What happens to the transmitted DSSS signals between transmission and reception is, in itself, the transmitted information. That is one significant difference between how DSSS signals are used in the context of telecommunications and how DSSS signals are used in the disclosed implementations.

Moreover, the disclosed implementations involve sending and receiving acoustic DSSS signals, not sending and receiving electromagnetic DSSS signals. In many disclosed implementations, the acoustic DSSS signals are inserted into a content stream that has been rendered for playback, such that the acoustic DSSS signals are included in played-back audio. According to some such implementations, the acoustic DSSS signals are not audible to humans, so that a person in the audio environment would not perceive the acoustic DSSS signals, but would only detect the played-back audio content.

Another difference between the use of acoustic DSSS signals as disclosed herein and how DSSS signals are used in the context of telecommunications involves what may be referred to herein as the "near/far problem." In some instances, the acoustic DSSS signals disclosed herein may be transmitted by, and received by, many audio devices in an audio environment. The acoustic DSSS signals may potentially overlaps in time and frequency. Some disclosed implementations rely on how the DSSS spreading codes are generated to separate the acoustic DSSS signals. In some instances, the audio devices may be so close to one another that the signal levels may encroach on the acoustic DSSS signal separation, so it may be difficult to separate the signals. That is one manifestation of the near/far problem, some solutions for which are disclosed herein.

Some methods may involve receiving a first content stream that includes first audio signals, rendering the first audio signals to produce first audio playback signals, generating first direct sequence spread spectrum (DSSS) signals, generating first modified audio playback signals by inserting the first DSSS signals into the first audio playback signals, and causing a loudspeaker system to play back the first modified audio playback signals, to generate first audio device playback sound. The method(s) may involve receiving microphone signals corresponding to at least the first audio device playback sound and to second through $N^{th}$ audio device playback sound corresponding to second through $N^{th}$ modified audio playback signals (including second through $N^{th}$ DSSS signals) played back by second through $N^{th}$ audio devices, extracting second through $N^{th}$ DSSS signals from the microphone signals and estimating at least one acoustic scene metric based, at least partly, on the second through $N^{th}$ DSSS signals.

The acoustic scene metric(s) may be, or may include, an audio device audibility, an audio device impulse response, an angle between audio devices, an audio device location and/or audio environment noise. Some disclosed methods may involve controlling one or more aspects of audio device playback based, at least in part, on the acoustic scene metric(s).

Some disclosed methods may involve orchestrating a plurality of audio devices to perform methods involving DSSS signals. Some such methods may involve causing, by a control system, a first audio device of an audio environment to generate first DSSS signals, causing, by the control system, the first DSSS signals to be inserted into first audio playback signals corresponding to a first content stream, to generate first modified audio playback signals for the first audio device and causing, by the control system, the first audio device to play back the first modified audio playback signals, to generate first audio device playback sound.

Some such methods may involve causing, by the control system, a second audio device of the audio environment to generate second DSSS signals, causing, by the control system, the second DSSS signals to be inserted into a second content stream to generate second modified audio playback signals for the second audio device and causing, by the control system, the second audio device to play back the second modified audio playback signals, to generate second audio device playback sound.

Some such implementations may involve causing, by the control system, at least one microphone of the audio environment to detect at least the first audio device playback sound and the second audio device playback sound and to generate microphone signals corresponding to at least the first audio device playback sound and the second audio device playback sound. Some such methods may involve causing, by the control system, at least the first DSSS signals and the second DSSS signals to be extracted from the microphone signals and causing, by the control system, at least one acoustic scene metric to be estimated based, at least in part, on the first DSSS signals and the second DSSS signals.

FIG. 1A shows an example of an audio environment. As with other figures provided herein, the types and numbers of elements shown in FIG. 1A are merely provided by way of example. Other implementations may include more, fewer and/or different types and numbers of elements.

According to this example, the audio environment 130 is a living space of a home. In the example shown FIG. 1A, audio devices 100A, 100B, 100C and 100D are located within the audio environment 130. In this example, each of the audio devices 100A-100D includes a corresponding one of the loudspeaker systems 110A, 110B, 110C and 110D. According to this example, loudspeaker system 110B of the audio device 100B includes at least a left loudspeaker 110B1 and a right loudspeaker 110B2. In this instance the audio devices 100A-100D include loudspeakers of various sizes and having various capabilities. At the time represented in FIG. 1A, the audio devices 100A-100D are producing corresponding instances of audio device playback sound 120A, 120B1, 120B2, 120C and 120D.

In this example, each of the audio devices 100A-100D includes a corresponding one of the microphone systems 111A, 111B, 111C and 111D. Each of the microphone systems 111A-111D includes one or more microphones. In some examples, the audio environment 130 may include at least one audio device lacking a loudspeaker system or at least one audio device lacking a microphone system.

In some instances, at least one acoustic event may be occurring in the audio environment 130. For example, one such acoustic event may be caused by a talking person, who in some instances may be uttering a voice command In other instances, an acoustic event may be caused, at least in part, by a variable element such as a door or a window of the audio environment 130. For example, as a door opens, sounds from outside the audio environment 130 may be perceived more clearly inside the audio environment 130. Moreover, the changing angle of a door may change some of the echo paths within the audio environment 130.

Figure 1B:
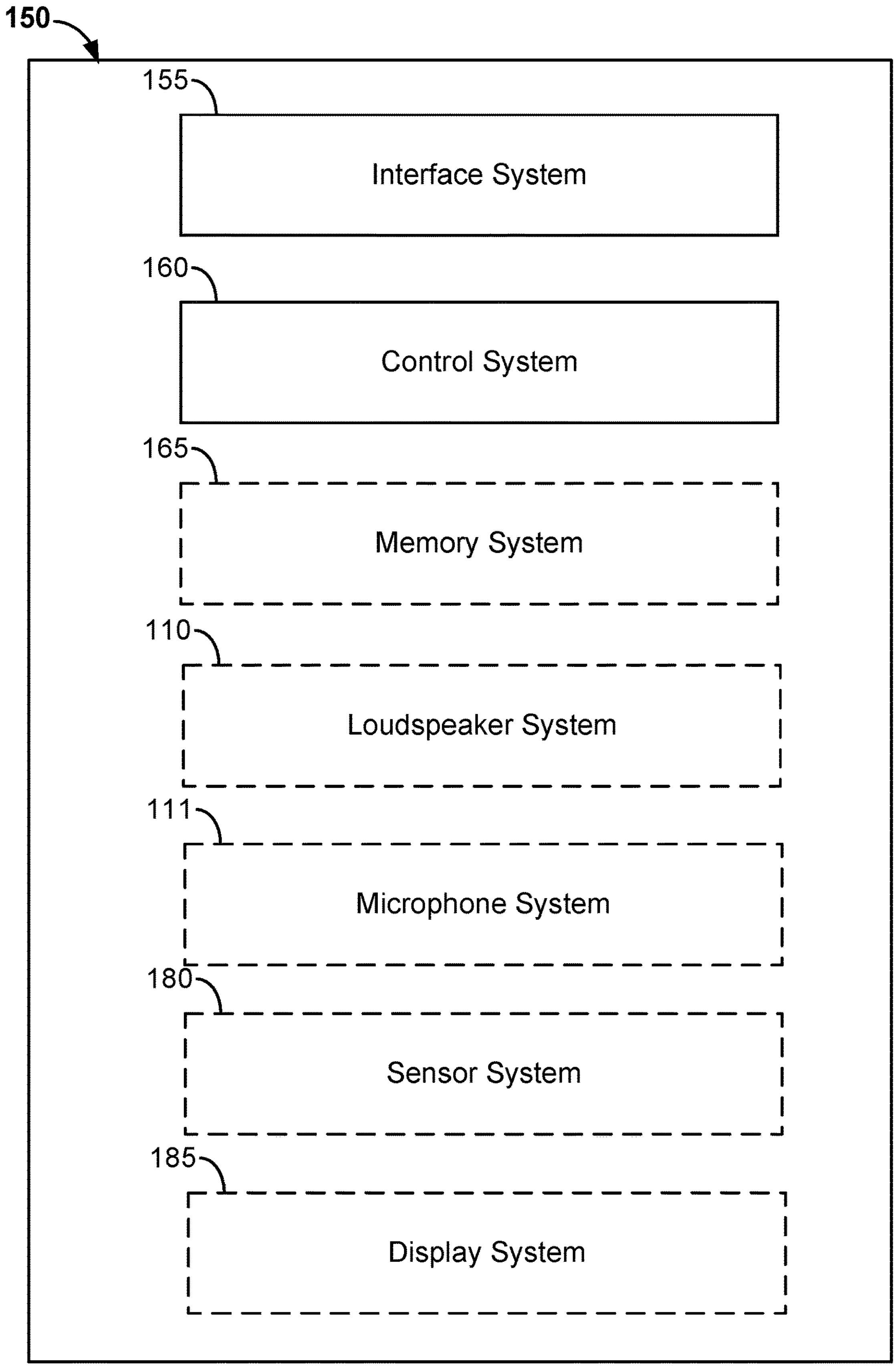
FIG. 1B is a block diagram that shows examples of components of an apparatus capable of implementing various aspects of this disclosure.

FIG. 1B is a block diagram that shows examples of components of an apparatus capable of implementing various aspects of this disclosure. As with other figures provided herein, the types and numbers of elements shown in FIG. 1B are merely provided by way of example. Other implementations may include more, fewer and/or different types and numbers of elements. According to some examples, the apparatus 150 may be configured for performing at least some of the methods disclosed herein. In some implementations, the apparatus 150 may be, or may include, one or more components of an audio system. For example, the apparatus 150 may be an audio device, such as a smart audio device, in some implementations. In other examples, the examples, the apparatus 150 may be a mobile device (such as a cellular telephone), a laptop computer, a tablet device, a television or another type of device.

In the example shown in FIG. 1A, the audio devices 100A-100D are instances of the apparatus 150. According to some examples, the audio environment 100 of FIG. 1A may include an orchestrating device, such as what may be referred to herein as a smart home hub. The smart home hub (or other orchestrating device) may be an instance of the apparatus 150. In some implementations, one or more of the audio devices 100A-100D may be capable of functioning as an orchestrating device.

According to some alternative implementations the apparatus 150 may be, or may include, a server. In some such examples, the apparatus 150 may be, or may include, an encoder. Accordingly, in some instances the apparatus 150 may be a device that is configured for use within an audio environment, such as a home audio environment, whereas in other instances the apparatus 150 may be a device that is configured for use in "the cloud," e.g., a server.

In this example, the apparatus 150 includes an interface system 155 and a control system 160. The interface system 155 may, in some implementations, include a wired or wireless interface that is configured for communication with one or more other devices of an audio environment. The audio environment may, in some examples, be a home audio environment. In other examples, the audio environment may be another type of environment, such as an office environment, an automobile environment, a train environment, a street or sidewalk environment, a park environment, etc. The interface system 155 may, in some implementations, be configured for exchanging control information and associated data with audio devices of the audio environment. The control information and associated data may, in some examples, pertain to one or more software applications that the apparatus 150 is executing.

The interface system 155 may, in some implementations, be configured for receiving, or for providing, a content stream. The content stream may include audio data. The audio data may include, but may not be limited to, audio signals. In some instances, the audio data may include spatial data, such as channel data and/or spatial metadata. Metadata may, for example, have been provided by what may be referred to herein as an "encoder." In some examples, the content stream may include video data and audio data corresponding to the video data.

The interface system 155 may include one or more network interfaces and/or one or more external device interfaces (such as one or more universal serial bus (USB) interfaces). According to some implementations, the interface system 155 may include one or more wireless interfaces, e.g., configured for Wi-Fi or Bluetooth™ communication.

The interface system 155 may, in some examples, include one or more devices for implementing a user interface, such as one or more microphones, one or more speakers, a display system, a touch sensor system and/or a gesture sensor system. In some examples, the interface system 155 may include one or more interfaces between the control system 160 and a memory system, such as the optional memory system 165 shown in FIG. 1B. However, the control system 160 may include a memory system in some instances. The interface system 155 may, in some implementations, be configured for receiving input from one or more microphones in an environment.

In some implementations, the control system 160 may be configured for performing, at least in part, the methods disclosed herein. The control system 160 may, for example, include a general purpose single- or multi-chip processor, a digital signal processor (DSP), an application specific integrated circuit (ASIC), a field programmable gate array (FPGA) or other programmable logic device, discrete gate or transistor logic, and/or discrete hardware components.

In some implementations, the control system 160 may reside in more than one device. For example, in some implementations a portion of the control system 160 may reside in a device within one of the environments depicted herein and another portion of the control system 160 may reside in a device that is outside the environment, such as a server, a mobile device (e.g., a smartphone or a tablet computer), etc. In other examples, a portion of the control system 160 may reside in a device within one of the environments depicted herein and another portion of the control system 160 may reside in one or more other devices of the environment. For example, control system functionality may be distributed across multiple smart audio devices of an environment, or may be shared by an orchestrating device (such as what may be referred to herein as a smart home hub) and one or more other devices of the environment. In other examples, a portion of the control system 160 may reside in a device that is implementing a cloud-based service, such as a server, and another portion of the control system 160 may reside in another device that is implementing the cloud-based service, such as another server, a memory device, etc. The interface system 155 also may, in some examples, reside in more than one device.

Some or all of the methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. The one or more non-transitory media may, for example, reside in the optional memory system 165 shown in FIG. 1B and/or in the control system 160. Accordingly, various innovative aspects of the subject matter described in this disclosure can be implemented in one or more non-transitory media having software stored thereon. The software may, for example, include instructions for controlling at least one device to perform some or all of the methods disclosed herein. The software may, for example, be executable by one or more components of a control system such as the control system 160 of FIG. 1B.

In some examples, the apparatus 150 may include the optional microphone system 111 shown in FIG. 1B. The optional microphone system 111 may include one or more microphones. According to some examples, the optional microphone system 111 may include an array of microphones. The array of microphones may, in some instances, be configured for receive-side beamforming, e.g., according to instructions from the control system 160. In some examples, the array of microphones may be configured to determine direction of arrival (DOA) and/or time of arrival (TOA) information, e.g., according to instructions from the control system 160. Alternatively, or additionally, the control system 160 may be configured to determine direction of arrival (DOA) and/or time of arrival (TOA) information, e.g., according to microphone signals received from the microphone system 111.

In some implementations, one or more of the microphones may be part of, or associated with, another device, such as a speaker of the speaker system, a smart audio device, etc. In some examples, the apparatus 150 may not include a microphone system 111. However, in some such implementations the apparatus 150 may nonetheless be configured to receive microphone data for one or more microphones in an audio environment via the interface system 160. In some such implementations, a cloud-based implementation of the apparatus 150 may be configured to receive microphone data, or data corresponding to the microphone data, from one or more microphones in an audio environment via the interface system 160.

According to some implementations, the apparatus 150 may include the optional loudspeaker system 110 shown in FIG. 1B. The optional loudspeaker system 110 may include one or more loudspeakers, which also may be referred to herein as "speakers" or, more generally, as "audio reproduction transducers." In some examples (e.g., cloud-based implementations), the apparatus 150 may not include a loudspeaker system 110.

In some implementations, the apparatus 150 may include the optional sensor system 180 shown in FIG. 1B. The optional sensor system 180 may include one or more touch sensors, gesture sensors, motion detectors, etc. According to some implementations, the optional sensor system 180 may include one or more cameras. In some implementations, the cameras may be free-standing cameras. In some examples, one or more cameras of the optional sensor system 180 may reside in a smart audio device, which may be a single purpose audio device or a virtual assistant. In some such examples, one or more cameras of the optional sensor system 180 may reside in a television, a mobile phone or a smart speaker. In some examples, the apparatus 150 may not include a sensor system 180. However, in some such implementations the apparatus 150 may nonetheless be configured to receive sensor data for one or more sensors in an audio environment via the interface system 160.

In some implementations, the apparatus 150 may include the optional display system 185 shown in FIG. 1B. The optional display system 185 may include one or more displays, such as one or more light-emitting diode (LED) displays. In some instances, the optional display system 185 may include one or more organic light-emitting diode (OLED) displays. In some examples, the optional display system 185 may include one or more displays of a smart audio device. In other examples, the optional display system 185 may include a television display, a laptop display, a mobile device display, or another type of display. In some examples wherein the apparatus 150 includes the display system 185, the sensor system 180 may include a touch sensor system and/or a gesture sensor system proximate one or more displays of the display system 185. According to some such implementations, the control system 160 may be configured for controlling the display system 185 to present one or more graphical user interfaces (GUIs).

According to some such examples the apparatus 150 may be, or may include, a smart audio device. In some such implementations the apparatus 150 may be, or may include, a wakeword detector. For example, the apparatus 150 may be, or may include, a virtual assistant.

Figure 2:
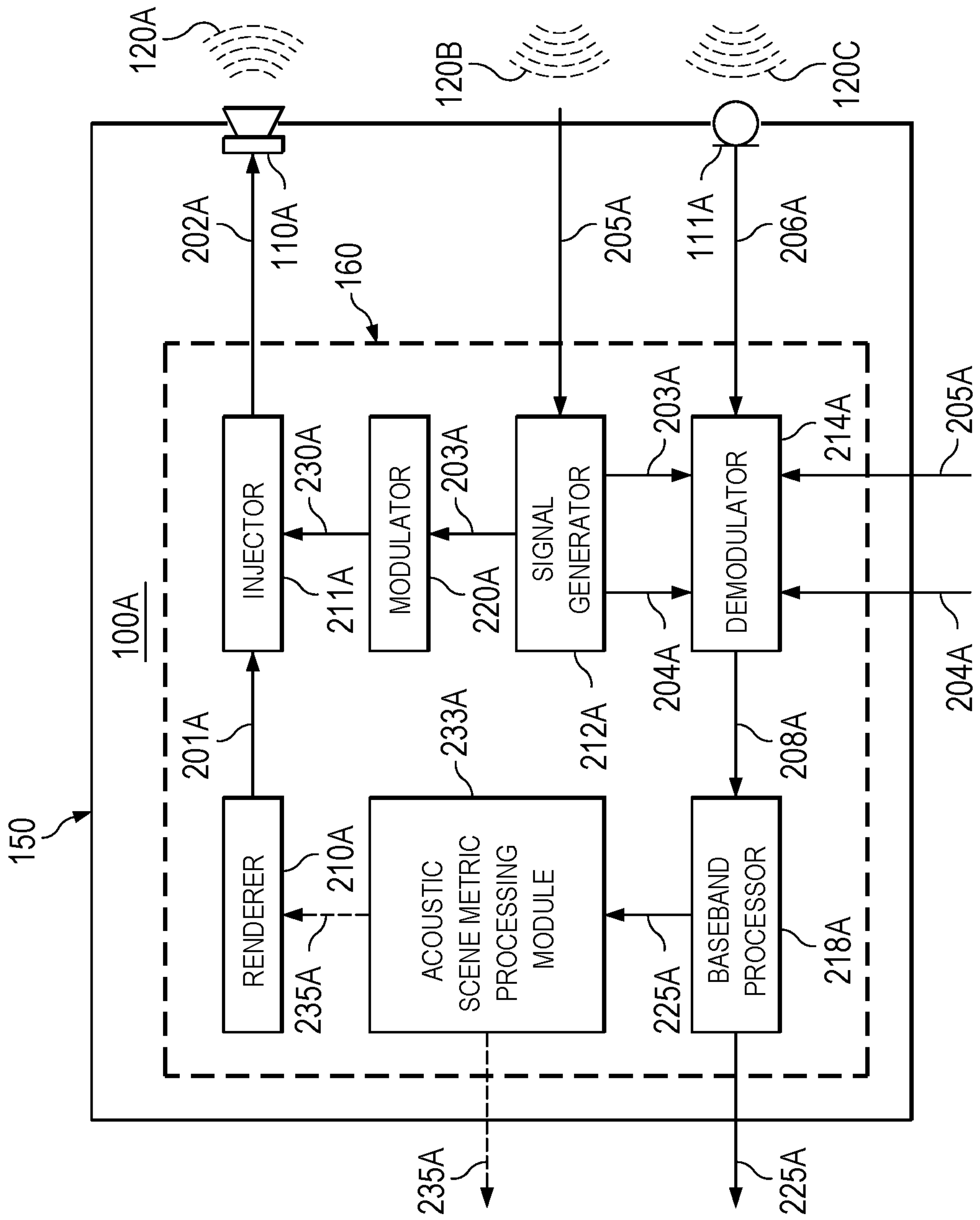
FIG. 2 is a block diagram that shows examples of audio device elements according to some disclosed implementations.

FIG. 2 is a block diagram that shows examples of audio device elements according to some disclosed implementations. As with other figures provided herein, the types and numbers of elements shown in FIG. 2 are merely provided by way of example. Other implementations may include more, fewer and/or different types and numbers of elements. In this example, the audio device 100A of FIG. 2 is an instance of the apparatus 150 that is described above with reference to FIG. 1B. In this example, the audio device 100A is one of a plurality of audio devices in an audio environment and may, in some instances, an example of the audio device 100A shown in FIG. 1A. According to this implementation, the audio device 100A is one of a plurality of orchestrated audio devices in an audio environment. In this example, the audio environment includes at least two other orchestrated audio devices, audio device 100B and audio device 100C.

According to this implementation, the audio device 100A includes the following elements:

110A: An instance of the loudspeaker system 110 of FIG. 1B, which includes one or more loudspeakers;

111A: An instance of the microphone system 111 of FIG. 1B, which includes one or more microphones;

120A, B, C: Audio device playback sounds corresponding to rendered content being played back by the audio devices 100A-100C in the same acoustic space;

201A: audio playback signals output by the rendering module 210A;

202A: modified audio playback signals output by the DSSS signal injector 211A;

203A: DSSS signals output by the DSSS signal generator 212A;

204A: DSSS signal replicas corresponding to DSSS signals generated by other audio devices of the audio environment (in this example, at least audio devices 100B and 100C). In some examples, the DSSS signal replicas 204A may be received (e.g., via a wireless communication protocol such as Wi-Fi or Bluetooth™) from an external source, such as an orchestrating device (which may be another audio device of the audio environment, another local device such as a smart home hub, etc.);

205A: DSSS information pertaining to and/or used by one or more of the audio devices in the audio environment. The DSSS information 205A may include parameters to be used by the control system 160 of the audio device 100A to generate DSSS signals, to modulate DSSS signals, to demodulate the DSSS signals, etc. The DSSS information 205A may include one or more DSSS spreading code parameters and one or more DSSS carrier wave parameters. The DSSS spreading code parameters may, for example, include DSSS spreading code length information, chipping rate information (or chip period information), etc. One chip period is the time it takes for one chip (bit) of the spreading code to be played back. The inverse of the chip period is the chipping rate. The bits in a DSSS spreading code may be referred to as "chips" to indicate that they do not contain data (as bits normally do). In some instances, the DSSS spreading code parameters may include a pseudo-random number sequence. The DSSS information 205A may, in some examples, indicate which audio devices are producing acoustic DSSS signals. In some examples, the DSSS information 205A may be received (e.g., via wireless communication) from an external source, such as an orchestrating device;

206A: Microphone signals received by the microphone(s) 111A;

208A: Demodulated coherent baseband signals;

210A: A rendering module that is configured to render audio signals of a content stream such as music, audio data for movies and TV programs, etc., to produce audio playback signals;

211A: A DSSS signal injector configured to insert DSSS signals 230A modulated by the DSSS signal modulator 220A into the audio playback signals produced by the rendering module 210A, to generate modified audio playback signals. The insertion process may, for example, be a mixing process wherein DSSS signals 230A modulated by the DSSS signal modulator 220A are mixed with the audio playback signals produced by the rendering module 210A, to generate the modified audio playback signals;

212A: A DSSS signal generator configured to generate the DSSS signals 203A and to provide the DSSS signals 203A to the DSSS signal modulator 220A and to the DSSS signal demodulator 214A. In this example, the DSSS signal generator 212A includes a DSSS spreading code generator and a DSSS carrier wave generator. In this example, the DSSS signal generator 212A provides the DSSS signal replicas 204A to the DSSS signal demodulator 214A;

214A: A DSSS signal demodulator configured to demodulate microphone signals 206A received by the microphone(s) 111A. In this example the DSSS signal demodulator 214A outputs the demodulated coherent baseband signals 208A. Demodulation of the microphone signals 206A may, for example, be performed using standard correlation techniques including integrate and dump style matched filtering correlator banks. Some detailed examples are provided below. In order to improve the performance of these demodulation techniques, in some implementations the microphone signals 206A may be filtered before demodulation in order to remove unwanted content/phenomena. According to some implementations, the demodulated coherent baseband signals 208A may be filtered before being provided to the baseband processor 218A. The signal-to-noise ratio (SNR) is generally improved as the integration time increases (as the length of the spreading code used increases);

218A: A baseband processor configured for baseband processing of the demodulated coherent baseband signals 208A. In some examples, the baseband processor 218A may be configured to implement techniques such as incoherent averaging in order to improve the SNR by reducing the variance of the squared waveform to produce the delay waveform. Some detailed examples are provided below. In this example, the baseband processor 218A is configured to output one or more estimated acoustic scene metrics 225A;

220A: A DSSS signal modulator configured to modulate DSSS signals 203A generated by the DSSS signal generator, to produce the DSSS signals 230A;

225A: One or more DSSS-derived observations, which are also referred to herein as acoustic scene metrics. The acoustic scene metric(s) 225A may include, or may be, data corresponding to a time of flight, a time of arrival, a range, an audio device audibility, an audio device impulse response, an angle between audio devices, an audio device location, audio environment noise and/or a signal-to-noise ratio;

233A: An acoustic scene metric processing module, which is configured to receive and apply the acoustic scene metrics 225A. In this example, the acoustic scene metric processing module 233A is configured to generate information 235A (and/or commands) based, at least in part, on at least one acoustic scene metric 225A and/or at least one audio device characteristic. The audio device characteristic(s) may correspond to the audio device 100A or to another audio device of the audio environment, depending on the particular implementation. The audio device characteristic(s) may, for example, be stored in a memory of, or accessible to, the control system 160; and 235A: Information for controlling one or more aspects of audio processing and/or audio device playback. The information 235A may, for example, include information (and/or commands) for controlling a rendering process, an audio environment mapping process (such as an audio device auto-location process), an audio device calibration process, a noise suppression process and/or an echo attenuation process.

Examples of Acoustic Scene Metrics

As noted above, in some implementations the baseband processor 218A (or another module of the control system 160) may be configured to determine one or more acoustic scene metrics 225A. Following are some examples of acoustic scene metrics 225A.

Ranging

The DSSS signal received by an audio device from another contains information about the distance between the two devices in the form of the time-of-flight (ToF) of the signal. Thus, according to some examples, a control system may be configured to extract delay information from the demodulated DSSS signal and convert the delay information to a pseudorange measurement, e.g., as follows:

$$\rho = \tau c$$

In the foregoing equation, $\tau$ represents the delay information (also referred to herein as the ToF), $\rho$ represents the pseudorange measurement and c represents the speed of sound. We refer to a "pseudorange" because the range itself is not measured directly and so the range between devices is being estimated according to a timing estimate. In distributed asynchronous system of audio devices, each audio device is running on its own clock and thus there exists a bias in the raw delay measurements. Given a sufficient set of delay measurements it is possible to resolve these biases and sometimes to estimate them. Detailed examples of extracting delay information, producing and using pseudorange measurements, and determining and resolving clock biases are provided below.

DoA

In a similar fashion to ranging, using the plurality of microphones available on the listening device, a control system may be configured to estimate a direction-of-arrival (DoA) by processing the demodulated acoustic DSSS signals. In some such implementations, the resulting DoA information may be used as input to a DoA-based audio device auto-location method.

Audibility

The signal strength of the demodulated acoustic DSSS signal is proportional to the audibility of the audio device being listened to in the band in which the audio device is transmitting the acoustic DSSS signals. In some implementations, a control system may be configured to make multiple observations across a range of frequency bands to obtain a banded estimate of the entire frequency range. With knowledge of the transmitting audio device's digital signal level, a control system may, in some examples, be configured to estimate an absolute acoustic gain of the transmitting audio device.

Figure 3:
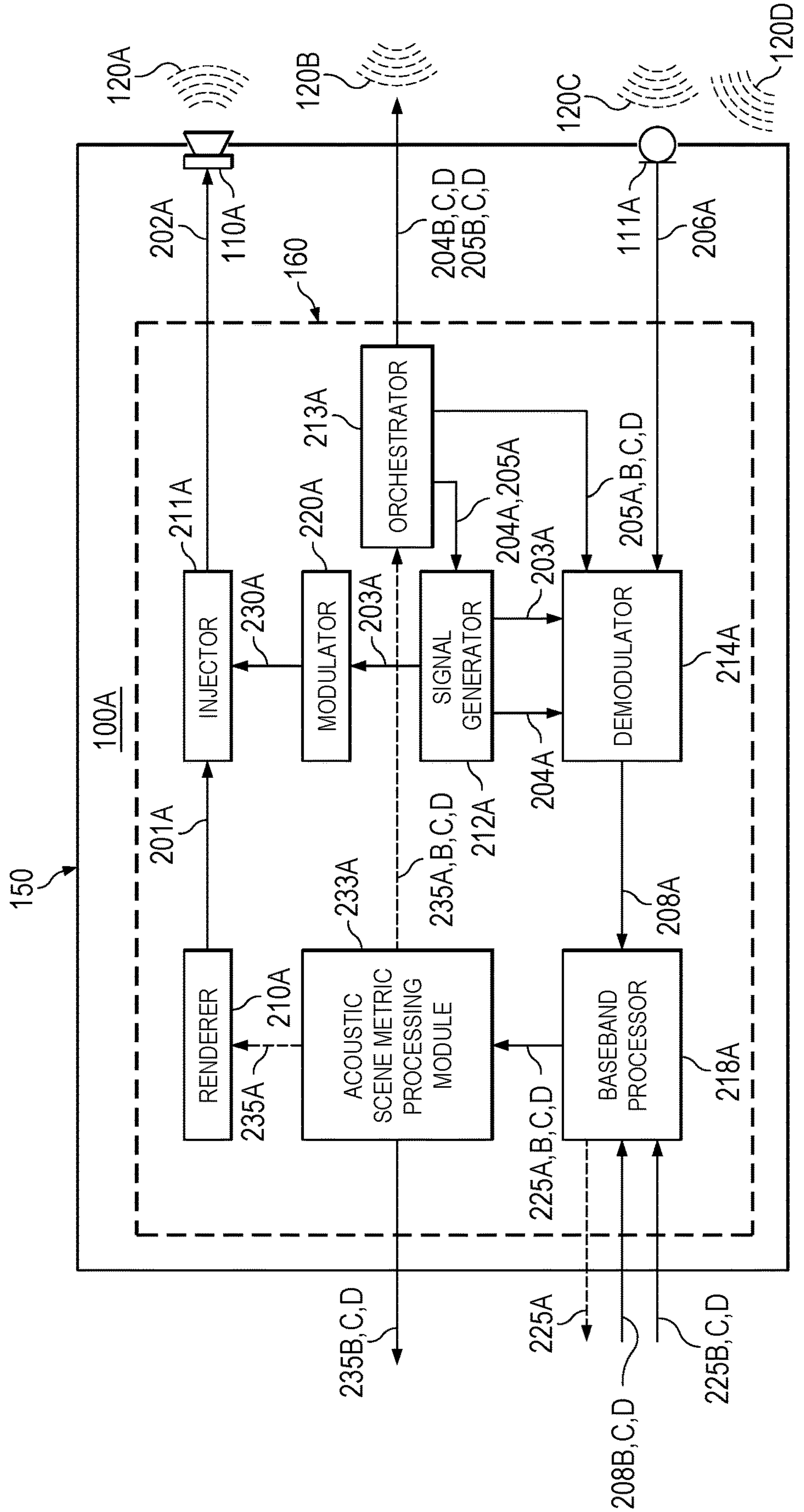
FIG. 3 is a block diagram that shows examples of audio device elements according to another disclosed implementation.

FIG. 3 is a block diagram that shows examples of audio device elements according to another disclosed implementation. As with other figures provided herein, the types and numbers of elements shown in FIG. 3 are merely provided by way of example. Other implementations may include more, fewer and/or different types and numbers of elements. In this example, the audio device 100A of FIG. 3 is an instance of the apparatus 150 that is described above with reference to FIGS. 1B and 2. However, according to this implementation, the audio device 100A is configured for orchestrating a plurality of audio devices in an audio environment, including at least audio devices 100B, 100C and 100D.

The implementation shown in of FIG. 3 includes all of the elements of FIG. 2, as well as some additional elements. The elements common to FIGS. 2 and 3 will not be described again here, except to the extent that their functionality may differ in the implementation of FIG. 3. According to this implementation, the audio device 100A includes the following elements and functionality:

120A, B, C, D: Audio device playback sounds corresponding to rendered content being played back by the audio devices 100A-100D in the same acoustic space;

204A, B, C, D: DSSS signal replicas corresponding to DSSS signals generated by other audio devices of the audio environment (in this example, at least audio devices 100B, 100C and 100D). In this example, the DSSS signal replicas 204A-204D are provided by the orchestrating module 213A. Here, the orchestrating module 213A provides the DSSS information 204B-204D to audio devices 100B-100D, e.g., via wireless communication;

205A, B, C, D: These elements correspond to DSSS information pertaining to and/or used by each of the audio devices 100A-100D. The DSSS information 205A may include parameters (such as one or more DSSS spreading code parameters and one or more DSSS carrier wave parameters) to be used by the control system 160 of the audio device 100A to generate DSSS signals, to modulate DSSS signals, to demodulate the DSSS signals, etc. The DSSS information 205B, 205C and 205D may include parameters (e.g., one or more DSSS spreading code parameters and one or more DSSS carrier wave parameters) to be used by the audio devices 100B, 100C and 100D, respectively to generate DSSS signals, to modulate DSSS signals, to demodulate the DSSS signals, etc. The DSSS information 205A-205D may, in some examples, indicate which audio devices are producing acoustic DSSS signals;

213A: An orchestrating module. In this example, orchestrating module 213A generates the DSSS information 205A-205D, provides the DSSS information 205A to the DSSS signal generator 212A, provides the DSSS information 205A-205D to the DSSS signal demodulator and provides the DSSS information 205B-205D to audio devices 100B-100D, e.g., via wireless communication. In some examples, the orchestrating module 213A generates the DSSS information 205A-205D based, at least in part, on the information 235A-235D and/or the acoustic scene metrics 225A-225D; 214A: A DSSS signal demodulator configured to demodulate at least the microphone signals 206A received by the microphone(s) 111A. In this example, the DSSS signal demodulator 214A outputs the demodulated coherent baseband signals 208A. In some alternative implementations, the DSSS signal demodulator 214A may receive and demodulate microphone signals 206B-206D from the audio devices 100B-100D, and may output the demodulated coherent baseband signals 208B-208D;

218A: A baseband processor configured for baseband processing of at least the demodulated coherent baseband signals 208A, and in some examples the demodulated coherent baseband signals 208B-208D received from the audio devices 100B-100D. In this example, the baseband processor 218A is configured to output one or more estimated acoustic scene metrics 225A-225D. In some implementations, the baseband processor 218A is configured to determine the acoustic scene metrics 225B-225D based on the demodulated coherent baseband signals 208B-208D received from the audio devices 100B-100D. However, in some instances the baseband processor 218A (or the acoustic scene metric processing module 233A) may receive the acoustic scene metrics 225B-225D from the audio devices 100B-100D;

233A: An acoustic scene metric processing module, which is configured to receive and apply the acoustic scene metrics 225A-225D. In this example, the acoustic scene metric processing module 233A is configured to generate information 235A-235D based, at least in part, on the acoustic scene metrics 225A-225D and/or at least one audio device characteristic. The audio device characteristic(s) may correspond to the audio device 100A and/or to one or more of audio devices 100B-100D.

Figure 4:
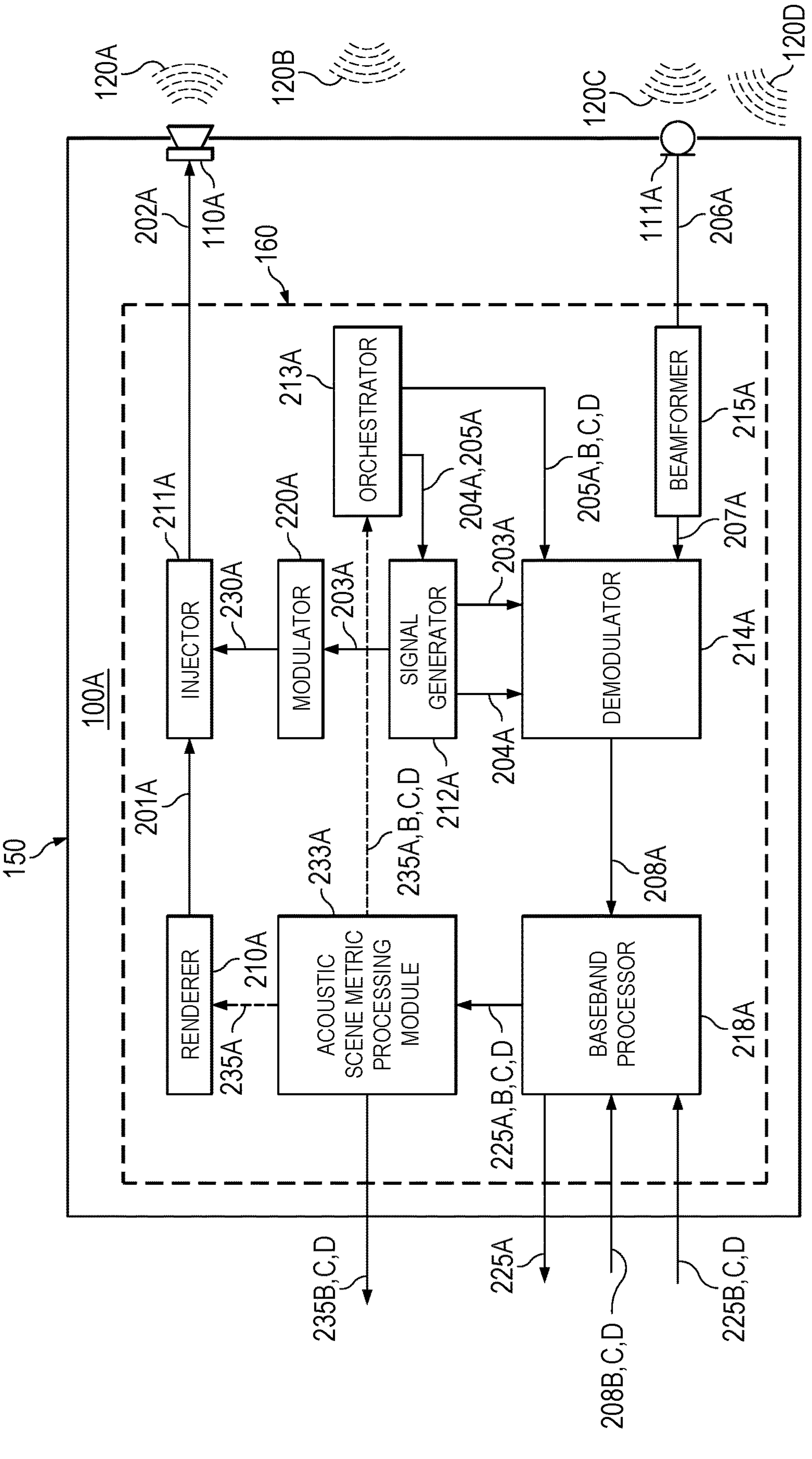
FIG. 4 is a block diagram that shows examples of audio device elements according to another disclosed implementation.

FIG. 4 is a block diagram that shows examples of audio device elements according to another disclosed implementation. As with other figures provided herein, the types and numbers of elements shown in FIG. 4 are merely provided by way of example. Other implementations may include more, fewer and/or different types and numbers of elements. In this example, the audio device 100A of FIG. 4 is an instance of the apparatus 150 that is described above with reference to FIGS. 1B, 2 and 3. The implementation shown in of FIG. 4 includes all of the elements of FIG. 3, as well as an additional element. The elements common to FIGS. 2 and 3 will not be described again here, except to the extent that their functionality may differ in the implementation of FIG. 4.

According to this implementation, the control system 160 is configured to process the received microphone signals 206A to produce preprocessed microphone signals 207A. In some implementations, processing the received microphone signals may involve applying a bandpass filter and/or echo cancellation. In this example, the control system 160 (and more specifically the DSSS signal demodulator 214A) is configured to extract DSSS signals from the preprocessed microphone signals 207A.

According to this example, the microphone system 111A includes an array of microphones, which may in some instances be, or include, one or more directional microphones. In this implementation, processing the received microphone signals involves receive-side beamforming, in this example via the beamformer 215A. In this example, the preprocessed microphone signals 207A output by the beamformer 215A are, or include, spatial microphone signals.

In this implementation, the DSSS signal demodulator 214A processes spatial microphone signals, which can enhance the performance for audio systems in which the audio devices are spatially distributed around the audio environment. Receive-side beamforming is one way around the previously-mentioned "near/far problem": for example, the control system 160 may be configured to use beamforming in order to compensate for a closer and/or louder audio device so as to receive audio device playback sound from a more distant and/or less loud audio device.

The receive-side beamforming may, for example, involve delaying and multiplying the signal from each microphone in the array of microphones by different factors. The beamformer 215A may, in some examples, apply a Dolph-Chebyshev weighting pattern. However, in other implementations beamformer 215A may apply a different weighting pattern. According to some such examples, a main lobe may be produced, together with nulls and sidelobes. As well as controlling the main lobe width (beamwidth) and the sidelobe levels, the position of a null can be controlled in some examples.

Sub-Audible Signals

According to some implementations, a DSSS signal component of audio device playback sound may not be audible to a person in the audio environment. In some such implementations, a content stream component of the audio device playback sound may cause perceptual masking of a DSSS signal component of the audio device playback sound.

Figure 5:
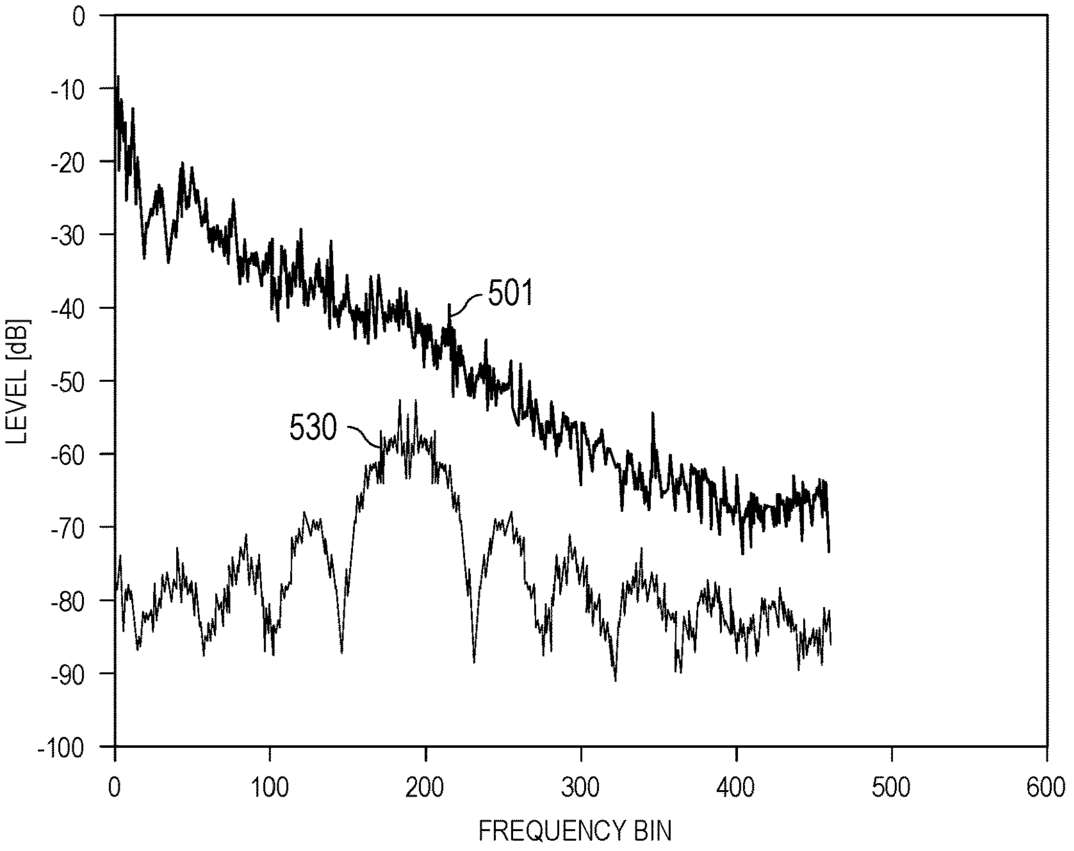
FIG. 5 is a graph that shows examples of the levels of a content stream component of the audio device playback sound and of a DSSS signal component of the audio device playback sound over a range of frequencies.

FIG. 5 is a graph that shows examples of the levels of a content stream component of the audio device playback sound and of a DSSS signal component of the audio device playback sound over a range of frequencies. In this example, the curve 501 corresponds to levels of the content stream component and the curve 530 corresponds to levels of the DSSS signal component.

A DSSS signal typically includes data, a carrier signal and a spreading code. If we omit the need to transmit data over a channel, then we can express the modulated signal s(t) as follows:

$$s(t)=AC(t)\sin(2\pi f_0 t)$$

In the foregoing equation, A represents the amplitude of the DSSS signal, C(t) represents the spreading code, and Sin( ) represents a sinusoidal carrier wave at a carrier wave frequency of $f_0$ Hz. The curve 530 in FIG. 5 corresponds to an example of s(t) in the equation above.

One of the potential advantages of some disclosed implementations involving acoustic DSSS signals is that by spreading the signal one can reduce the perceivability of the DSSS signal component of audio device playback sound, because the amplitude of the DSSS signal component is reduced for a given amount of energy in the acoustic DSSS signal.

This allows us to place the DSSS signal component of audio device playback sound (e.g., as represented by the curve 530 of FIG. 5) at a level sufficiently below the levels of the content stream component of the audio device playback sound (e.g., as represented by the curve 501 of FIG. 5) such that the DSSS signal component is not perceivable to a listener. Some disclosed implementations exploit the masking properties of the human auditory system to optimize the parameters of the DSSS signal in a way that maximises the signal-to-noise ratio (SNR) of the derived DSSS signal observations and/or reduces the probability of perception of the DSSS signal component. Some disclosed examples involve applying a weight to the levels of the content stream component and/or applying a weight to the levels of the DSSS signal component. Some such examples apply noise compensation methods, wherein the acoustic DSSS signal component is treated as the signal and the content stream component is treated as noise. Some such examples involve applying one or more weights according to (e.g., proportionally to) a play/listen objective metric.

DSSS Spreading Codes

As noted elsewhere herein, in some examples the DSSS information 205 provided by an orchestrating device (e.g., those provided by the orchestrating module 213A that is described above with reference to FIG. 3) may include one or more DSSS spreading code parameters.

The spreading codes used to spread the carrier wave in order to create the DSSS signal(s) are extremely important. The set of DSSS spreading codes is preferably selected so that the corresponding DSSS signals have the following properties:

1. A sharp main lobe in the autocorrelation waveform;
2. Low sidelobes at non-zero delays in the autocorrelation waveform;
3. Low cross-correlation between any two spreading codes within the set of spreading codes to be used if multiple devices are to access the medium simultaneously (e.g., to simultaneously play back modified audio playback signals that include a DSSS signal component); and
4. The DSSS signals are unbiased, (have zero DC component).

The family of spreading codes (e.g., Gold codes, which are commonly used in the GPS context) typically characterizes the above four points. If multiple audio devices are all playing back modified audio playback signals that include a DSSS signal component simultaneously and each audio device uses a different spreading code (with good cross-correlation properties, e.g., low cross-correlation), then a receiving audio device should be able to receive and process all of the acoustic DSSS signals simultaneously by using a code domain multiple access (CDMA) method. By using a CDMA method, multiple audio devices can send acoustic DSSS signals simultaneously, in some instances using a single frequency band. Spreading codes may be generated during run time and/or generated in advance and stored in a memory, e.g., in a data structure such as a lookup table.

To implement DSSS, in some examples binary phase shift keying (BPSK) modulation may be utilized. Furthermore, DSSS spreading codes may, in some examples, be placed in quadrature with one another (interplexed) to implement a quadrature phase shift keying (QPSK) system, e.g., as follows:

$$s(t)=A_I C_I(t)\cos(2\pi f_0 t)+A_Q C_Q(t)\sin(2\pi f_0 t)$$

In the foregoing equation, $A_I$ and $A_Q$ represent the amplitudes of the in-phase and quadrature signals, respectively, $C_I$ and $C_Q$ represent the code sequences of the in-phase and quadrature signals, respectively, and $f_0$ represents the centre frequency (8200) of the DSSS signal. The foregoing are examples of coefficients which parameterise the DSSS carrier and DSSS spreading codes according to some examples. These parameters are examples of the DSSS information 205 that is described above. As noted above, the DSSS information 205 may be provided by an orchestrating device, such as the orchestrating module 213A, and may be used, e.g., by the signal generator block 212 to generate DSSS signals.

Figure 6:
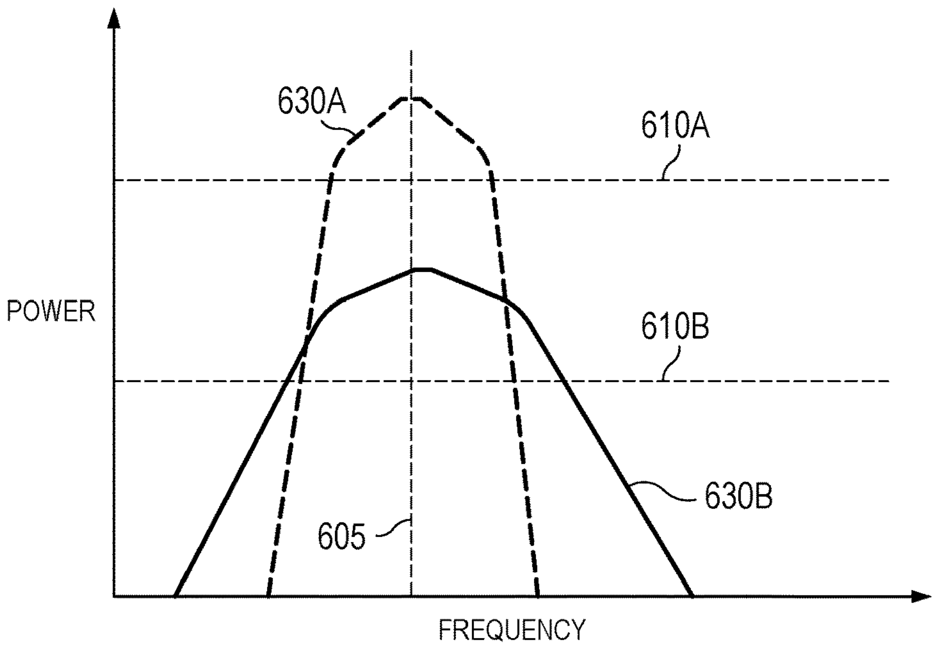
FIG. 6 is a graph that shows examples of the powers of two DSSS signals with different bandwidths but located at the same central frequency.

FIG. 6 is a graph that shows examples of the powers of two DSSS signals with different bandwidths but located at the same central frequency. In these examples, FIG. 6 shows the spectra of two DSSS signals 630A and 630B that are both centered on the same center frequency 605. In some examples, the DSSS signal 630A may be produced by one audio device of an audio environment (e.g., by the audio device 100A) and the DSSS signal 630B may be produced by another audio device of the audio environment (e.g., by the audio device 100B).

According to this example, the DSSS signal 630B is chipped at a higher rate (in other words, a greater number of bits per second are used in the spreading signal) than the DSSS signal 630A, resulting in the bandwidth 610B of the DSSS signal 630B being larger than the bandwidth 610A of the DSSS signal 630A. For a given amount of energy for each DSSS signal, the larger bandwidth of the DSSS signal 630B results in the amplitude and perceivability of the DSSS signal 630B being relatively lower than those of the DSSS signal 630A. A higher-bandwidth DSSS signal also results in higher delay-resolution of the baseband data products, leading to higher-resolution estimates of acoustic scene metrics that are based on the DSSS signal (such as time of flight estimates, a time of arrival (ToA) estimates, range estimates, direction of arrival (DoA) estimates, etc.). However, a higher-bandwidth DSSS signal also increases the noise-bandwidth of the receiver, thereby reducing the SNR of the extracted acoustic scene metrics. Moreover, if the bandwidth of a DSSS signal is too large, coherence and fading issues associated with the DSSS signal may become present.

The length of the spreading code used to generate a DSSS signal limits the amount of cross-correlation rejection. For example, a 10 bit Gold code has just −26 dB rejection of an adjacent code. This may give rise to an instance of the above-described near/far problem, in which a relatively low-amplitude signal may be obscured by the cross correlation noise of another louder signal. Some of the novelty of the systems and methods described in this disclosure involves orchestration schemes that are designed to mitigate or avoid such problems.

Orchestration Methods

Figure 7:
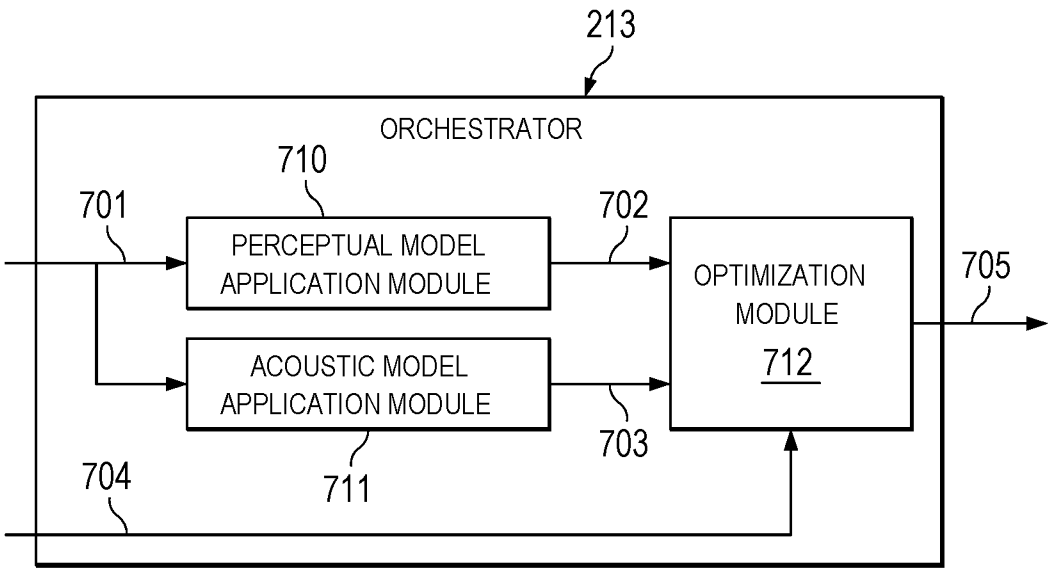
FIG. 7 shows elements of an orchestrating module according to one example.

FIG. 7 shows elements of an orchestrating module according to one example. As with other figures provided herein, the types and numbers of elements shown in FIG. 7 are merely provided by way of example. Other implementations may include more, fewer and/or different types and numbers of elements. According to some examples, the orchestrating module 213 may be implemented by an instance of the apparatus 150 that is described above with reference to FIG. 1B. In some such examples, the orchestrating module 213 may be implemented by an instance of the control system 160 In some examples, the orchestrating module 213 may be an instance of the orchestrating module that is described above with reference to FIG. 3. In some such examples, According to this implementation, the orchestrating module 213 includes a perceptual model application module 710, an acoustic model application module 711 and an optimization module 712.

In this example, the perceptual model application module 710 is configured to apply a model of the human auditory system in order to make one or more perceptual impact estimates 702 of the perceptual impact of acoustic DSSS signals on a listener in an acoustic space, based at least in part on the a priori information 701. The acoustic space may, for example, be an audio environment in which audio devices that the orchestrating module 213 will be orchestrating are located, a room of such an audio environment, etc. The estimate(s) 702 may change over time. The perceptual impact estimate(s) 702 may, in some examples, be an estimate of a listener's ability to perceive the acoustic DSSS signals, e.g., based on a type and level of audio content (if any) currently being played back in the acoustic space. The perceptual model application module 710 may, for example, be configured to apply one or more models of auditory masking, such as masking as a function of frequency and loudness, spatial auditory masking, etc. The perceptual model application module 710 may, for example, be configured to apply one or more models of human loudness perception, e.g., human loudness perception as a function of frequency.

According to some examples, the a priori information 701 may be, or may include, information that is relevant to an acoustic space, information that is relevant to the transmission of acoustic DSSS signals in the acoustic space and/or information that is relevant to a listener known to use the acoustic space. For example, the a priori information 701 may include information regarding the number of audio devices (e.g., of orchestrated audio devices) in the acoustic space, the locations of the audio devices, the loudspeaker system and/or microphone system capabilities of the audio devices, information relating to the impulse response of the audio environment, information regarding one or more doors and/or windows of the audio environment, information regarding audio content currently being played back in the acoustic space, etc. In some instances, the a priori information 701 may include information regarding the hearing abilities of one or more listeners.

In this implementation, the acoustic model application module 711 is configured to make one or more acoustic DSSS signal performance estimates 703 for the acoustic DSSS signals in the acoustic space, based at least in part on the a priori information 701. For example, the acoustic model application module 711 may be configured to estimate how well the microphone systems of each of the audio devices are able to detect the acoustic DSSS signals from the other audio devices in the acoustic space, which may be referred to herein as one aspect of "mutual audibility" of the audio devices. Such mutual audibility may, in some instances, have been an acoustic scene metric that was previously estimated by a baseband processor, based at least in part on previously-received acoustic DSSS signals. In some such implementations, the mutual audibility estimate may be part of the a priori information 701 and, in some such implementations, the orchestrating module 213 may not include the acoustic model application module 711. However, in some implementations the mutual audibility estimate may be made independently by the acoustic model application module 711.

In this example, the optimization module 712 is configured to determine DSSS parameters 705 for all audio devices being orchestrated by the orchestrating module 213 based, at least in part, on the perceptual impact estimate(s) 702 and the acoustic DSSS signal performance estimates 703 and the current play/listen objective information 704. The current play/listen objective information 704 may, for example, indicate the relative need for new acoustic scene metrics based on acoustic DSSS signals.

For example, if one or more audio devices are being newly powered on in the acoustic space, there may be a high level of need for new acoustic scene metrics relating to audio device auto-location, audio device mutual audibility, etc. At least some of the new acoustic scene metrics may be based on acoustic DSSS signals. Similarly, if an existing audio device has been moved within the acoustic space, there may be a high level of need for new acoustic scene metrics. Likewise, if a new noise source is in or near the acoustic space, there may be a high level of need for determining new acoustic scene metrics.

If the current play/listen objective information 704 indicates that there is a high level of need for determining new acoustic scene metrics, the optimization module 712 may be configured to determine DSSS parameters 705 by placing a relatively higher weight on the acoustic DSSS signal performance estimate(s) 703 than on the perceptual impact estimate(s) 702. For example, the optimization module 712 may be configured to determine DSSS parameters 705 by emphasizing on the ability of the system to produce high SNR observations of acoustic DSSS signals and de-emphasizing on the impact/perceivability of the acoustic DSSS signals by the user. In some such examples, the DSSS parameters 705 may correspond to audible acoustic DSSS signals.

However, if there has been no detected recent change in or near the acoustic space and there has been at least initial estimate of one or more acoustic scene metrics, there may not be a high level of need for new acoustic scene metrics. If there has been no detected recent change in or near the acoustic space, there has been at least initial estimate of one or more acoustic scene metrics and audio content is currently being reproduced within the acoustic space, the relative importance of immediately estimating one or more new acoustic scene metrics may be further diminished.

If the current play/listen objective information 704 indicates that there is a low level of need for determining new acoustic scene metrics, the optimization module 712 may be configured to determine DSSS parameters 705 by placing a relatively lower weight on the acoustic DSSS signal performance estimate(s) 703 than on the perceptual impact estimate(s) 702. In such examples, the optimization module 712 may be configured to determine DSSS parameters 705 by de-emphasizing on the ability of the system to produce high SNR observations of acoustic DSSS signals and emphasizing the impact/perceivability of the acoustic DSSS signals by the user. In some such examples, the DSSS parameters 705 may correspond to sub-audible acoustic DSSS signals.

As described later in this document (e.g., in other examples of audio device orchestration) the parameters of the acoustic DSSS signals provide a rich diversity in the way that an orchestrating device can modify the acoustic DSSS signals in order to enhance the performance of an audio system.

Figure 8:
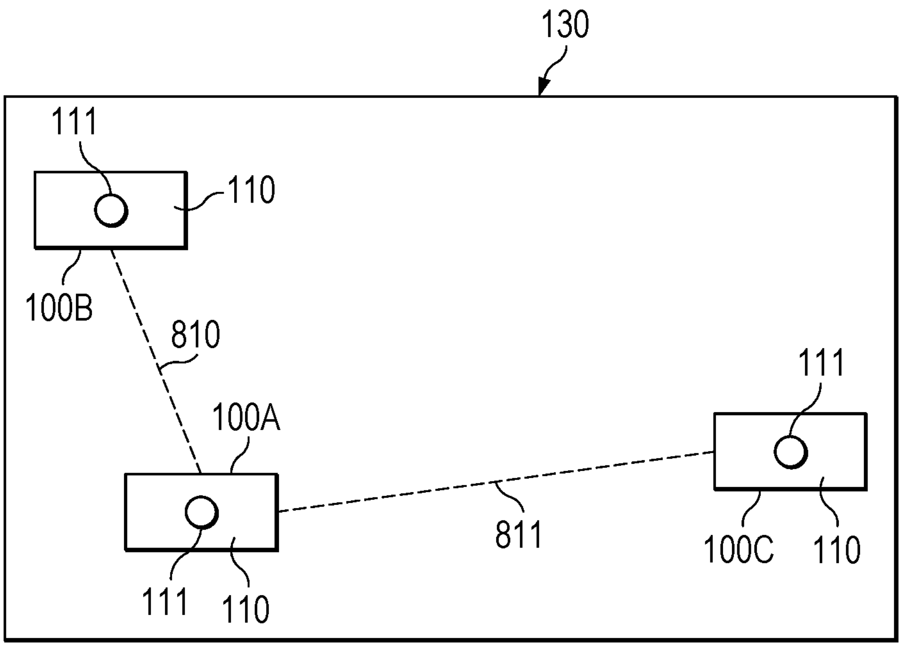
FIG. 8 shows another example of an audio environment.

FIG. 8 shows another example of an audio environment. In FIG. 8, audio devices 100B and 100C are separated from device 100A by distances 810 and 811, respectively. In this particular situation, distance 811 is larger than distance 810. Assuming that audio devices 100B and 100C are producing audio device playback sound at approximately the same levels, this means that audio device 100A receives the acoustic DSSS signals from audio device 100C at a lower level than the acoustic DSSS signals from audio device 100B, due to the additional acoustic loss caused by the longer distance 811. In some embodiments, audio devices 100B and 100C may be orchestrated in order to enhance the ability of the audio device 100A to extract acoustic DSSS signals and to determine acoustic scene metrics based on the acoustic DSSS signals.

Figure 9:
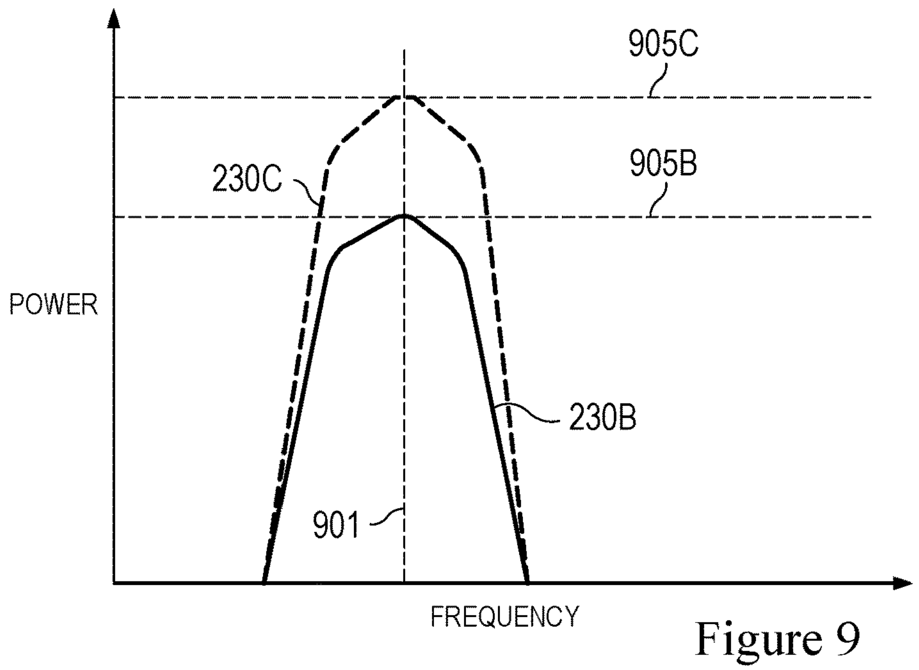
FIG. 9 shows examples of the main lobes of acoustic DSSS signals produced by the audio devices 100B and 100C of FIG. 8.

FIG. 9 shows examples of the main lobes of acoustic DSSS signals produced by the audio devices 100B and 100C of FIG. 8. In this example, these acoustic DSSS signals have the same bandwidth and are located at the same frequency, but have different amplitudes. Here, the main lobe of the acoustic DSSS signal 230B is produced by the audio device 100B and the main lobe of the acoustic DSSS signal 230C is produced by the audio device 100C. According to this example, the peak power of the acoustic DSSS signal 230B is 905B and the peak power of the acoustic DSSS signal 230C is 905C. Here, the acoustic DSSS signal 230B the acoustic DSSS signal 230C have the same central frequency 901.

In this example, an orchestrating device (which may in some examples include an instance of the orchestrating module 213 of FIG. 7 and which may in some instances be the audio device 100A of FIG. 8) has enhanced the ability of the audio device 100A to extract acoustic DSSS signals by equalizing the digital level of the acoustic DSSS signals produced by the audio devices 100B and 100C, such that the peak power of the acoustic DSSS signal 230C is larger than the peak power of the acoustic DSSS signal 230B by a factor that offsets the difference in the acoustic losses due to the difference in the distances 810 and 811. Therefore, according to this example, the audio device 100A receives the acoustic DSSS signals 230B from audio device 100C at approximately the same level as the acoustic DSSS signals received from audio device 100B, due to the additional acoustic loss caused by the longer distance 811.

The area of a surface around a point sound source increases with the square of the distance from the source. This means that the same sound energy from the source is distributed over a larger area and the energy intensity reduces with the square of the distance from the source, according to the Inverse Square Law. Setting distance 810 to b and distance 811 to c, the sound energy received by audio device 100A from audio device 100B is proportional to $1/b^2$ and the sound energy received by audio device 100A from audio device 100C is proportional to $1/c^2$. The difference in sound energies is proportional to $1/(c^2-b^2)$. Accordingly, in some implementations the orchestrating device may cause the energy produced by the audio device 100C to be multiplied $(c^2-b^2)$. This is an example of how the DSSS parameters can be altered to enhance performance In some implementations, the optimization process may be more complex and may take into account more factors than the Inverse Square Law. In some examples, equalizations may be done via a full-band gain applied to the DSSS signal or via an equalization (EQ) curve which enables the equalization of non-flat (frequency-dependent) responses of the microphone system 110A.

Figure 10:
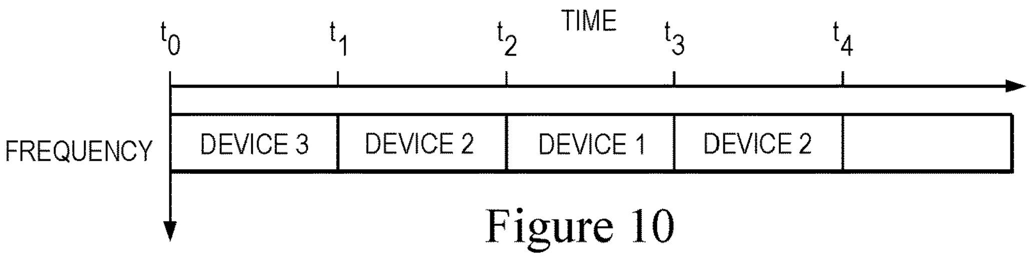
FIG. 10 is a graph that provides an example of a time domain multiple access (TDMA) method.

FIG. 10 is a graph that provides an example of a time domain multiple access (TDMA) method. One way to avoid the near/far problem is to orchestrate a plurality of audio devices that are transmitting and receiving acoustic DSSS signals such that different time slots are scheduled for each audio device to play its acoustic DSSS signal. This is known as a TDMA method. In the example shown in FIG. 10, an orchestrating device is causing audio devices 1, 2 and 3 to emit acoustic DSSS signals according to a TDMA method. In this example, audio devices 1, 2 and 3 emit acoustic DSSS signals in the same frequency band. According to this example, the orchestrating device causes audio device 3 to emit acoustic DSSS signals from time to until time $t_1$, after which the orchestrating device causes audio device 2 to emit acoustic DSSS signals from time $t_1$ until time $t_2$, after which the orchestrating device causes audio device 1 to emit acoustic DSSS signals from time $t_2$ until time $t_3$, and so on.

Accordingly, in this example, no two DSSS signals are being transmitted or received at the same time. Therefore, the remaining DSSS signal parameters such as amplitude, bandwidth and length (so long that each DSSS signal remains within its allocated time slot) are not relevant for multiple access. However, such DSSS signal parameters do remain relevant to the quality of the observations extracted from the DSSS signals.

Figure 11:
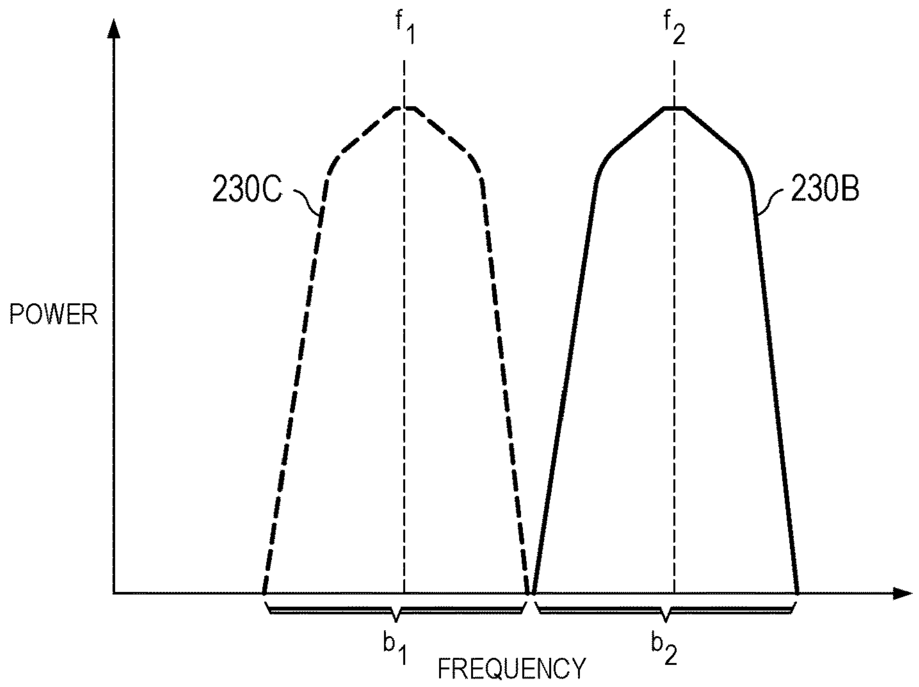
FIG. 11 is a graph that shows an example of a frequency domain multiple access (FDMA) method.

FIG. 11 is a graph that shows an example of a frequency domain multiple access (FDMA) method. In some implementations (e.g., due to the limited bandwidth of the DSSS signals), an orchestrating device may be configured to cause an audio device to simultaneously receive acoustic DSSS signals from two other audio devices in an audio environment. In some such examples, the acoustic DSSS signals are significantly different in received power levels if each audio device transmitting the acoustic DSSS signals plays its respective acoustic DSSS signals in different frequency bands. This is an FDMA method. In the FDMA method example shown in FIG. 11, the main lobes of DSSS signals 230B and 230C are being transmitted by different audio devices at the same time, but with different center frequencies ($f_1$ and $f_2$) and in different frequency bands ($b_1$ and $b_2$). In this example, the frequency bands $b_1$ and $b_2$ of the main lobes do not overlap. Such FDMA methods may be advantageous for situations in which acoustic DSSS signals have large differences in the acoustic losses associated with their paths.

In some implementations, an orchestrating device may be configured to vary an FDMA, TDMA or CDMA method in order to mitigate the near/far problem. In some examples, the length of the DSSS spreading codes may be altered in accordance with the relative audibility of the devices in the room. As noted above with reference to FIG. 6, given the same amount of energy in the acoustic DSSS signal, if a spreading code increases the bandwidth of an acoustic DSSS signal, the acoustic DSSS signal will have a relatively lower maximum power and will be relatively less audible. Alternatively, or additionally, in some implementations DSSS signals may be placed in quadrature with one another. Such implementations allow a system to simultaneously have DSSS signals with different spreading code lengths. Alternatively, or additionally, in some implementations the energy in each DSSS signal may be modified in order to reduce the impact of the near/far problem (e.g., to boost the level of an acoustic DSSS signal produced by a relatively less loud and/or more distant transmitting audio device) and/or obtain an optimal signal-to-noise ratio for a given operational objective.

Figure 12:
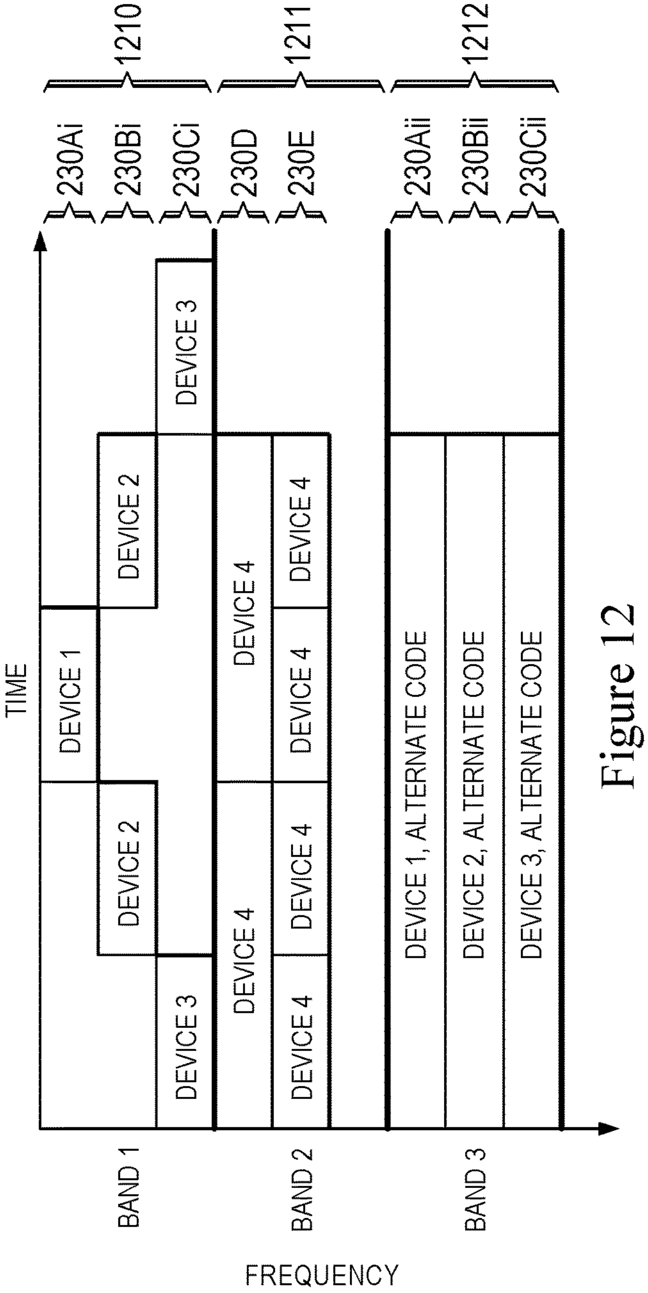
FIG. 12 is a graph that shows another example of an orchestration method.

FIG. 12 is a graph that shows another example of an orchestration method. The elements of FIG. 12 are as follows:

- 1210, 1211 and 1212: Frequency bands that do not overlap with one another;
- 230Ai, Bi and Ci: A plurality of acoustic DSSS signals that are time-domain multiplexed within frequency band 1210. Although it may appear that audio devices 1, 2 and 3 are using different portions of frequency band 1210, in this example the main lobes of acoustic DSSS signals 230Ai, Bi and Ci extend across most or all of frequency band 1210;

230D and E: A plurality of acoustic DSSS signals that are code-domain multiplexed within frequency band 1211. Although it may appear that audio devices 4 and 5 are using different portions of frequency band 1211, in this example the main lobes of acoustic DSSS signals 230D and 230E extend across most or all of frequency band 1211; and

230Aii, Bii and Cii: A plurality of acoustic DSSS signals that are code-domain multiplexed within frequency band 1212. Although it may appear that audio devices 1, 2 and 3 are using different portions of frequency band 1210, in this example the main lobes of acoustic DSSS signals 230Aii, Bii and Cii extend across most or all of frequency band 1212.

FIG. 12 shows an example of how TDMA, FDMA and CDMA may be used together in certain implementations of the invention. In frequency band 1 (1210), TDMA is used to orchestrate acoustic DSSS signals 230Ai, Bi and Ci transmitted by audio devices 1-3 respectively. Frequency band 1210 is a single frequency band wherein acoustic DSSS signals 230Ai, Bi and Ci cannot fit within simultaneously without overlapping.

In frequency band 2 (1211), CDMA is used to orchestrate acoustic DSSS signals 230D and E from audio devices 4 and 5 respectively. In this particular example, acoustic DSSS signal 230D has been generated by using a longer DSSS spreading code than the DSSS spreading code used to generate acoustic DSSS signal 230E. A shorter DSSS spreading code duration for audio device 5 could be useful if audio device 5 is louder than audio device 4, from the perspective of the receiving audio device, because the shorter DSSS spreading code duration would increase the bandwidth and lower the peak frequency of the resulting DSSS signal. The signal-to-noise ratio (SNR) also may be improved with the relatively longer DSSS spreading code duration of the acoustic DSSS signal 230D.

In frequency band 3 (1212), CDMA is used to orchestrate acoustic DSSS signals 230Aii, Bii and Cii transmitted by audio devices 1-3, respectively. These acoustic DSSS signals are alternate codes transmitted by audio devices 1-3, which are simultaneously transmitting TDMA-orchestrated acoustic DSSS signals for the same audio devices in frequency band 1210. This is a form of FDMA in which longer spreading codes are placed within one frequency band (1212) and are transmitted simultaneously (no TDMA) while shorter spreading codes are placed within another frequency band (1210) in which TDMA is used.

Figure 13:
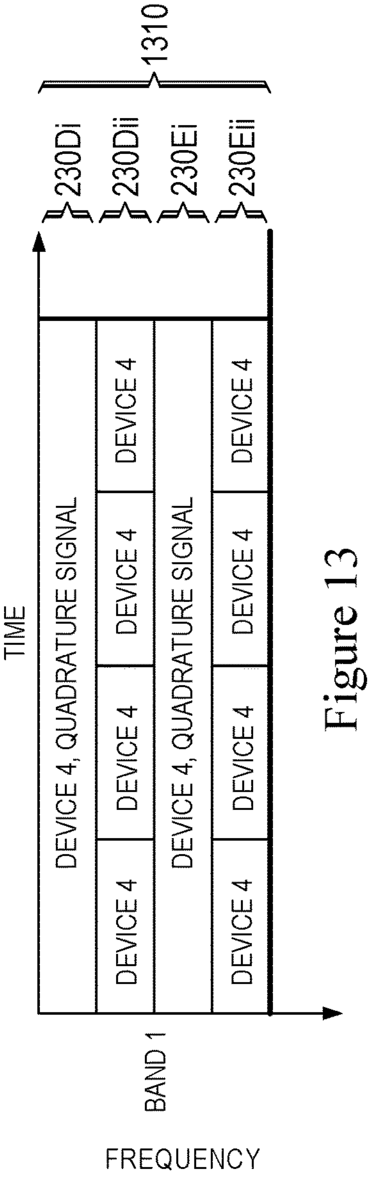
FIG. 13 is a graph that shows another example of an orchestration method.

FIG. 13 is a graph that shows another example of an orchestration method. According to this implementation, audio device 4 is transmitting acoustic DSSS signals 230Di and 230Dii, which are in quadrature with one another, while audio device 5 is transmitting acoustic DSSS signals 230Ei and 230Eii, which are also in quadrature with one another. According to this example, all acoustic DSSS signals are transmitted within a single frequency band 1310 simultaneously. In this instance, the quadrature acoustic DSSS signals 230Di and 230Ei are longer than the in-phase codes 230Dii and 230Eii transmitted by the two audio devices. This results in each audio device having a faster and noisier set of observations derived from acoustic DSSS signals 230Dii and 230Eii in addition to a higher SNR set of observations derived from acoustic DSSS signals 230Di and 230Ei, albeit it at a lower update rate. This is an example of a CDMA-based orchestration method wherein the two audio devices are transmitting acoustic DSSS signals which are designed for the acoustic space the two audio devices are sharing. In some instances, the orchestration method may also be based, at least in part, on a current listening objective.

Figure 14:
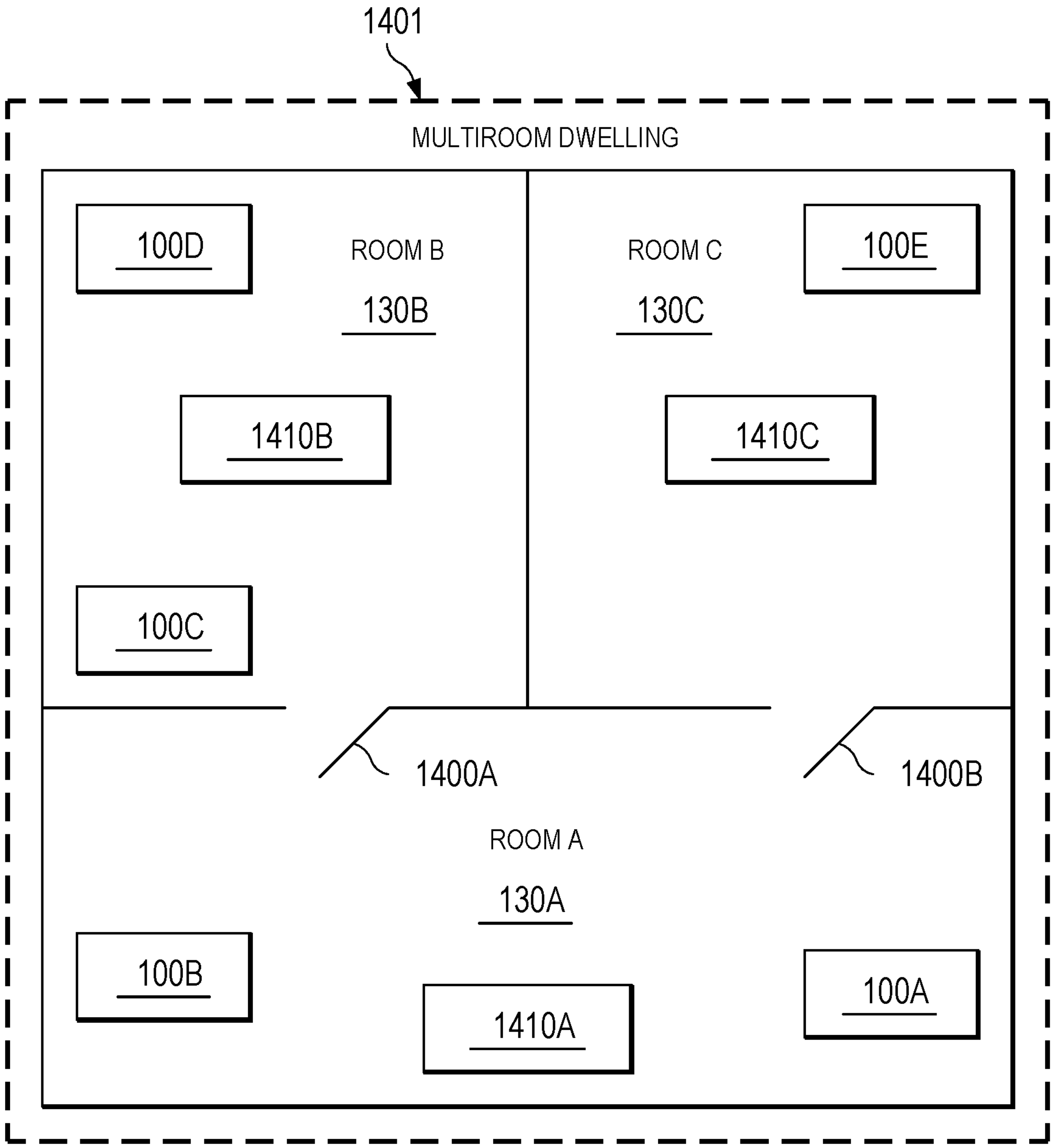
FIG. 14 shows elements of an audio environment according to another example.

FIG. 14 shows elements of an audio environment according to another example. In this example, the audio environment 1401 is a multi-room dwelling that includes acoustic spaces 130A, 130B and 130C. According to this example, doors 1400A and 1400B can change the coupling of each acoustic space. For example, if the door 1400A is open, acoustic spaces 130A and 130C are acoustically coupled, at least to some degree, whereas if the door 1400A is closed, acoustic spaces 130A and 130C are not acoustically coupled to any significant degree. In some implementations, an orchestrating device may be configured to detect a door being opened (or another acoustic obstruction being moved) according to the detection, or lack thereof, of audio device playback sound in an adjacent acoustic space.

In some examples, an orchestrating device may orchestrate all of the audio devices 100A-100E, in all of the acoustic spaces 130A, 130B and 130C. However, because of the significant level of acoustic isolation between the acoustic spaces 130A, 130B and 130C when the doors 1400A and 1400B are closed, the orchestrating device may, in some examples, can treat the acoustic spaces 130A, 130B and 130C as independent when the doors 1400A and 1400B are closed. In some examples, the orchestrating device may treat the acoustic spaces 130A, 130B and 130C as independent even when the doors 1400A and 1400B are open. However, in some instances the orchestrating device may manage audio devices that are located close to the doors 1400A and/or 1400B such that when the acoustic spaces are coupled due to a door opening, an audio device close to an open door is treated as being an audio device corresponding to the rooms on both sides of the door. For example, if the orchestrating device determines that the door 1400A is open, the orchestrating device may be configured to consider the audio device 100C to be an audio device of the acoustic space 130A and also to be an audio device of the acoustic space 130C.

Figure 15:
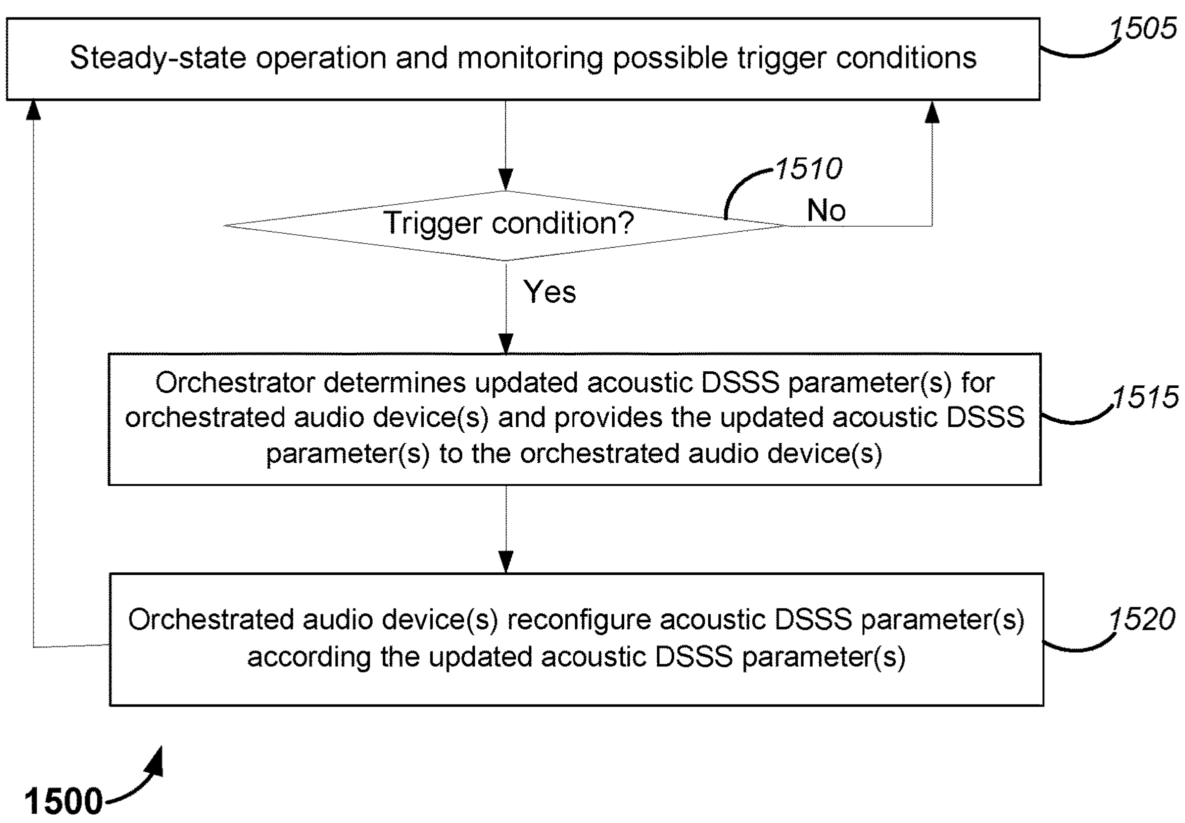
FIG. 15 is a flow diagram that outlines another example of a disclosed audio device orchestration method.

FIG. 15 is a flow diagram that outlines another example of a disclosed audio device orchestration method. The blocks of method 1500, like other methods described herein, are not necessarily performed in the order indicated. Moreover, such methods may include more or fewer blocks than shown and/or described. The method 1500 may be performed by a system that includes an orchestrating device and orchestrated audio devices. The system may include instances of the apparatus 150 that is shown in FIG. 1B and described above, one of which is configured as an orchestrating device. The orchestrating device may, in some examples, include an instance of the orchestration module 213 that is disclosed herein.

According to this example, block 1505 involves steady-state operation of all participating audio devices. In this context, "steady-state" operation means operation according to the set of parameters that was most recently received from the orchestrating device. According to this implementation, the set of parameters includes one or more DSSS spreading code parameters and one or more DSSS carrier wave parameters.

In this example, block 1505 also involves one or more devices waiting for a trigger condition. The trigger condition may, for example, be an acoustic change in the audio environment in which the orchestrated audio devices are located. The acoustic change may be, or may include, noise from a noise source, a change corresponding to an opened or closed door or window (e.g., increased or decreased audibility of playback sound from one or more loudspeakers in an adjacent room), a detected movement of an audio device in the audio environment, a detected movement of a person in the audio environment, a detected utterance (e.g. of a wakeword) of a person in the audio environment, the beginning of audio content playback (e.g., the start of a movie, of a television program, of musical content, etc.), a change in audio content playback (e.g., a volume change equal to or greater than a threshold change in decibels), etc. In some instances, the acoustic change be detected via acoustic DSSS signals, e.g., as disclosed herein (e.g., one or more acoustic scene metrics 225A estimated by a baseband processor 218 of an audio device in the audio environment).

In some instances, the trigger condition may be an indication that a new audio device has been powered on in the audio environment. In some such examples, the new audio device may be configured to produce one or more characteristic sounds, which may or may not be audible to a human being. According to some examples, the new audio device may be configured to play back an acoustic DSSS signal according to a type of DSSS spreading code that is reserved for new devices. Some examples of reserved DSSS spreading codes are described below.

In this example, it is determined in block 1510 whether a trigger condition has been detected. If so, the process proceeds to block 1515. If not, the process reverts to block 1505. In some implementations, block 1505 may include block 1510.

According to this example, block 1515 involves determining, by the orchestrating device, one or more updated acoustic DSSS parameters for one or more (in some instance, all) of the orchestrated audio devices and providing the updated acoustic DSSS parameter(s) to the orchestrated audio device(s). In some examples, block 1515 may involve providing, by the orchestrating device, the DSSS information 205 that is described elsewhere herein. The determination of the updated acoustic DSSS parameter(s) may involve using existing knowledge and estimates of the acoustic space such as:

- Device positions;
- Device ranges;
- Device orientations and relative incidence angles;
- The relative clock biases and skews between devices;
- The relative audibility of the devices;
- A room noise estimate;
- The number of microphones and loudspeakers in each device;
- The directionality of each device's loudspeakers;
- The directionality of each device's microphones;
- The type of content being rendered into the acoustic space;
- The location of one or more listeners in the acoustic space; and/or
  - Knowledge of the acoustic space including specular reflections and occlusions.

Such factors may, in some examples, be combined with an operational objective to determine the new operating points. Note that many of these parameters used as existing knowledge in determining the updated DSSS parameters can, in turn, be derived from acoustic DSSS parameters. Therefore, one may readily understand that an orchestrated acoustic DSSS system can, in some examples, iteratively improve its performance as the system obtains more information, more accurate information, etc.

In this example, block 1520 involves reconfiguring, by one or more orchestrated audio devices, one or more parameters used to generate acoustic DSSS signals according to the updated acoustic DSSS parameter(s) received from the orchestrating device. According to this implementation, after block 1520 is completed, the process reverts to block 1505. Although no end is shown to the flow diagram of FIG. 15, the method 1500 may end in various ways, e.g., when the audio devices are powered down.

Figure 16:
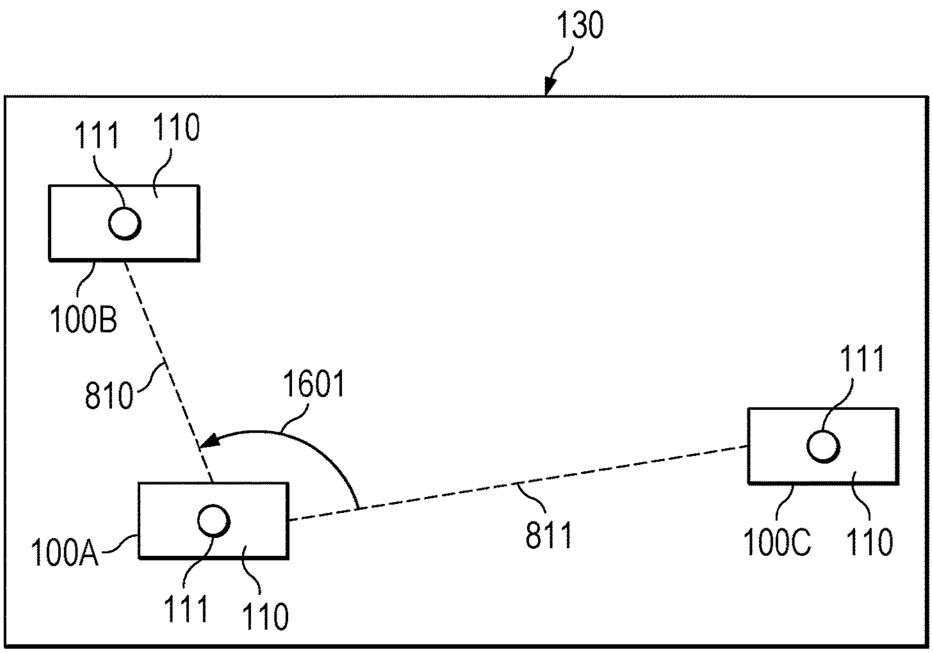
FIG. 16 shows another example of an audio environment.

FIG. 16 shows another example of an audio environment. The audio environment 130 that is shown in FIG. 16 is the same as that shown in FIG. 8, but also shows the angular separation of audio device 100B from that of audio device 100C, from the perspective of (relative to) the audio device 100A. In FIG. 16, audio devices 100B and 100C are separated from device 100A by distances 810 and 811, respectively. In this particular situation, distance 811 is larger than distance 810. Assuming that audio devices 100B and 100C are producing audio device playback sound at approximately the same levels, this means that audio device 100A receives the acoustic DSSS signals from audio device 100C at a lower level than the acoustic DSSS signals from audio device 100B, due to the additional acoustic loss caused by the longer distance 811.

In this example, we are focused on the orchestration of devices 100B and 100C to optimize the ability of device 100A to hear both of them. There are other factors to consider, as outlined above, but this example is focused on the angle of arrival diversity caused by the angular separation of audio device 100B from that of audio device 100C, relative to the audio device 100A. Due to the difference in distances 810 and 811, orchestration may result in the code lengths of audio devices 100B and 100C being set to be longer to mitigate the near-far problem by reducing the cross channel correlation. However, if a receive-side beamformer (215) were implemented by the audio device 100A, then the near/far problem is somewhat mitigated because the angular separation between audio devices 100B and 100C places the microphone signals corresponding to sound from audio devices 100B and 100C in different lobes and provides additional separation of the two received signals. Thus, this additional separation may allow the orchestrating device to reduce the acoustic DSSS spreading code length and obtain observations at a faster rate.

This does not only apply to the acoustic DSSS spreading code length. Any acoustic DSSS parameter which can be altered to mitigate the near-far problem (e.g., even using FDMA or TDMA) may no longer be necessary when the spatial microphone feeds are used by audio device 100A (and/or audio devices 100B and 100C) instead of omnidirectional microphone feeds.

Orchestration according to spatial means (in this case angular diversity) depends upon estimates of these properties already being available. In one example, the DSSS parameters may be optimized for omnidirectional microphone feeds (206) and then after DoA estimates are available, the acoustic DSSS parameters may be optimized for spatial microphone feeds. This is one realization of a trigger condition that is described above with reference to FIG.

Figure 17:
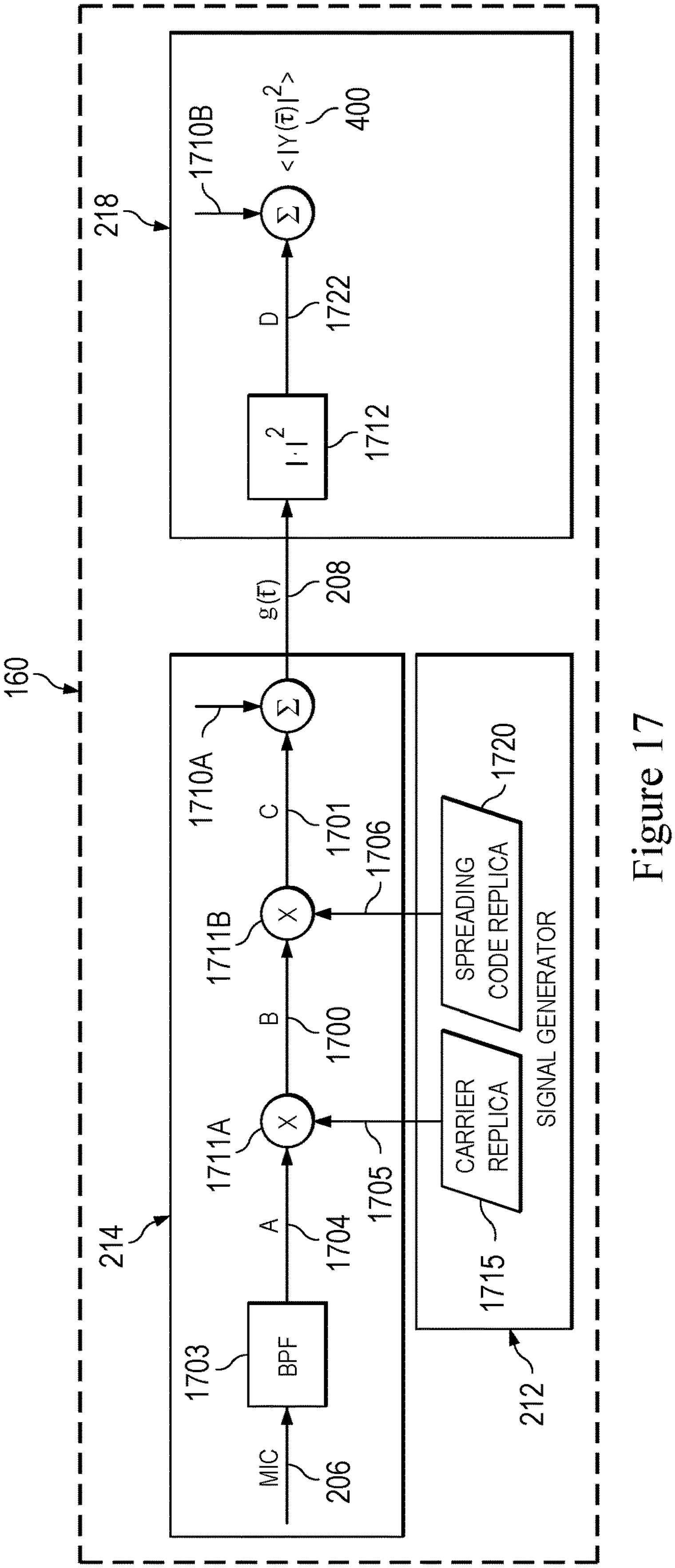
FIG. 17 is a block diagram that shows examples of DSSS signal demodulator elements, baseband processor elements and DSSS signal generator elements according to some disclosed implementations.

FIG. 17 is a block diagram that shows examples of DSSS signal demodulator elements, baseband processor elements and DSSS signal generator elements according to some disclosed implementations. As with other figures provided herein, the types and numbers of elements shown in FIG. 17 are merely provided by way of example. Other implementations may include more, fewer and/or different types and numbers of elements. Other examples may implement other methods, such as frequency domain correlation. In this example, the DSSS signal demodulator 214, the baseband processor 218 and the DSSS signal generator 212 are implemented by an instance of the control system 160 that is described above with reference to FIG. 1B.

According to some implementations, there is one instance of the DSSS signal demodulator 214, the baseband processor 218 and the DSSS signal generator 212 for each transmitted (played back) acoustic DSSS signal, from each audio device for which acoustic DSSS signals will be received. In other words, for the implementation shown in FIG. 16, the audio device 100A would implement one instance of the DSSS signal demodulator 214, the baseband processor 218 and the DSSS signal generator 212 corresponding to acoustic DSSS signals received from the audio device 100B and one instance of the DSSS signal demodulator 214, the baseband processor 218 and the DSSS signal generator 212 corresponding to acoustic DSSS signals received from the audio device 100C.

For the purpose of illustration, the following description of FIG. 17 will continue to use this example of audio device 100A of FIG. 16 as the local device that is implementing instances of the DSSS signal demodulator 214, the baseband processor 218 and the DSSS signal generator 212. More specifically, the following description of FIG. 17 will assume that the microphone signals 206 received by the DSSS signal demodulator 214 include playback sound produced by loudspeakers of the audio device 100B that include acoustic DSSS signals produced by the audio device 100B, and that the instances of the DSSS signal demodulator 214, the baseband processor 218 and the DSSS signal generator 212 shown in FIG. 17 correspond to the acoustic DSSS signals played back by loudspeakers of the audio device 100B.

According to this implementation, the DSSS signal generator 212 includes an acoustic DSSS carrier wave module 1715 configured to provide the DSSS signal demodulator 214 with a DSSS carrier wave replica 1705 of the DSSS carrier wave that is being used by the audio device 100B to produce its acoustic DSSS signals. In some alternative implementations, the acoustic DSSS carrier wave module 1715 may be configured to provide the DSSS signal demodulator 214 with one or more DSSS carrier wave parameters being used by the audio device 100B to produce its acoustic DSSS signals.

In this implementation, the DSSS signal generator 212 also includes an acoustic DSSS spreading code module 1720 configured to provide the DSSS signal demodulator 214 with the DSSS spreading code 1706 being used by the audio device 100B to produce its acoustic DSSS signals. The DSSS spreading code 1706 corresponds to the spreading code C(t) in the equations disclosed herein. The DSSS spreading code 1706 may, for example, be a pseudo-random number (PRN) sequence.

According to this implementation, the DSSS signal demodulator 214 includes a bandpass filter 1703 that is configured to produce band pass filtered microphone signals 1704 from the received microphone signals 206. In some instances, the pass band of the bandpass filter 1703 may be centered at the center frequency of the acoustic DSSS signal from audio device 100B that is being processed by the DSSS signal demodulator 214. The passband filter 1703 may, for example, pass the main lobe of the acoustic DSSS signal. In some examples, the pass band of the passband filter 1703 may be equal to the frequency band for transmission of the acoustic DSSS signal from audio device 100B.

In this example, the DSSS signal demodulator 214 includes a multiplication block 1711A that is configured to convolve the band pass filtered microphone signals 1704 with the DSSS carrier wave replica 1705, to produce the baseband signals 1700. According to this implementation, the DSSS signal demodulator 214 also includes a multiplication block 1711B that is configured to apply the DSSS spreading code 1706 to the baseband signals 1700, to produce the de-spread baseband signals 1701.

According to this example, the DSSS signal demodulator 214 includes an accumulator 1710A and the baseband processor 218 includes an accumulator 1710B. The accumulators 1710A and 1710B also may be referred to herein as summation elements. The accumulator 1710A operates during a time, which may be referred to herein as the "coherent time," that corresponds with the code length for each acoustic DSSS signal (in this example, the code length for the acoustic DSSS signal currently being played back by the audio device 100B). In this example, the accumulator 1710A implements an "integrate and dump" process; in other words, after summing the de-spread baseband signals 1701 for the coherent time, the accumulator 1710A outputs ("dumps") the demodulated coherent baseband signal 208 to the baseband processor 218. In some implementations, the demodulated coherent baseband signal 208 may be a single number.

In this example, the baseband processor 218 includes a square law module 1712, which in this example is configured to square the absolute value of the demodulated coherent baseband signal 208 and to output the power signal 1722 to the accumulator 1710B. After the absolute value and squaring processes, the power signal may be regarded as an incoherent signal. In this example, the accumulator 1710B operates over an "incoherent time." The incoherent time may, in some examples, be based on input from an orchestrating device. The incoherent time may, in some examples, be based on a desired SNR. According to this example, the accumulator 1710B outputs a delay waveform 400 at a plurality of delays (also referred to herein as "taus," or instances of tau (τ)).

One can express the stages from 1704 to 208 in FIG. 17 as follows:

$$Y(\tilde{\tau}) = \sum_{n=0}^{N_i-1} d[n]\ CA\ [\tilde{\tau} + n]e^{-j2\pi n f_o / f_s}$$

In the foregoing equation, Y(tau) represents the coherent demodulator output (208), Mill represents the bandpass filtered signal (1704 or A in FIG. 17), CA represents a local copy of spreading the code used to modulate the DSSS signal by the far-device in the room (in this example, audio device 100B) and the final term is a carrier signal. In some examples, all of these signal parameters are orchestrated between audio devices in the audio environment (e.g., may be determined and provided by an orchestrating device).

The signal chain in FIG. 17 from Y(tau) (208) to <Y(tau)> (400) is incoherent integration, wherein the coherent demodulator output is squared and averaged. The number of averages (the number of times that the incoherent accumulator 1710B runs) is a parameter that may, in some examples, be determined and provided by an orchestrating device, e.g., based on a determination that sufficient SNR has been achieved. In some instances, an audio device that is implementing the baseband processor 218 may determine the number of averages, e.g., based on a determination that sufficient SNR has been achieved.

Incoherent integration can be mathematically expressed as follows:

$$\left\langle \left| Y(\overline{\tau}, \overline{f}_D) \right|^2 \right\rangle \frac{1}{N} \sum_{k=0}^{N-1} \left| Y(t_k, \overline{\tau}, \overline{f}_D) \right|^2$$

The foregoing equation involves simply averaging the squared coherent delay waveform over a period of time defined by N, where N represents the number of blocks used in incoherent integration.

Figure 18:
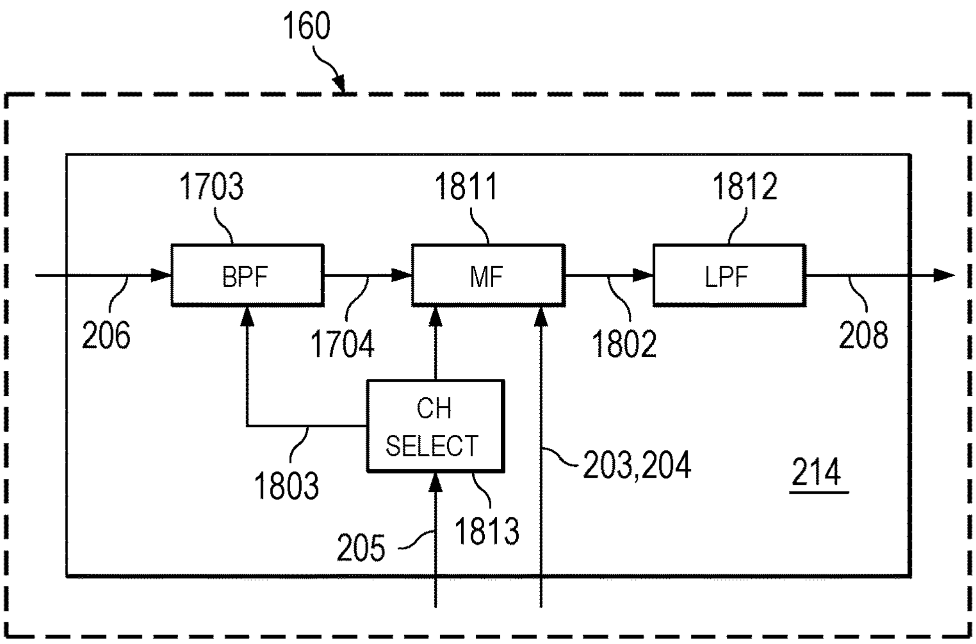
FIG. 18 shows elements of a DSSS signal demodulator according to another example.

FIG. 18 shows elements of a DSSS signal demodulator according to another example. According to this example, the DSSS signal demodulator 214 is configured to produce delay estimates, DoA estimates and audibility estimates. In this example, the DSSS signal demodulator 214 is configured to perform coherent demodulation and then incoherent integration is performed on the full delay waveform. As in the example describe above with reference to FIG. 17, in this example we will assume that the DSSS signal demodulator 214 is being implemented by the audio device 100A and is configured to demodulate acoustic DSSS signals played back by the audio device 100B.

In this example, the DSSS signal demodulator 214 includes a bandpass filter 1703 that is configured to remove unwanted energy from other audio signals, such as some of the audio content that is being rendered for a listener's experience and acoustic DSSS signals that have been placed in other frequency bands in order to avoid the near/far problem.

The matched filter 1811 is configured to compute a delay waveform 1802 by correlating the bandpass filtered signal 1704 with a local replica of the acoustic DSSS signal of interest: in this example, the local replica is an instance of the DSSS signal replicas 204 corresponding to DSSS signals generated by the audio device 100B. The matched filter output 1802 is then low-pass filtered by the low-pass filter 712, to produce the coherently demodulated complex delay waveform 208. In some alternative implementations, the low-pass filter 712 may be placed after the squaring operation in a baseband processor 218 that produces an incoherently averaged delay waveform, such as in the example described above with reference to FIG. 17.

In this example, the channel selector 1813 is configured to control the bandpass filter 1703 (e.g., the pass band of the bandpass filter 1703) and the matched filter 1811 according to the DSSS information 205. As noted above, the DSSS information 205 may include parameters to be used by the control system 160 to demodulate the DSSS signals, etc. The DSSS information 205 may, in some examples, indicate which audio devices are producing acoustic DSSS signals. In some examples, the DSSS information 205 may be received (e.g., via wireless communication) from an external source, such as an orchestrating device.

Figure 19:
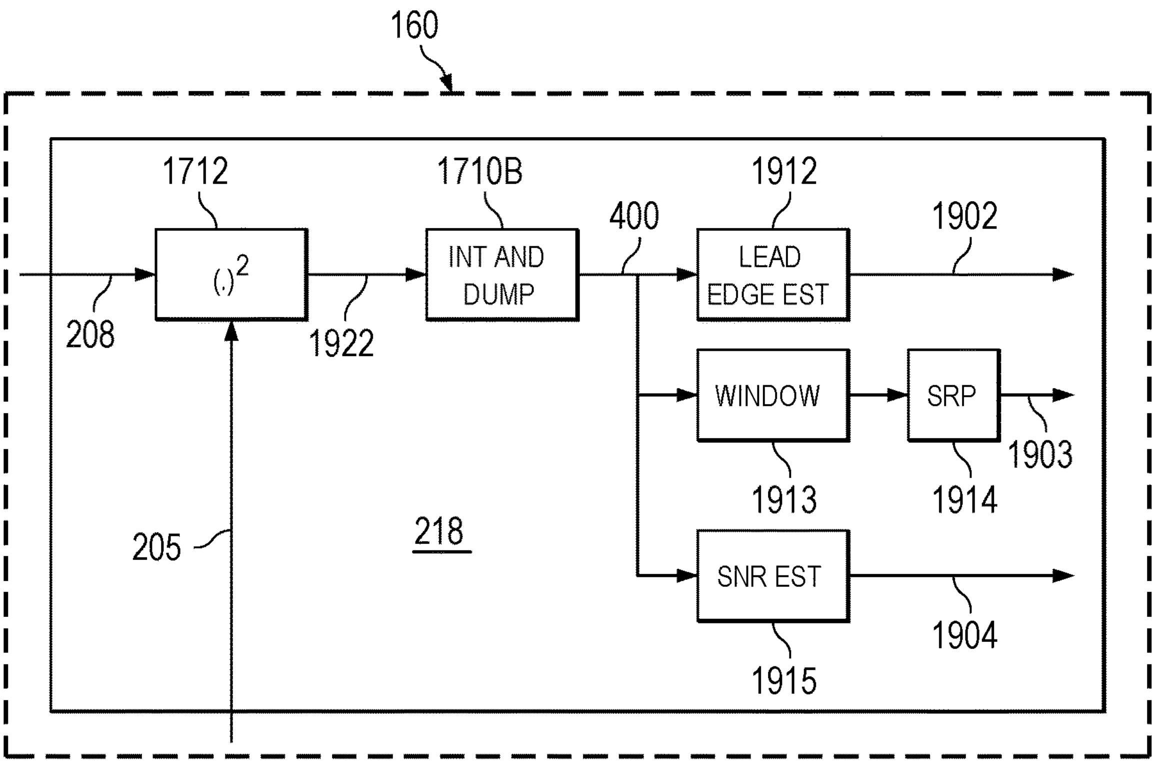
FIG. 19 is a block diagram that shows examples of baseband processor elements according to some disclosed implementations.

FIG. 19 is a block diagram that shows examples of baseband processor elements according to some disclosed implementations. As with other figures provided herein, the types and numbers of elements shown in FIG. 19 are merely provided by way of example. Other implementations may include more, fewer and/or different types and numbers of elements. In this example, the baseband processor 218 is implemented by an instance of the control system 160 that is described above with reference to FIG. 1B.

In this particular implementation, no coherent techniques are applied. Thus, the first operation performed is taking the power of the complex delay waveform 208 via a square law module 1712, to produce an incoherent delay waveform 1922. The incoherent delay waveform 1922 is integrated by the accumulator 1710B for a period of time (which in this example is specified in the DSSS information 205 received from an orchestrating device, but which may be determined locally in some examples), to produce an incoherently averaged delay waveform 400. According to this example, the delay waveform 400 is then processed in multiple ways, as follows:

1. A leading edge estimator 1912 is configured to make a delay estimate 1902, which is the estimated time delay of the received signal. In some examples, the delay estimate 1902 may be based at least in part on an estimation of the location of the leading edge of the delay waveform 400. According to some such examples, the delay estimate 1902 may be determined according to the number of time samples of the signal portion (e.g., the positive portion) of the delay waveform up to and including the time sample corresponding to the location of the leading edge of the delay waveform 400, or the time sample that is less than one chip period (inversely proportional to signal bandwidth) after the location of the leading edge of the delay waveform 400. In the latter case, this delay may be used to compensate for the width of the autocorrelation of the DSSS code. As the chipping rate increases, the width of the peak of the autocorrelation narrows until it is minimal when the chipping rate equals the sampling rate. This condition (the chipping rate equaling the sampling rate) yields a delay waveform 400 that is the closest approximation to a true impulse response for the audio environment for a given DSSS code. As the chipping rate increases, spectral overlaps (aliasing) may occur following the DSSS signal modulator 220A. In some examples, the DSSS signal modulator 220A may be bypassed or omitted if the chipping rate equals the sampling rate. A chipping rate that approaches that of the sampling rate (for example, a chipping rate that is 80% of the sampling rate, 90% of the sampling rate, etc.) may provide a delay waveform 400 that is a satisfactory approximation of the actual impulse response for some purposes. In some such examples, the delay estimate 1902 may be based in part on information regarding the DSSS signal characteristics. In some examples, the leading edge estimator 1912 may be configured to estimate the location of the leading edge of the delay waveform 400 according to the first instance of a value greater than a threshold during a time window. Some examples will be described below with reference to FIG. 20. In other examples, the leading edge estimator 1912 may be configured to estimate the location of the leading edge of the delay waveform 400 according to the location of a maximum value (e.g., a local maximum value within a time window), which is an example of "peak-picking." Note that many other techniques could be used to estimate the delay (e.g., peak picking).
2. In this example, the baseband processor 218 is configured to make a DoA estimate 1903 by windowing (with windowing block 1913) the delay waveform 400 before using a delay-sum DoA estimator 1914. The delay-sum DoA estimator 1914 may make a DoA estimate based, at least in part, on a determination of the steered response power (SRP) of the delay waveform 400. Accordingly, the delay-sum DoA estimator 1914 may also be referred to herein as an SRP module or as a delay-sum beamformer. Windowing is helpful to isolate a time interval around the leading edge, so that the resulting DoA estimate is based more on signal than on noise. In some examples, the window size may be in the range of tens or hundreds of milliseconds, e.g., in the range of 10 to 200 milliseconds. In some instances, the window size may be selected based upon knowledge of typical room decay times, or on knowledge of decay times of the audio environment in question. In some instances, the window size may be adaptively updated over time. For example, some implementations may involve determining a window size that results in at least some portion of the window being occupied by the signal portion of the delay waveform 400. Some such implementations may involve estimating the noise power according to time samples that occur before the leading edge. Some such implementations may involve selecting a window size that would result in at least a threshold percentage of the window being occupied by a portion of the delay waveform that corresponds to at least a threshold signal level, e.g., at least 6 dB larger than the estimated noise power, at least 8 dB larger than the estimated noise power, at least 10 dB larger than the estimated noise power, etc.

3. According to this example, the baseband processor 218 is configured to make an audibility estimate 1904 by estimating the signal to noise power using SNR estimation block 1915. In this example, the SNR estimation block 1915 is configured to extract the signal power estimate 402 and the noise power estimate 401 from the delay waveform 400. According to some such examples, the SNR estimation block 1915 may be configured to determine the signal portions and the noise portions of the delay waveform 400 as described below with reference to FIG. 20. In some such examples, the SNR estimation block 1915 may be configured to determine the signal power estimate 402 and the noise power estimate 401 by averaging signal portions and noise portions over selected time windows. In some such examples, the SNR estimation block 1915 may be configured to make the SNR estimate according to the ratio of the signal power estimate 402 to the noise power estimate 401. In some instances, the baseband processor 218 may be configured to make the audibility estimate 1904 according to the SNR estimation. For a given amount of noise power, the SNR is proportional to the audibility of an audio device. Thus, in some implementations the SNR may be used directly as a proxy (e.g., a value that is proportional to) for an estimate of the actual audio device audibility. Some implementations that include calibrated microphone feeds may involve measuring the absolute audibility (e.g., in dBSPL) and converting the SNR into an absolute audibility estimate. In some such implementations, the method for determining the absolute audibility estimate will take into account the acoustic losses due to distance between audio devices and variability of noise in the room. In other implementations, other techniques for estimating signal power, noise power and/or relative audibility from the delay waveform.

Figure 20:
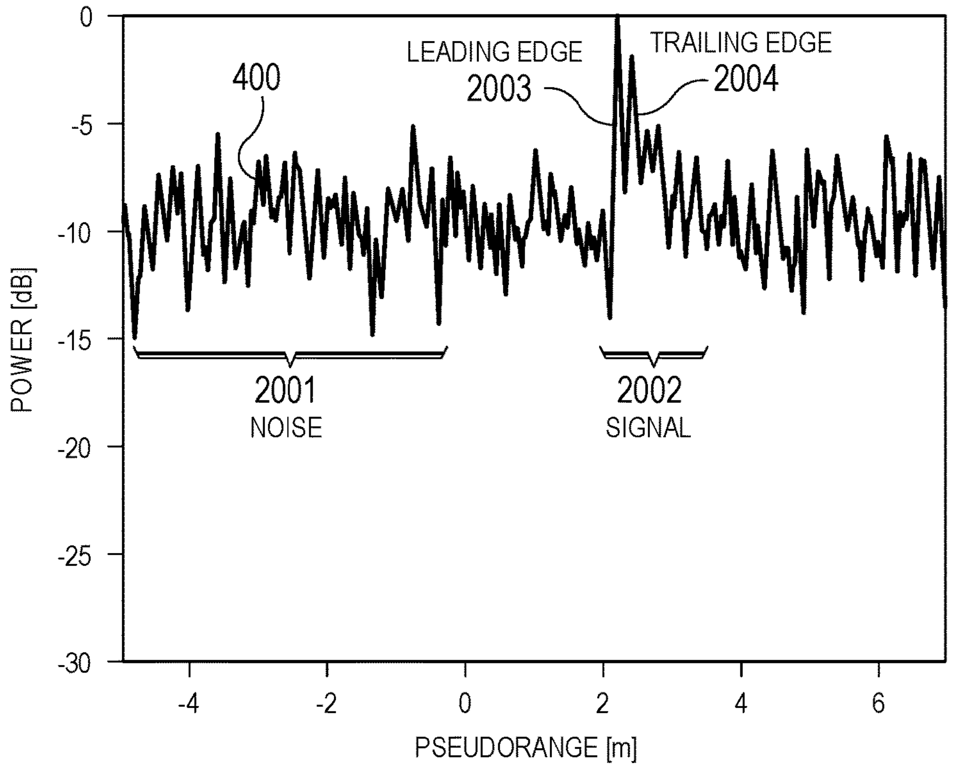
FIG. 20 shows an example of a delay waveform.

FIG. 20 shows an example of a delay waveform. In this example, the delay waveform 400 has been output by an instance of the baseband processor 218. According to this example, the vertical axis indicates power and the horizontal axis indicates the pseudorange, in meters. As noted above, the baseband processor 218 is configured to extract delay information, sometimes referred to herein as τ, from a demodulated acoustic DSSS signal. The values of τ can be converted into a pseudorange measurement, sometimes referred to herein as ρ, as follows:

$$\rho = \tau c$$

In the foregoing expression, c represents the speed of sound. In FIG. 20, the delay waveform 400 includes a noise portion 2001 (which also may be referred to as a noise floor) and a signal portion 2002. Negative values in the pseudorange measurement (and the corresponding delay waveform) can be identified as noise: because negative ranges (distances) do not make physical sense, the power corresponding to a negative pseudorange is assumed to be noise.

In this example, the signal portion 2002 of the waveform 400 includes a leading edge 2003 and a trailing edge. The leading edge 2003 is a prominent feature of the delay waveform 400 if the power of the signal portion 2002 is relatively strong. In some examples, the leading edge estimator 1912 of FIG. 19 may be configured to estimate the location of the leading edge 2003 according to the first instance of a power value greater than a threshold during a time window. In some examples, the time window may start when τ (or ρ) is zero. In some instances, the window size may be in the range of tens or hundreds of milliseconds, e.g., in the range of 10 to 200 milliseconds. According to some implementations, the threshold may be a previously-selected value, e.g., −5 dB, −4 dB, −3 dB, −2 dB, etc. In some alternative examples, the threshold may be based on the power in at least a portion of the delay waveform 400, e.g., the average power of the noise portion.

However, as noted above, in other examples the leading edge estimator 1912 may be configured to estimate the location of the leading edge 2003 according to the location of a maximum value (e.g., a local maximum value within a time window). In some instances, the time window may be selected as noted above.

The SNR estimation block 1915 of FIG. 19 may, in some examples, be configured to determine an average noise value corresponding to at least part of the noise portion 2001 and an average or peak signal value corresponding to at least part of the signal portion 2002. The SNR estimation block 1915 of FIG. 19 may, in some such examples, be configured to estimate an SNR by dividing the average signal value by the average noise value.

Figure 21:
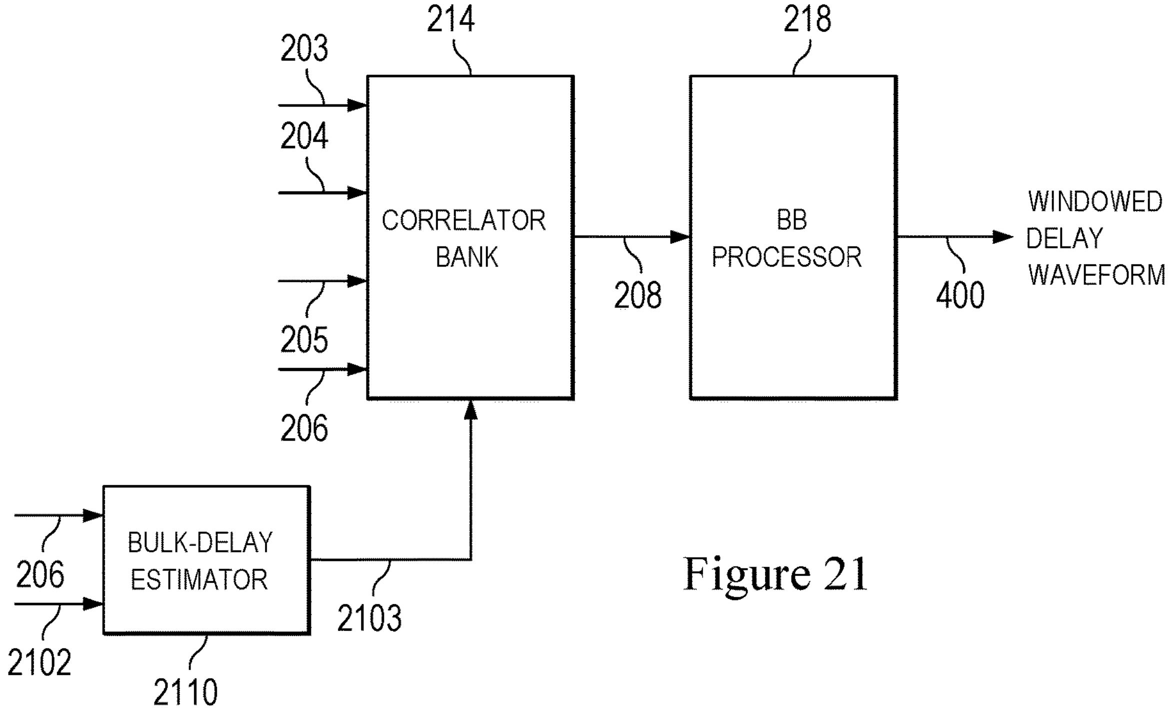
FIG. 21 shows examples of blocks according to another implementation.

FIG. 21 shows examples of blocks according to another implementation. This example includes a correlator bank implementation of the DSSS signal demodulator 214. In this context, the term "correlator bank" means that multiple instances of acoustic DSSS signals are correlated at different delays. According to this example, a bulk-delay estimator 2110 is used to coarsely align the DSSS correlator bank (214) so that only a subset of all delays need to be computed by the baseband processor 218. In this implementation, the DSSS correlator bank (214) produces a windowed demodulated coherent baseband signal 208 and the baseband processor 218 produces a windowed incoherently averaged delay waveform 400.

In this embodiment the bulk delay estimator 2110 utilizes a reference of the signal being rendered by the far device to estimate the bulk delay. In one such example, the bulk delay estimator 2110 is configured to implement a cross-correlator that correlates a reference signal (2102) that is being played back by another audio device in the audio environment (a "far device") with received microphone signals 206 to estimate the bulk delay 2103. The estimated bulk delay 2103 will generally be different for each audio device from which acoustic DSSS signals are received.

Some alternative implementations involve estimating the bulk delay 2103 according to the information in the filters taps of an acoustic echo canceler that is cancelling reference playback of the far device. The filters will show peaks corresponding to the direct signals from other devices, which provides a rough alignment.

The bulk delay estimator 2110 can enhance efficiency by limiting the subsequent "downstream" calculations. For example, the windowing process may limit the pseudorange to a range of x toy meters, e.g., 1 to 4 meters, 0 to 4 meters, 1 to 5 meters, −1 to 4 meters, etc., instead of a range such as that shown in FIG. 20.

Figure 22:
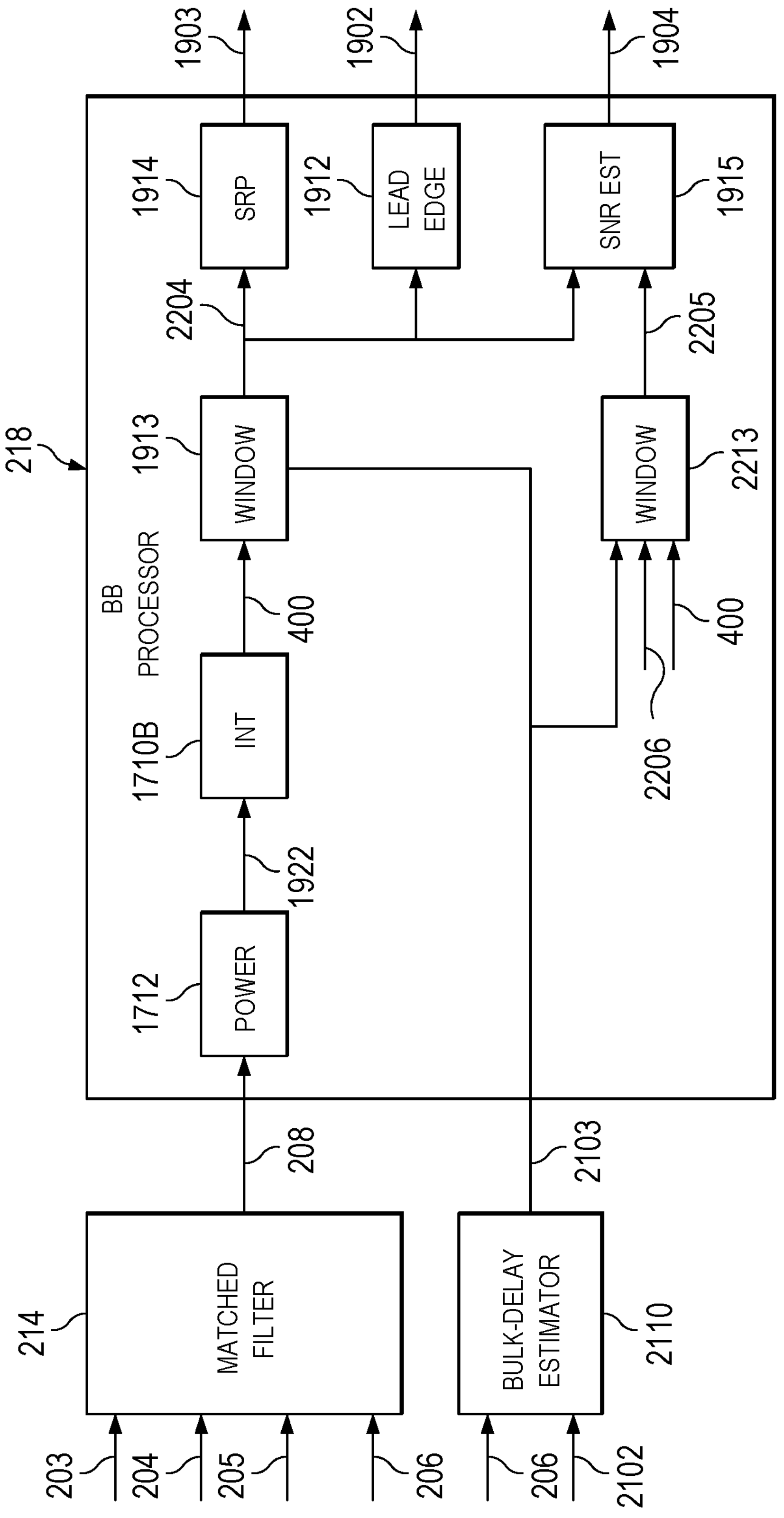
FIG. 22 shows examples of blocks according to yet another implementation.

FIG. 22 shows examples of blocks according to yet another implementation. This example includes a "matched filter" version of the of the DSSS signal demodulator 214, which may in some instances be configured as described above with reference to FIG. 18. This example also includes an instance of the bulk delay estimator 2110, which in this implementation provides the bulk delay estimate 2103 to the baseband processor 218.

According to this example, the window being steered (centered) by the external bulk delay estimate 2103 for the signal component of the delay waveform 2204 which is extracted using windowing block 1913. An additional windowing block 2213 is centered using the bulk delay estimate 2103 and an offset 2206 to window the delay waveform 400 in a noise-only region of the delay waveform. For example, the offset windowed delay waveform 2205 could correspond to the noise portion 2001 of FIG. 20.

In this example, the baseband processor 218 windows the delay waveform 400 before performing SRP via the delay-sum beamformer 1914, as described above with reference to FIG. 19. However, in this example the baseband processor 218 controls the windowing block 1913 based on the bulk delay estimate 2103. According to this implementation, the windowing block 1913 provides the windowed delay waveform 2204 to leading edge estimator 1912, the delay-sum beamformer 1914 and the SNR estimation block 1915. Moreover, in this example the baseband processor 218 controls the windowing block 2213 based on the bulk delay estimate 2103.

In some implementations, the delay estimate 1902 that is estimated using the leading edge estimator 1912 may, in some examples, be used to window subsequent acoustic DSSS observations. In some such implementations, the delay estimate 1902 may replace the bulk delay 2103 in FIG. 21 and FIG. 22.

Figure 23:
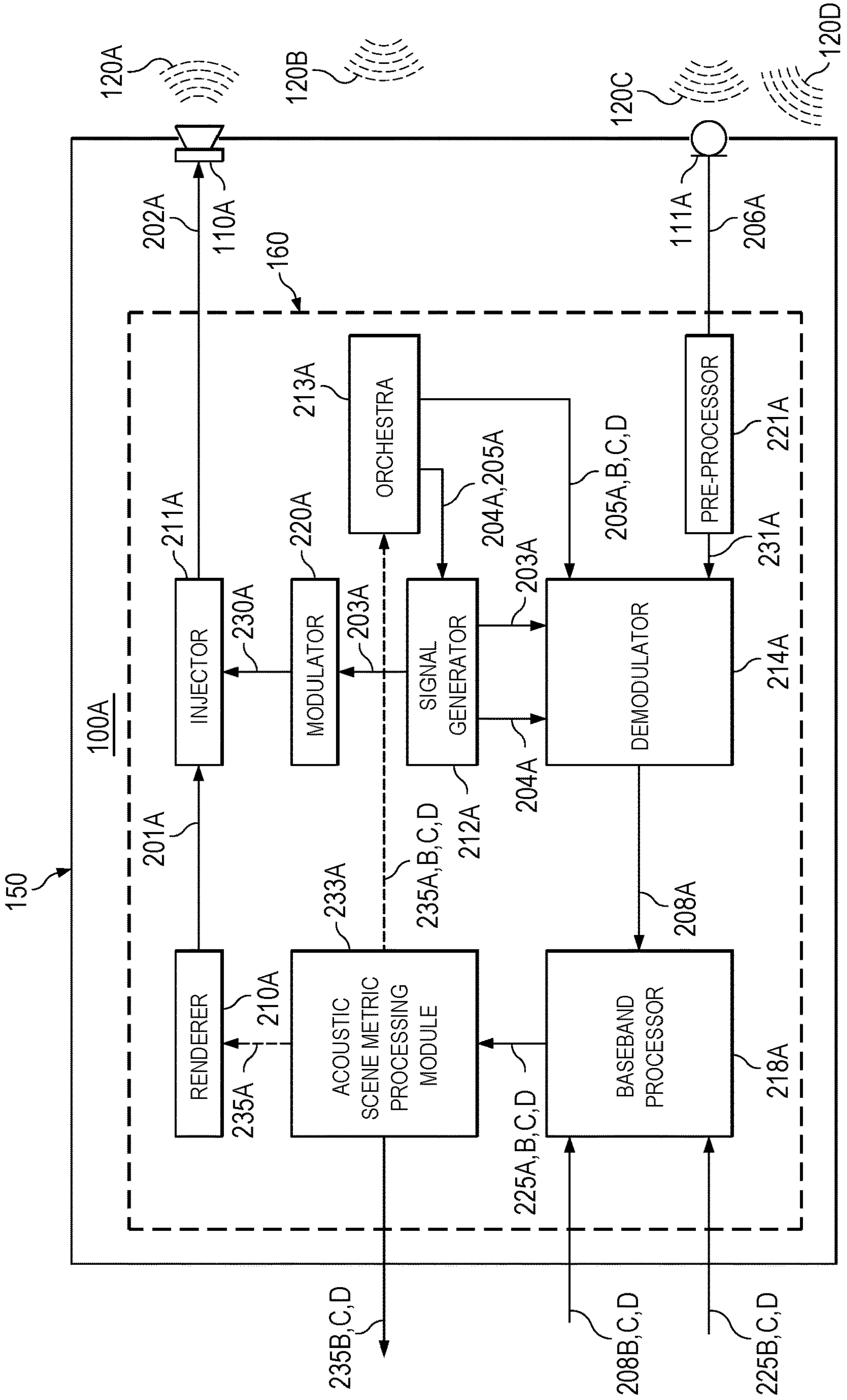
FIG. 23 is a block diagram that shows examples of audio device elements according to some disclosed implementations.

FIG. 23 is a block diagram that shows examples of audio device elements according to some disclosed implementations. As with other figures provided herein, the types and numbers of elements shown in FIG. 23 are merely provided by way of example. Other implementations may include more, fewer and/or different types and numbers of elements. In this example, the audio device 100A of FIG. 23 is an instance of the apparatus 150 that is described above with reference to FIGS. 1B and 2-4. The implementation shown in of FIG. 23 includes all of the elements of FIG. 4, except that in FIG. 23 the beamformer 215A of FIG. 4 has been replaced by a more generalized preprocessing module 221A. The elements common to FIGS. 4 and 23 will not be described again here, except to the extent that their functionality may differ in the implementation of FIG. 23.

According to this implementation, the preprocessing module 221A is configured to preprocess the received microphone signals 206A to produce preprocessed microphone signals 207A. In some implementations, preprocessing the received microphone signals may involve applying a bandpass filter and/or echo cancellation. According to some examples, the microphone system 111A may include an array of microphones, which may in some instances be, or include, one or more directional microphones. In some such examples, preprocessing the received microphone signals may involve receive-side beamforming via the preprocessing module 221A.

Generally, each audio device has its own internal clock, which will often function independently of the clocks implemented by other audio devices of an audio environment. Clock offset or bias refers to clocks (e.g., the clock of audio device A and the clock of audio device B) that are offset by a particular time. Clocks will generally be running at slightly different speeds, which is known as clock skew. The clock skew will change the clock bias over time. This change in clock bias will cause the estimated range or distance between devices to change, which is a phenomenon known as "range walk."

For a system in which the clock skew is limited by means of network synchronization and/or an estimate is made of the clock skew (potentially by techniques listed in this disclosure), then it can be advantageous for the coherent integration time of the receiving device to be limited in order to mitigate SNR losses due to range walk during the integration period. In some examples, this can be combined with a range walk compensation technique, e.g., if the skew is not significant at coherent integration time scales but is significant at incoherent integration time scales.

Figure 24:
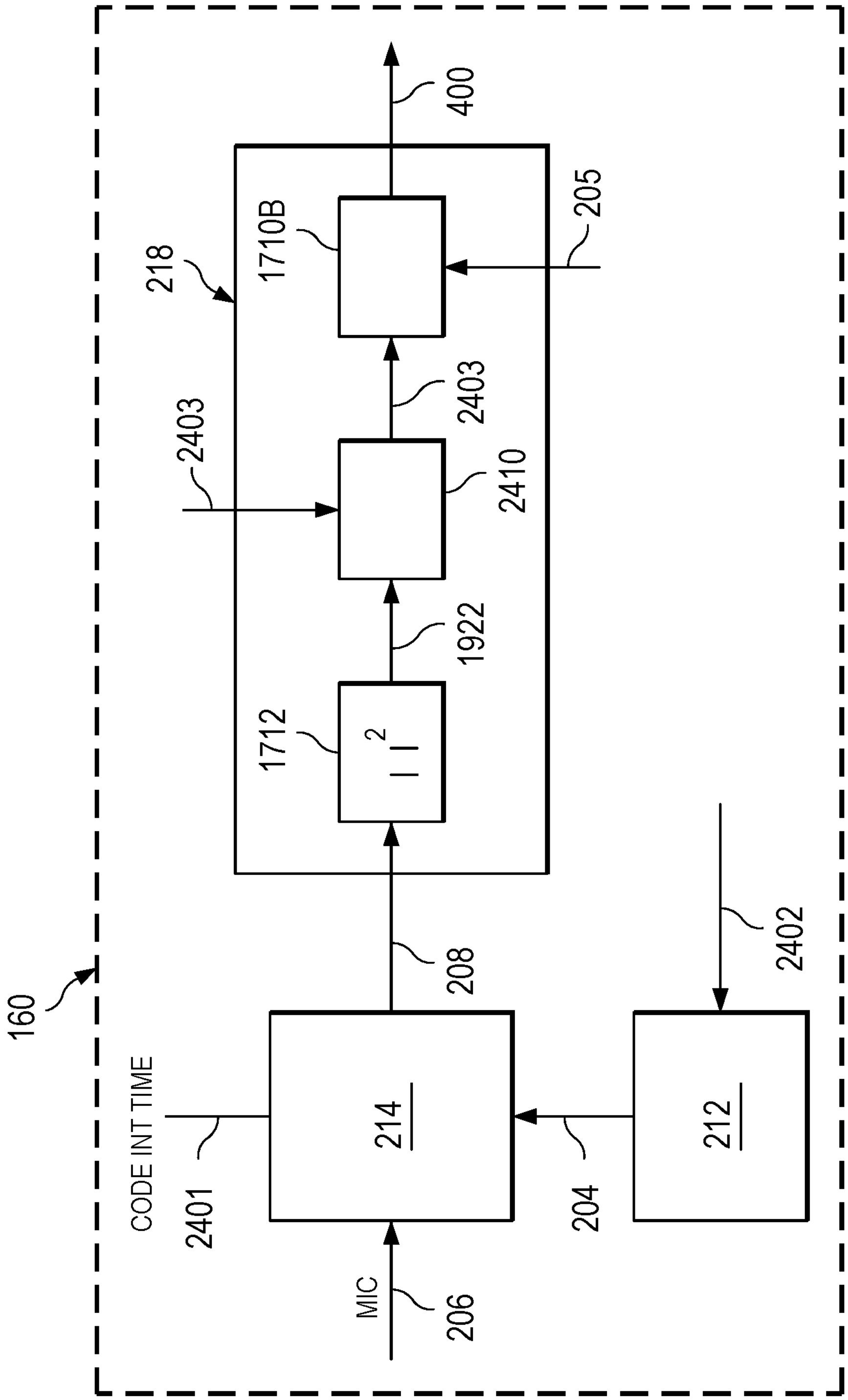
FIG. 24 shows blocks of another example implementation.

FIG. 24 shows blocks of another example implementation. As with other figures provided herein, the types and numbers of elements shown in FIG. 23 are merely provided by way of example. Other implementations may include more, fewer and/or different types and numbers of elements. For example, in some implementations the baseband processor 218 may include additional elements, such as the elements that are described above with reference to FIGS. 19 and 22.

In this embodiment, one method of monitoring one of the types of trigger conditions referenced above with reference to FIG. 15 (for triggering an update of acoustic DSSS parameters) is implemented as a block that is configured to detect a change in the relative clock skew of any two audio devices of an audio environment. Some detailed examples of calculating the relative clock skew of two audio devices are provided below. In some examples, enhanced coefficients for the DSSS signal demodulator 214 and the baseband processor 218 may be based, at least in part, on the relative clock skew. Furthermore, a change in clock skew that is greater than a threshold amount may, in some examples, be a trigger condition that may result in changes of the global operating configurations of all participating audio devices (the CDMA, FDMA, TDMA allocations for example), triggering the flow from block 1510 to block 1515 of FIG. 15 in some instances.

According to the example shown in FIG. 24, the DSSS signal generator 212A receives signal skew parameters 2402 and provides DSSS signal replicas 204 corresponding to DSSS signals generated by other audio devices of the audio environment to the DSSS signal demodulator 214. In some examples, the DSSS signal generator 212A may receive the DSSS signal replicas 204 and the signal skew parameters 2402 from an orchestrating device.

In the example shown in FIG. 24, the DSSS signal demodulator 214 is shown receiving microphone signals 206 and coherent integration time information 2401, as well as the DSSS signal replicas 204. According to this example, the square law module 1712 of the baseband processor 218 is configured to receive demodulated coherent baseband signals 208 from the DSSS signal demodulator 214, to produce an incoherent delay waveform 1922 and to provide the incoherent delay waveform 1922 to delay walk compensator 2410. According to this example, the delay walk compensator 2410 is configured to compensate for delay walk between the receiving audio device and an audio device for which the baseband processor 218 is currently processing acoustic DSSS signals. In this example, the delay walk compensator 2410 is configured to compensate for delay walk according to a received delay-rate estimate 2403 and to out an incoherently compensated power delay waveform 2405. The term "delay walk" refers to the effect of a non-zero delay-rate term, e.g., how far a delay waveform shifts in a period of time. It is caused by a mismatch in the physical clocking frequencies of the transmitting and receiving device. In this example, the delay-rate estimate 2403 is the rate of change, over time, of the estimated delay. According to some examples, the delay-rate estimate 2403 may be determined according to stored instances of delay estimates determined over a period of time (e.g., hours, days, weeks, etc.). If the estimated delay-rate is significant, when delay waveforms are incoherently integrated (averaged), the shift in the instantaneous delay waveform (e.g., the shift in the demodulated coherent baseband signals 208 in FIG. 24) will result in a blurring of the final incoherently averaged signal (e.g., signal 400 in FIG. 24). If we consider a −3 dB misalignment in the peak power response due to delay-rate induced errors (as one example corresponding to the effect of a "significant" delay rate), then delay rates above a delay rate limit, represented as delay_rate_lim in the equation below, will induce errors worse than −3 dB. In the following equation, T_code represents the temporal length of the entire spreading code sequence.

$$\text{delay\_rate\_lim} = \frac{\left(1 - \frac{\sqrt{2}}{2}\right)}{\text{T\_code}} \text{[chips/second]}$$

According to some examples, the delay walk compensator 2410 may use the delay-rate estimate 2403 to shift the signal (1922) before averaging it. In some such examples, this shift will be equal to the amount of delay walk that occurs over an incoherent integration period, but the shift is applied in the opposite direction to negate the delay walk.

In some alternative implementations, the coherent processing that occurs in the DSSS signal demodulator 214 may be altered according to clock bias and/or clock skew information. According to one such example, clock bias estimates may be used to shift the replica signal code (1720) phase in the DSSS signal generator 212, so that the delay in the delay waveform is due only to the physical distance between the audio devices. In some examples, the clock skew estimates may be used to shift the replica signal carrier (1715) frequency in the DSSS signal generator 212 so that the resultant coherent waveform (208) has no residual frequency component (in other words, there is no sinusoid left). This condition may occur when the replica signal generates a carrier which corresponds to the physical signal transmitted by the audio device currently being evaluated/listened to. Due to the different clock frequencies, these carrier frequencies will be slightly different.

Figure 25:
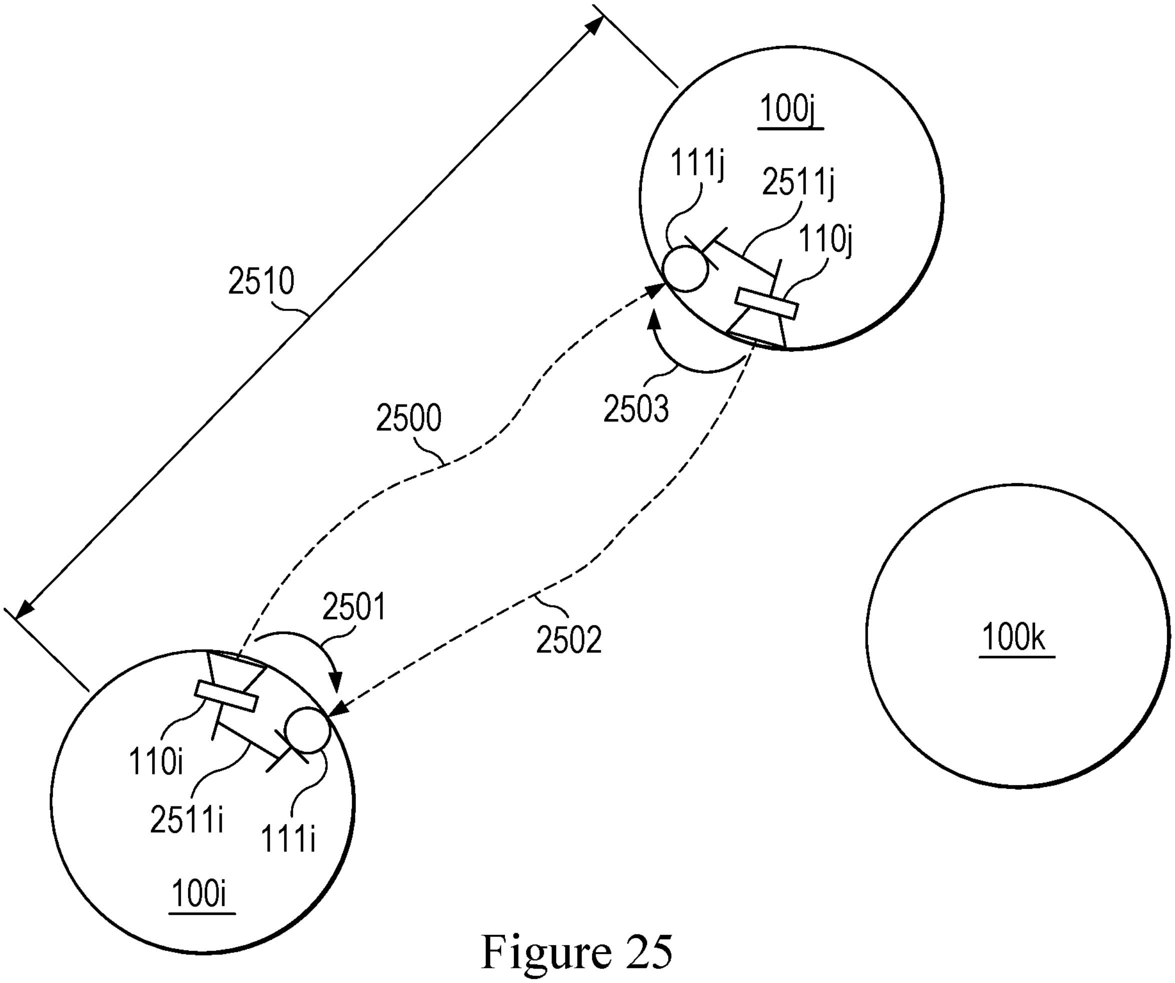
FIG. 25 shows another example of an audio environment.

FIG. 25 shows another example of an audio environment. According to this example, the elements of FIG. 25 are as follows:

100*i,j,k*: a plurality of orchestrated distributed audio devices;

2500: Signal transmitted from audio device i (100*i*) and received by audio device j (100*j*);

2501: Signal transmitted from audio device i (100*i*) and received by audio device i (100*i*);

2502: Signal transmitted from audio device j (100*j*) and received by audio device i (100*i*);

2503: Signal transmitted from audio device j (100*j*) and received by audio device j (100*j*);

2510: Actual distance between audio device i (100*i*) and audio device j (100*j*); and

2511(*i,j*): Distance between an audio device's loudspeakers and microphones.

Some examples of asynchronous two-way ranging will now be described with reference to FIG. 25. In this example, the audio devices are asynchronous and have biases between their clocks. This particular implementation uses two-way ranging so that all of the unknown clock terms are cancelled out. This particular example is performed with pairs of audio devices and will be explained with reference to audio devices 100*i* and 100*j*. Sets of ranges between all audio devices in an acoustic space may be obtained by repeating this for all audio device pairs (e.g., for audio device pair 100*i*-100*k* and audio device pair 100*j*-100*k*).

Figure 26:
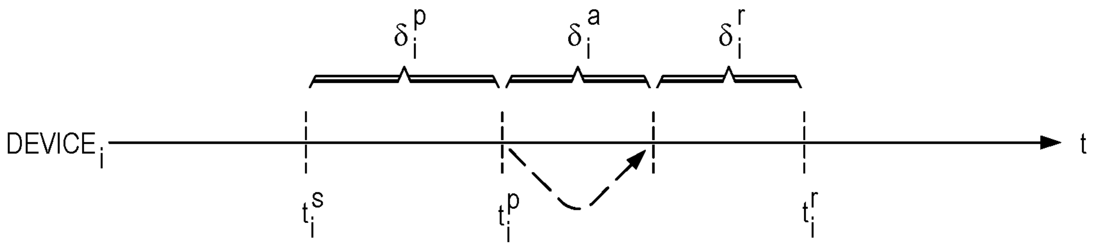
FIG. 26 is a timing diagram according to one example.

FIG. 26 is a timing diagram according to one example. The timing diagram of FIG. 26 will be used as a reference as part of the process of describing an asynchronous two-way ranging method. The symbols and acronyms that will be used in this discussion, and their meanings, are as follows:

c—speed of sound
$\rho$—pseudorange
$\tau$—delay
$t_i^s$—clock epoch on device i
$t_i^p$—playback epoch on device i
$t_i^r$—record epoch on device i
$\delta_i^p$—playback latency on device i
$\delta_i^r$—record latency on device i
$\delta_i^a$—acoustic latency on device i (due to the spacing between its own speaker and microphone)
$\Delta t_{ij}$—relative clock bias between device i and device j
$\tau_{ij}$—actual delay between device i and device j
$\tilde{\tau}_{ij}$—measured (from the DW) delay between device i and device j
$\hat{\tau}_{ij}$—estimated (after processing) delay between device i and device j
ToF—Time of Flight
ToR—Time of Reception
ToT—Time of Transmission In addition, the acronym "DW" indicates a delay waveform. A hat over a symbol indicates an estimated value. A tilde over a symbol indicates a measured value. A "clock epoch" of an audio device is the time when an audio device control system sends a playback signal to the loudspeaker (s). A "playback epoch" of an audio device is the time when the loudspeaker(s) actually play back the sound corresponding to the playback signal. The terms "latency" and "delay" are used synonymously. For example, a "playback latency" is the delay between a time at which an audio device control system sends a playback signal to the loudspeaker(s) and a time at which the loudspeaker(s) actually play back the sound corresponding to the playback signal. Similarly, a "record latency" is the delay between a time at which a microphone receives a signal and a time at which the signal is received by the control system.

In FIG. 26, the timing involved when estimating the play-record latency of audio device i is depicted. Assuming the playback and record in/out (I/O) streams are synchronous, if a full-duplex audio thread is synchronised with the audio device clock, $t_i^s$, and outputs a signal, then due to the playback latency, $\delta_i^p$, the signal is not played out of the speaker until $t_i^p$. That is, $$t_i^p = t_i^s + \delta_i^p. \tag{2}$$

Then after the acoustic delay, $\delta_i^a$, which is caused by the distance between the speaker and microphone on the audio device, the signal arrives at the microphone of the same audio device. The received signal is delayed further by the record latency $\delta_i^r$ until it makes its way into the audio device's audio thread.

$$t_i^r = t_i^p + \delta_i^a + \delta_i^r \tag{3}$$

The DW produced by the audio device will have a peak located at a delay of $\tilde{\tau}_{ii}$, where the ˜ indicates a measurement. In other words, $\tilde{\tau}_{ii}$ represents the measured pseudorange between audio device i and itself. The difference in the code phase of the local replica generated by the audio thread and the signal in the microphone feed determines the code delay of the peak in the DW which is measured to be $$\tilde{\tau}_{ii} = t_i^r - t_i^s = \delta_i^p + \delta_i^r + \delta_i^a \tag{4}$$

and is equal to the play-record latency of the audio device (inclusive of the acoustic delay). This equation is useful for estimating the bulk delay of an audio device for the purposes of echo management and we will see later how this equation can be also used to remove biases in pseudorange measurements between asynchronous audio devices.

Figure 27:
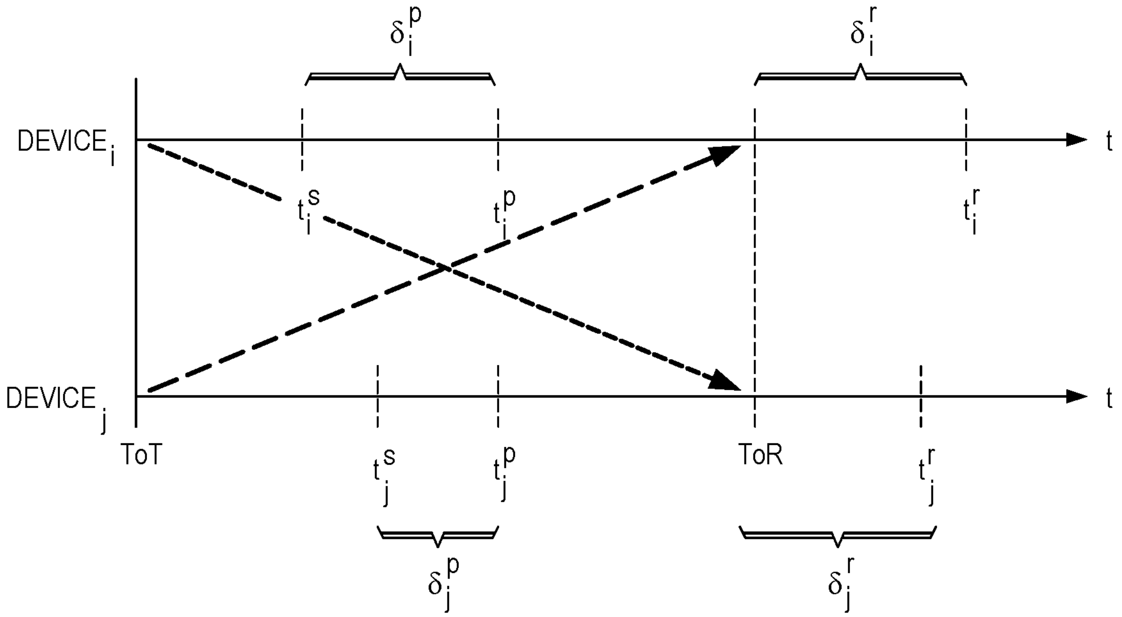
FIG. 27 is a timing diagram showing relevant clock terms when estimating the time of flight between two asynchronous audio devices according to one example.

FIG. 27 is a timing diagram showing relevant clock terms when estimating the time of flight between two asynchronous audio devices according to one example. Now we will consider a case in which two audio devices are both playing back an acoustic DSSS signal and are also producing a DW by processing the other audio device's acoustic DSSS signal. This results in delay measurements $\tilde{\tau}_{ij}$ and $\tilde{\tau}_{ji}$, which correspond to the ToF between the audio devices. FIG. 27 indicates the transmission from device i and reception at device j, and vice versa.

In this example, the symbols and acronyms of FIG. 27 have the following meanings and context:

- $t_i^s$ and $t_j^s$ are synchronised with the audio thread on device i and j respectively.
- The actual acoustic delay between the two devices is the same, i.e., $\tau_{ij} = \tau_{ji} = \text{ToF}$, the respective acoustic paths are shown as green and blue arrows.
- The code phase of the signal being transmitted is $(-t_i^s - \delta_i^p)$ at the speaker of device i at the Time of Transmission (ToT).
- After ToF this signal arrives at the receiver (device j), and is delayed by the record latency running on device j, so the transmitted signal's phase in microphone buffer of the audio thread of device j is $(-t_i^s - \delta_i^p - \delta_j^r)$ at the Time of Receipt (ToR).
- the code phase of the local replica generated by the audio thread running on device j has a phase of $(\text{ToF} - t_j^s)$ at the ToR.

Because the difference in code phase of the local replica and received signal determines where the peak in the DW occurs; the measured delay may be expressed as follows:

$$\tilde{\tau}_{ij} = ToF - t_j^s + t_i^s + \delta_i^p + \delta_j^r \tag{5}$$

One can perform a similar analysis to obtain the measured delay when device j is transmitting and i receiving, to obtain the following expression:

$$\tilde{\tau}_{ji} = ToF - t_i^s + t_j^s + \delta_j^p + \delta_i^r \tag{6}$$

Referring to (5) and (6), one may observe that the relative clock bias term $$\Delta t_{ij} = -\Delta t_{ji} = t_i^s - t_j^s \tag{7}$$

can be eliminated if the two reciprocal delay measurements are summed $$\tilde{\tau}_{ij} + \tilde{\tau}_{ji} = 2ToF - t_j^s + t_i^s + \delta_i^p + \delta_j^r - t_i^s + t_j^s + \delta_j^p + \delta_i^r = 2ToF + \delta_i^p + \delta_j^r + \delta_j^p + \delta_i^r \tag{8}$$

If one now substitutes (4) into (8) and reorganizes, the following expression may be obtained:

$$\widehat{ToF} = \hat{\tau}_{ij} = \hat{\tau}_{ji} = \frac{\tilde{\tau}_{ij} + \tilde{\tau}_{ji} - \tilde{\tau}_{ii} + \delta_i^a - \tilde{\tau}_{jj} + \delta_j^a}{2} \tag{9}$$

This allows one to obtain an unbiased pseudorange estimate as follow:

$$\hat{\rho}_{ij} = \hat{\rho}_{ii} = \hat{\tau}_{ij} c = \hat{\tau}_{ji} c \tag{10}$$

Therefore, using (9) we can obtain unbiased pseudorange estimates when we have access to the following:

- reciprocal delay measurements: $\tilde{\tau}_{ij}$ and $\tilde{t}_{ji}$
- play-record latency measurements: $\tilde{\tau}_{ii}$ and $\tilde{\tau}_{jj}$
- estimates of the acoustic delay comprising the play-record latency of a particular device: $\delta_i^a$ and $\delta_j^a$ In some instances, there may be no way to estimate or eliminate $\delta^a$. In such instances, one can either choose to omit $\delta^a$ in (9), leaving a bias in the estimated pseudorange:

$$b_{ij}^{\rho} = \frac{-c(\delta_i^a + \delta_j^a)}{2} \tag{11}$$

Alternatively, one can use an approximation of $\delta^a$ based on the audio device type or rely on $\delta^a$ being measured beforehand.

Clock Bias Estimation

Instead of summing any two reciprocal pseudorange estimates, if one takes the difference one gets the following:

$$\Delta\hat{\tau}_{ij} = -\Delta\hat{\tau}_{ji} = \tilde{\tau}_{ij} - \tilde{\tau}_{ji} = \tau_{ij} + t_i^s - t_j^s + \delta_i^p + \delta_j^r - \tau_{ji} - t_j^s + t_i^s - \delta_j^p - \delta_i^r = 2(t_i^s - t_j^s) + \delta_i^p - \delta_i^r - (\delta_j^p - \delta_j^r) \tag{12}$$

If one lets $$\Delta_i^{pr} = \delta_i^p - \delta_i^r \tag{13}$$

denote the difference in the playback and record latency of device i, substitute (7) into (12) and reorganise, one gets the following:

$$\Delta t_{ij} = \frac{\tilde{\tau}_{ij} - \tilde{\tau}_{ji} - \Delta_i^{pr} + \Delta_j^{pr}}{2} \tag{14}$$

Equation (14) allows one (e.g., allows a control system) to solve for the relative clock bias, $\Delta t_{ij}$, if any of the following are true:

1. The difference in the playback and record latency is known (i.e. measured beforehand and substituted into (14)), or
2. The difference in the playback and record latency is equal on both devices (so that the terms cancel out in (14)), or
3. The difference in the playback and record latency is zero (so that the terms cancel out in (13)).

Clock Skew Estimation

Depending on the signal used to produce the DW, it may also be possible to process it in a way such that we can obtain an estimate of the frequency difference (skew) of the clocks on the two audio devices. The DSSS signal used in this experiment is simply a carrier signal located at f0 Hz which is spread by a pseudorandom number sequence (which may be referred to herein as a PRN sequence, a PRN code, a spreading code or simply a code). The reception of this signal involves both 'de-spreading' and shifting it back down to baseband. However, should the frequency of the two clocks differ, after coherent integration (the matched filtering using a local replica) a residual frequency will exist which is equal to the difference in the two clock frequencies. Thus, instead of producing the DW by averaging the square of the coherent integration result, some implementations involve performing a spectrum analysis to determine what the frequency of the residual carrier is and infer the difference in clock frequencies from the frequency of the residual carrier. Such methods allow a control system to obtain an estimate after a single coherent integration period. However, the estimate is likely to be quite noisy after only a single coherent integration period unless the DSSS parameters are changed to optimize for such a measurement. Such DSSS parameter changes may involve making the spreading code (and the coherent integration period) very long temporally (e.g., in the range of hundreds of milliseconds to seconds), which may be done by using longer codes (more chips) and/or decreasing the chipping rate (bandwidth).

Another approach involves exploiting the fact that the clock frequency difference will also result in the relative code phase (and clock bias) walking (in other words, changing with time). In some such implementations, a control system may track how $\tilde{\tau}_{ij}$ varies with time, which is the rate at which the code phase walks.

A tradeoff exists between the two approaches, which can be summarized as follows:

Spectrum analysis is required to be performed on each coherent integration result for the carrier-based approach with a non-negligible amount of complexity. For the code walk-based approach, the control system only needs to keep a history of the measured pseudoranges and process this amount of data, which is significantly smaller. If the clock frequency difference was large enough that it could be detected on coherent integration period scales then it's likely that there are SNR losses in the DW and the period should be shortened, which will result in the inability to resolve the clock rate difference.

The carrier-based approach produces estimates after just a single coherent integration period, while the code walk-based approach requires a sufficient number of DWs and pseudorange estimates such that code walk can be confidently estimated in the phase noise of the DW. Thus, the code walk-based approach is significantly slower. However, the inherently noisy coherent carrier-based method may require temporal smoothing, which can result in a similar amount of required observation time.

According to some implementations, a delay rate estimator (e.g., as discussed above with reference to FIG. 24) may be used to estimate clock skew. The delay rate is proportional to clock skew.

Figure 28:
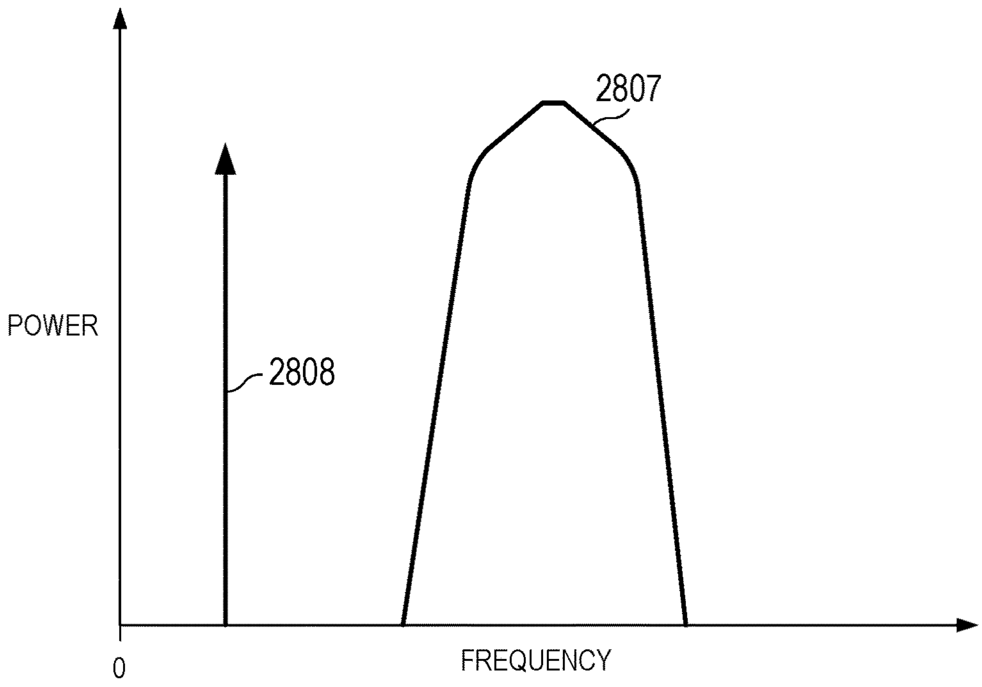
FIG. 28 is a graph that show an example of how the relative clock skew between two audio devices may be detected via a single acoustic DSSS signal.

FIG. 28 is a graph that show an example of how the relative clock skew between two audio devices may be detected via a single acoustic DSSS signal. In this example, the horizontal axis indicates frequency and the vertical axis indicates power. FIG. 28 indicates the spectrum of the main lobe of a received modulated acoustic DSSS signal 2807, as well as the frequency of a demodulated acoustic DSSS signal 2808. One may note that demodulated acoustic DSSS signal 2808 is not at zero Hz, indicating the relative clock skew between the devices.

Figure 29:
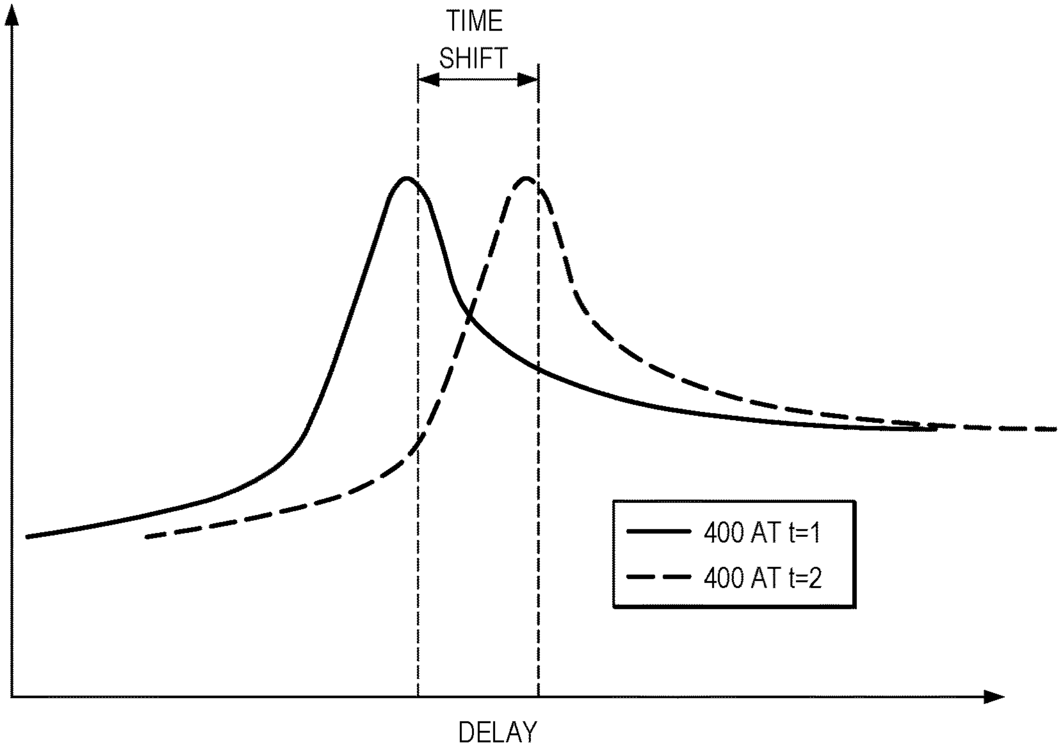
FIG. 29 is a graph that show an example of how the relative clock skew between two audio devices may be detected via multiple measurements made of a single acoustic DSSS signal.

FIG. 29 is a graph that show an example of how the relative clock skew between two audio devices may be detected via multiple measurements made of a single acoustic DSSS signal. In this example, the horizontal axis indicates delay time and the vertical axis indicates power. FIG. 29 shows examples of delay waveforms produced from acoustic DSSS signals in blocks of received audio (at t=1 and t=2). The shift in the location of the delay waveform peak (which itself indicates bulk delay) indicates the clock skew between the devices. In some examples, time 2 may be hours or days after time 1. Using such relatively large time intervals may be advantageous if the clock skew is relatively small.

Clock Disciplining

Some implementations a control system configured for leveraging the clock bias and delay estimations to actually drive the local clock (discipline it) using closed loop approaches. Frequency-locked loops, delay-locked loops, phase-locked loops or a combination thereof can be used to embody signal processing chains to accomplish clock disciplining.

In alternative examples, instead of actually adjusting the local clock, DSSS signal parameters may be adjusted to compensate for clock bias.

The accuracy of the clock bias and delay estimation techniques depend greatly on SNR and thus would best be suited to observations in which (referring to FIG. 7) the optimization module 712 determines DSSS parameters 705 by placing a relatively higher weight on the acoustic DSSS signal performance estimate(s) 703 than on the perceptual impact estimate(s) 702. For example, the optimization module 712 may be configured to determine DSSS parameters 705 by emphasizing on the ability of the system to produce high SNR observations of acoustic DSSS signals and de-emphasizing on the impact/perceivability of the acoustic DSSS signals by the user. In some such examples, the DSSS parameters 705 may correspond to audible acoustic DSSS signals.

Figure 30:
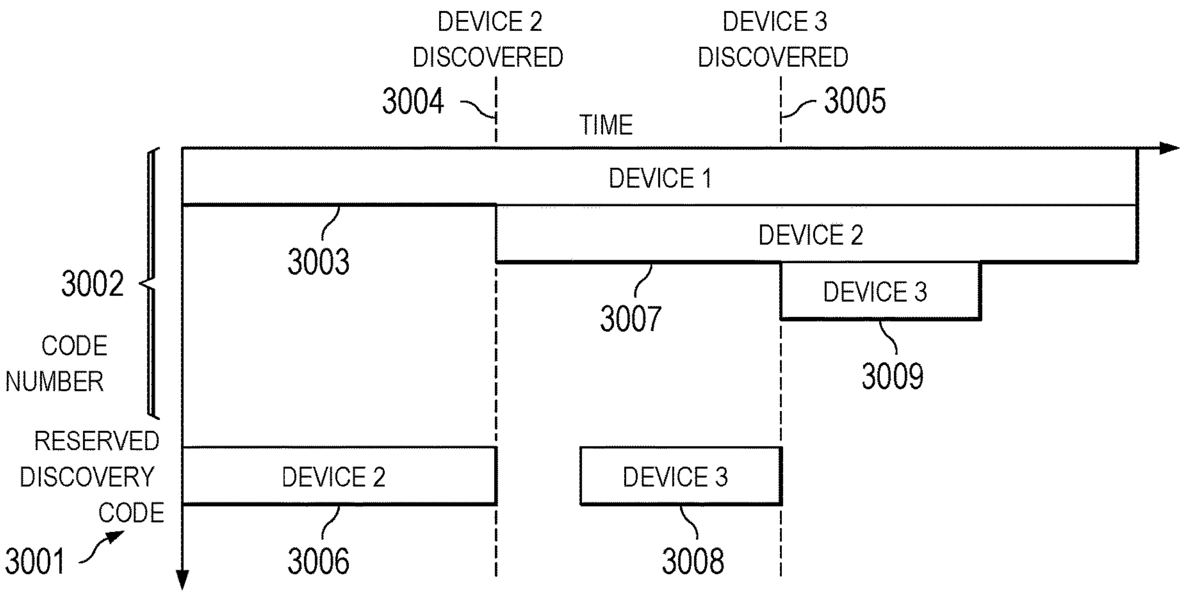
FIG. 30 is a graph that shows an example of acoustic DSSS spreading codes reserved for device discovery.

However, in some alternative examples coarse techniques (such as DW delay tracking methods) may be implemented in a continuous sub-audible and low-SNR manner Device Discoverability FIG. 30 is a graph that shows an example of acoustic DSSS spreading codes reserved for device discovery. In this example, the reserved spreading codes are used, e.g., when a new audio device has powered up and is in the process of being configured for use in an audio environment. During runtime operations, different ("normal") acoustic DSSS spreading codes are used. The reserved spreading codes may or may not use the same frequency band as the normal acoustic DSSS spreading codes.

The elements of FIG. 30 are as follows:

3001: A plurality of reserved acoustic DSSS spreading codes, also referred to as pseudo-random number sequences;

3002: A plurality of allocated (by an orchestrating device) pseudo-random number sequences;

3003: Device 1 already has an allocated code;

3006: Device 2 is transmitting a reserved code (3001);

3004: Device 2 is detected and the orchestrating device allocates a code for Device 2;

3007: Device 2 is transmitting its allocated code;

3008: Device 3 begins transmitting a reserved code after being turned on for the first time;

3005: Device 3 is detected and the orchestrating device allocates a code for Device 3; and

3009: Device 3 is transmitting an allocated code.

In this example, when a new audio device is introduced into the audio environment system the new audio device begins to play back an acoustic DSSS signal produced using a reserved spreading code sequence. This allows other devices in the room to identify that a new audio device has been introduced into the acoustic space and initiates the integration sequence. After the new audio device has been discovered and integrated into the system of orchestrated audio devices, the new audio device begins to play back acoustic DSSS signals using a spreading code that it is assigned, in this example, by an orchestrating device.

According to this example, Devices 2 and 3 are moved from a discovery code channel (frequency band) to a frequency band allocated to them by the orchestration system. Upon integration, the amplitude, bandwidth and center frequency of all devices playing back acoustic DSSS signals may be changed so that optimal observations are made for the new system configuration. In some examples, the orchestrating device may recompute the acoustic DSSS parameters of all devices in the acoustic space, so a newly-discovered audio device may result in the DSSS parameters of all audio devices changing.

Noise Estimation

In this example, acoustic DSSS-based observations produced by a plurality of audio devices are used to estimate noise in an acoustic space.

Figure 31:
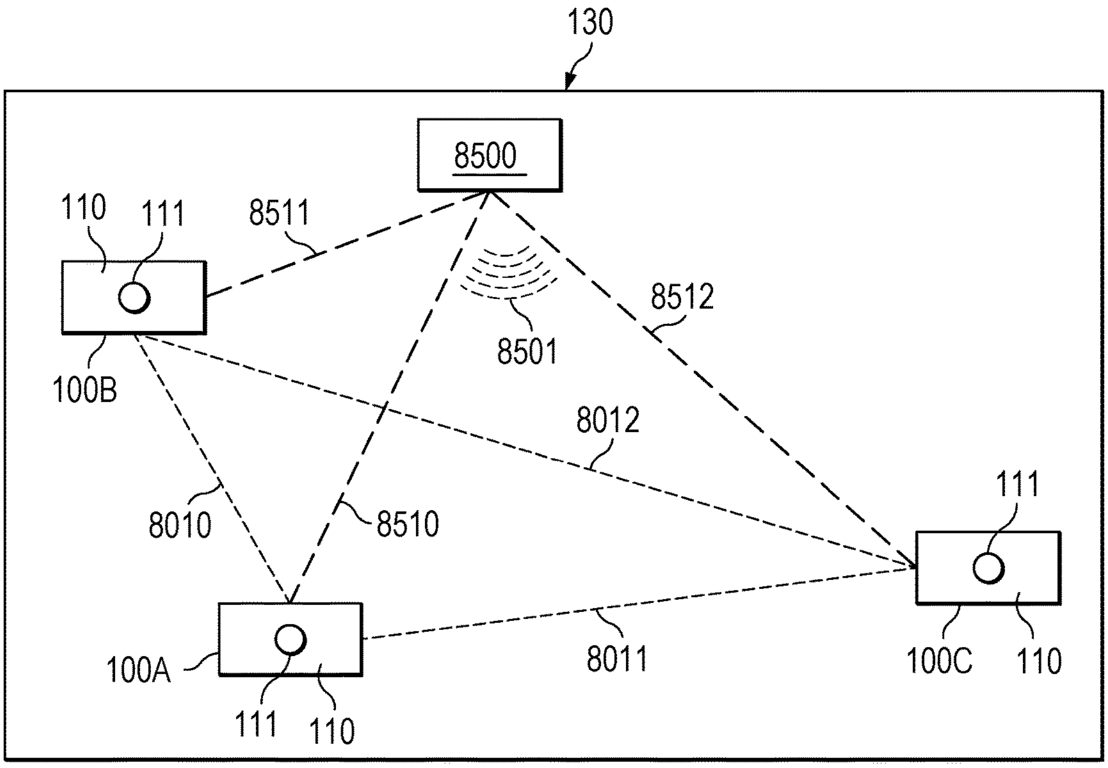
FIG. 31 shows another example of an audio environment.

FIG. 31 shows another example of an audio environment. In FIG. 31 an acoustic space 130 with multiple distributed orchestrated audio devices 100A, 100B and 100C participating in DSSS operations is shown. In this example, a noise source 8500 producing noise 8501 is also present. The elements of FIG. 31 are as follows:

130: An acoustic space;

100(A,B,C): A plurality of distributed orchestrated audio devices;

110: A plurality of loudspeakers;

111: A plurality of microphones;

8010: The distance between 100A and 100B;

8011: The distance between 100A and 100C;

8012: The distance between 100B and 100C;

8500: A noise source;

8501: A noise;

8510: The distance between 8500 and 100A;

8511: The distance between 8500 and 100B; and

8512: The distance between 8500 and 100C.

Figure 32A:
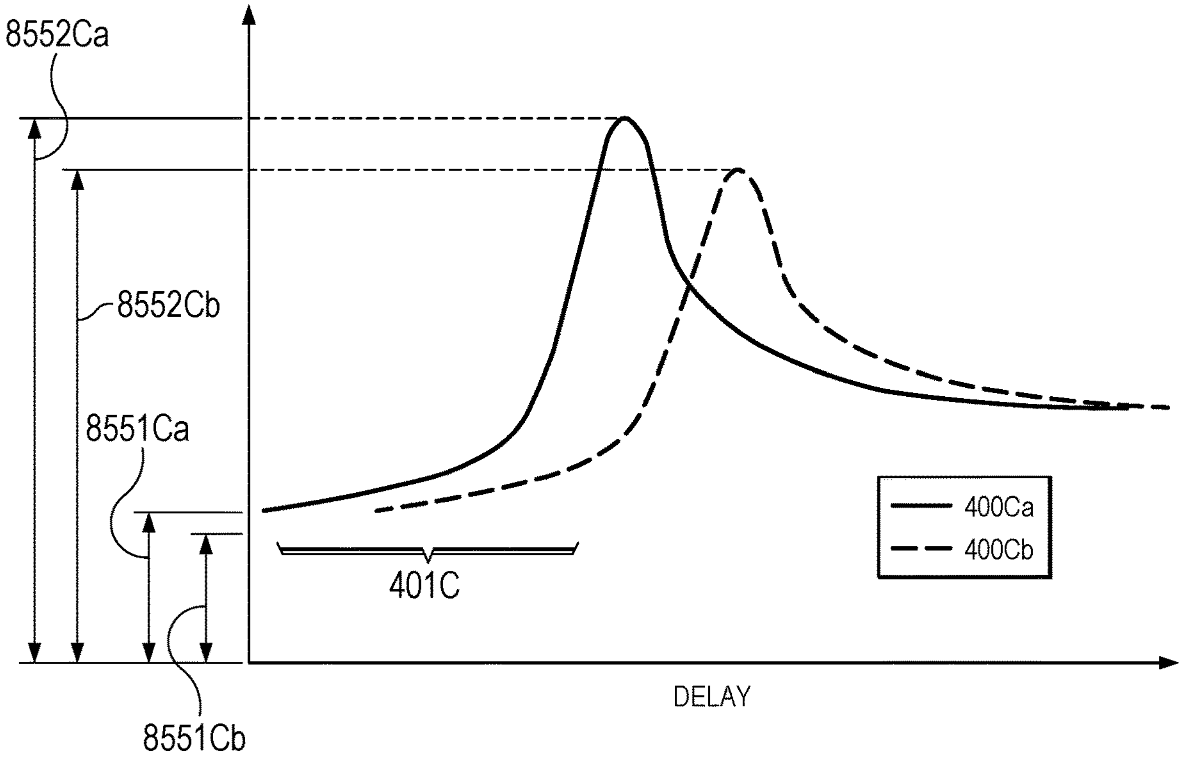
FIG. 32A shows examples of delay waveforms produced by audio device 100C of FIG. 31, based on acoustic DSSS signals received from audio devices 100A and 100B.

FIG. 32A shows examples of delay waveforms produced by audio device 100C of FIG. 31, based on acoustic DSSS signals received from audio devices 100A and 100B. The delay waveform corresponding to acoustic DSSS signals received from audio device 100A is labeled 400Ca and the delay waveform corresponding to acoustic DSSS signals received from audio device 100B is labeled 400Cb.

Figure 32B:
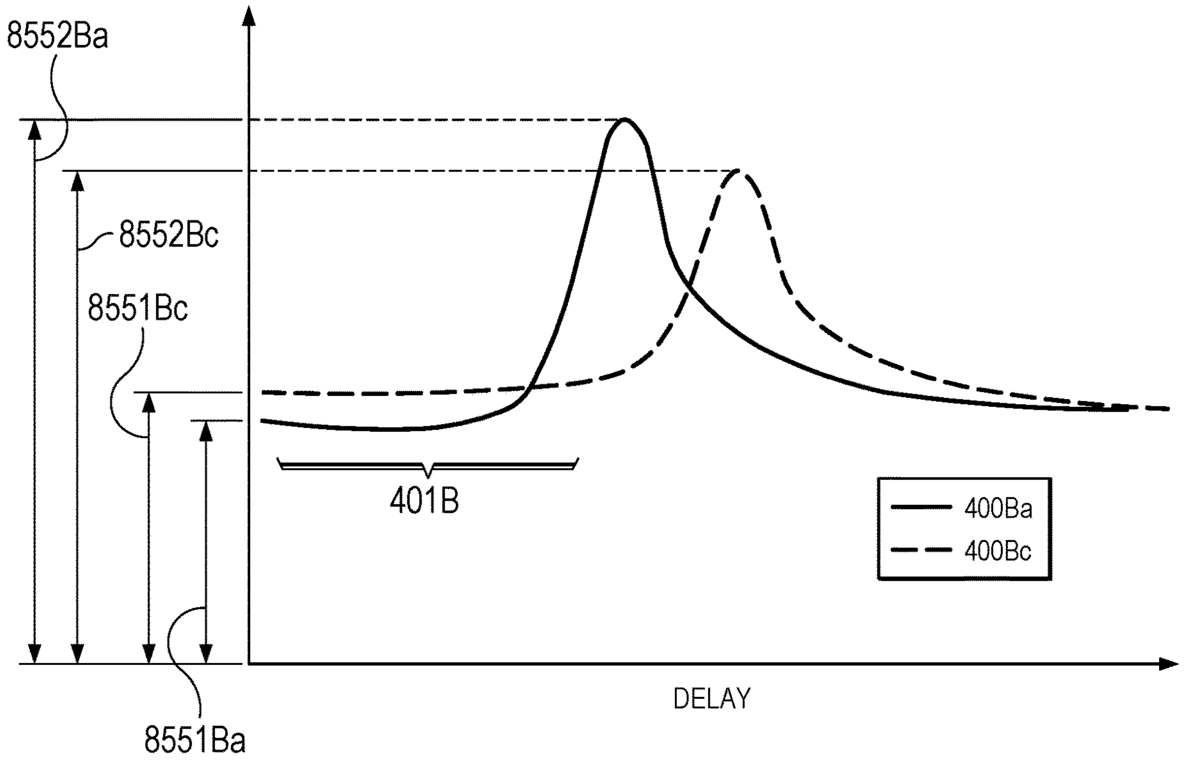
FIG. 32B shows examples of delay waveforms produced by audio device 100B of FIG. 31, based on acoustic DSSS signals received from audio devices 100A and 100C.

FIG. 32B shows examples of delay waveforms produced by audio device 100B of FIG. 31, based on acoustic DSSS signals received from audio devices 100A and 100C. The delay waveform corresponding to acoustic DSSS signals received from audio device 100A is labeled 400Ba and the delay waveform corresponding to acoustic DSSS signals received from audio device 100C is labeled 400Bc.

The elements of FIGS. 32A and 32B are as follows:

400Ca: delay waveform produced by device 100C corresponding to acoustic DSSS signals received from 100A;

400Cb: delay waveform produced by device 100C corresponding to acoustic DSSS signals received from 100B;

400Ba: delay waveform produced by device 100B corresponding to acoustic DSSS signals received from 100A;

400Bc: delay waveform produced by device 100B corresponding to acoustic DSSS signals received from 100C;

401C, 401B: Noise floor regions of the delay waveforms;

8552Ca: Signal power in delay waveform produced by 100C corresponding to acoustic DSSS signals received from 100A;

8552Cb: Signal power in delay waveform produced by 100C corresponding to acoustic DSSS signals received from 100B;

8552Ba: Signal power in delay waveform produced by 100B corresponding to acoustic DSSS signals received from 100A;

8552Bc: Signal power in delay waveform produced by 100B corresponding to acoustic DSSS signals received from 100C;

8551Ca: Noise power in delay waveform produced by 100C corresponding to acoustic DSSS signals received from 100A;

8551Cb: Noise power in delay waveform produced by 100C corresponding to acoustic DSSS signals received from 100B;

8551Ba: Noise power in delay waveform produced by 100B corresponding to acoustic DSSS signals received from 100A; and

8551Bc: Noise power in delay waveform produced by 100B corresponding to acoustic DSSS signals received from 100C.

Referring again to FIG. 31, in this example the distance 8511 between the audio device 100B and the noise source 8500 is shorter than the distance 8512 between the audio device 100C and the noise source 8500 and is also shorter than the distance 8510 between the audio device 100A and the noise source 8500. In this particular scenario, the relative proximity of the audio device 100B and the noise source 8500 causes the noise powers 8551Ba and 8551Bc in the signals 400Ba and 400Bc to be larger than the noise powers 8551Ca and 8551Cb in the signals 400Ca and 400Cb. Moreover, there is relatively more noise in the signal 400Bc than in the signal 400Ba. This suggests that the noise source 8500 is located closer to the path between audio devices 100B and 100C than to the path between audio devices 100B and 100A. In some implementations, one or more of the audio devices may include directional microphones or may be configured for receive-side beamforming. Such capabilities can provide further information regarding the DoA of sound from the noise source and, therefore, regarding the location of the noise source.

Accordingly, using the known or calculated positions of the audio devices, the known or calculated distances between the audio devices, the measured position of the noise source and the relative noise levels of delay waveforms produced by each audio device, in some examples a control system may be configured to produce a distributed noise estimate for the audio environment 130. Such a distributed noise estimate may be, or may be based on, a set of estimates of the noise measured by microphones on audio devices at different locations in an acoustic space. For example, one audio device may be located near a kitchen bench, another audio device may be located near a lounge chair and another audio device may be located near a door. Each of these devices would be more sensitive to the noise in its immediate vicinity, and the various locations in the acoustic space, and would be able to produce estimates of the noise distribution across the room as a group. Some such implementations may involve applying, by a control system, an assumed decay function based on the distances between the audio devices and the noise source. Some such examples may involve comparing, by the control system, calculated noise levels at each of the audio devices against the measured noise floors of the delay waveforms and/or against the differences between the measured noise floors of the delay waveforms (e.g., the difference in level or power between 8551Ca and 8551Cb).

Figure 33:
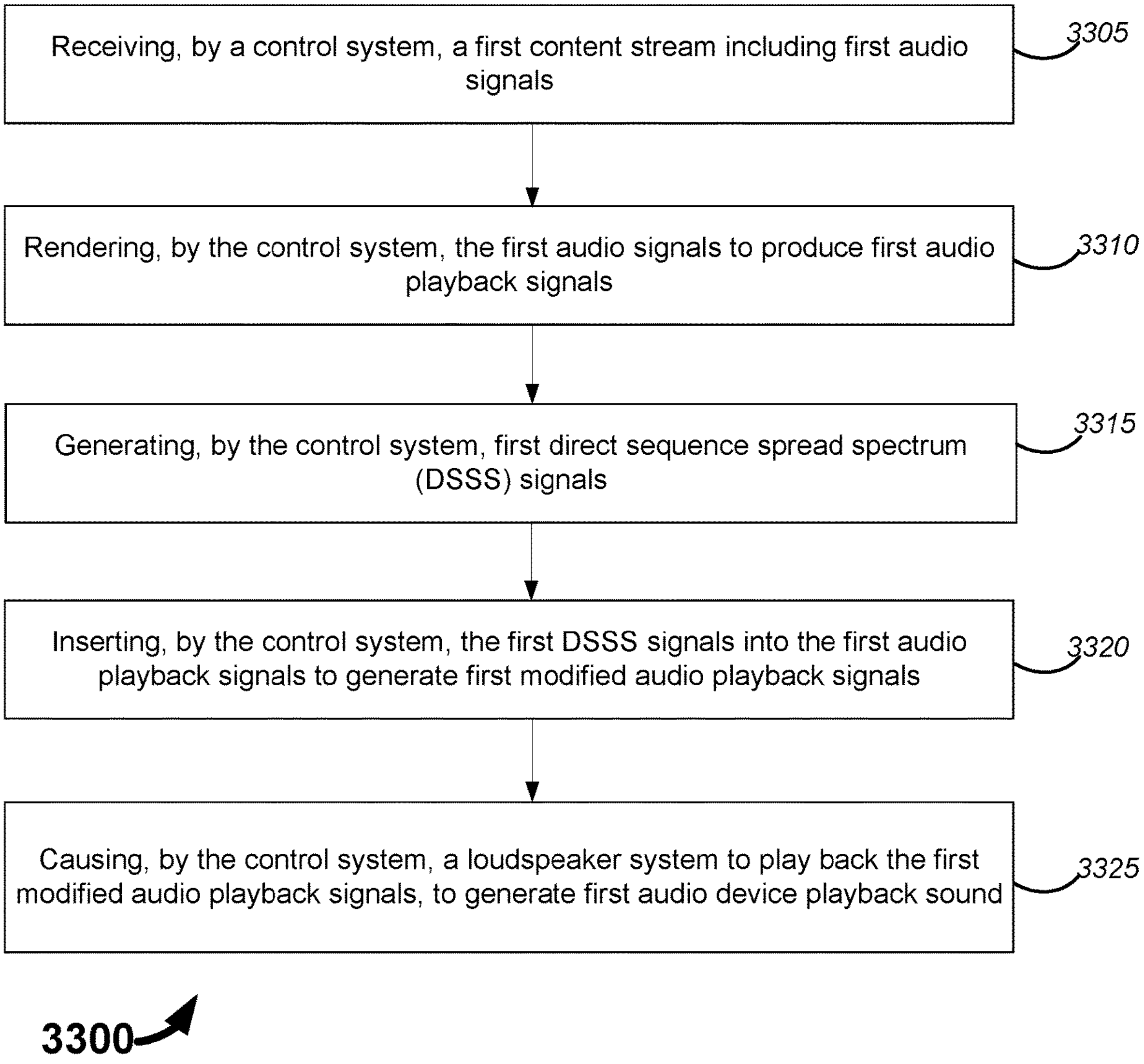
FIG. 33 is a flow diagram that outlines another example of a disclosed method.

FIG. 33 is a flow diagram that outlines another example of a disclosed method. The blocks of method 3300, like other methods described herein, are not necessarily performed in the order indicated. Moreover, such methods may include more or fewer blocks than shown and/or described. The method 3300 may be performed by an apparatus or system, such as the apparatus 150 that is shown in FIG. 1B and described above.

In this example, block 3305 involves receiving, by a control system, a first content stream including first audio signals. The content stream and the first audio signals may vary according to the particular implementation. In some instances, the content stream may correspond to a television program, a movie, to music, to a podcast, etc.

According to this example, block 3310 involves rendering, by the control system, the first audio signals to produce first audio playback signals. The first audio playback signals may be, or may include, loudspeaker feed signals for a loudspeaker system of an audio device.

In this example, block 3315 involves generating, by the control system, first direct sequence spread spectrum (DSSS) signals. According to this example, the first DSSS signals correspond to the signals referred to herein as acoustic DSSS signals. In some instances, the first DSSS signals may be generated by one or more DSSS signal generator modules, such as the DSSS signal generator 212A and the DSSS signal modulator 220A that are described above with reference to FIG. 2.

According to this example, block 3320 involves inserting, by the control system, the first DSSS signals into the first audio playback signals, to generate first modified audio playback signals. In some examples, block 3320 may be performed by the DSSS signal injector 211A that is described above with reference to FIG. 2.

In this example, block 3325 involves causing, by the control system, a loudspeaker system to play back the first modified audio playback signals, to generate first audio device playback sound. In some examples, block 3320 may involve the control system 160 of FIG. 2 to controlling the loudspeaker system 110A to play back the first modified audio playback signals, to generate the first audio device playback sound.

In some implementations, method 3300 may involve receiving, by the control system and from a microphone system, microphone signals corresponding to at least the first audio device playback sound and second audio device playback sound. The second audio device playback sound may correspond to second modified audio playback signals played back by a second audio device. In some examples, the second modified audio playback signals may include second DSSS signals generated by the second audio device. In some such examples, method 3300 may involve extracting, by the control system, at least the second DSSS signals from the microphone signals.

According to some implementations, method 3300 may involve receiving, by the control system and from the microphone system, microphone signals corresponding to at least the first audio device playback sound and to second through $N^{th}$ audio device playback sound. The second through $N^{th}$ audio device playback sound may correspond to second through $N^{th}$ modified audio playback signals played back by second through $N^{th}$ audio devices. In some instances, the second through $N^{th}$ modified audio playback signals may include second through $N^{th}$ DSSS signals. In some such examples, method 3300 may involve extracting, by the control system, at least the second through $N^{th}$ DSSS signals from the microphone signals.

In some implementations, method 3300 may involve estimating, by the control system, at least one acoustic scene metric based, at least in part, on the second through $N^{th}$ DSSS signals. In some examples, the acoustic scene metric (s) may be, or may include, a time of flight, a time of arrival, a range, an audio device audibility, an audio device impulse response, an angle between audio devices, an audio device location, audio environment noise and/or a signal-to-noise ratio. According to some examples, method 3300 may involve controlling, by the control system, one or more aspects of audio device playback based, at least in part, on the at least one acoustic scene metric and/or at least one audio device characteristic.

According to some examples, a first content stream component of the first audio device playback sound may cause perceptual masking of a first DSSS signal component of the first audio device playback sound. In some such examples, the first DSSS signal component may not be audible to a human being.

In some examples, method 3300 may involve determining, by the control system, one or more DSSS parameters for each audio device of a plurality of audio devices in the audio environment. The one or more DSSS parameters may be useable for generation of DSSS signals. Some such examples may involve providing, by the control system, the one or more DSSS parameters to each audio device of the plurality of audio devices.

In some implementations, determining the one or more DSSS parameters may involve scheduling a time slot for each audio device of the plurality of audio devices to play back modified audio playback signals. In some such examples, a first time slot for a first audio device may be different from a second time slot for a second audio device.

According to some examples, determining the one or more DSSS parameters may involve determining a frequency band for each audio device of the plurality of audio devices to play back modified audio playback signals. In some such examples, a first frequency band for a first audio device may be different from a second frequency band for a second audio device.

In some instances, determining the one or more DSSS parameters may involve determining a DSSS spreading code for each audio device of the plurality of audio devices. In some such examples, a first spreading code for a first audio device may be different from a second spreading code for a second audio device. In some examples, determining the one or more DSSS parameters may involve determining at least one spreading code length that is based, at least in part, on an audibility of a corresponding audio device. According to some examples, determining the one or more DSSS parameters may involve applying an acoustic model that is based, at least in part, mutual audibility of each of a plurality of audio devices in the audio environment.

In some examples, determining the one or more DSSS parameters may involve determining a current playback objective. Some such examples may involve applying an acoustic model that is based, at least in part, mutual audibility of each of a plurality of audio devices in the audio environment, to determine an estimated performance of DSSS signals in the audio environment. Some such examples may involve applying a perceptual model based on human sound perception, to determine a perceptual impact of DSSS signals in the audio environment. Some such examples may involve determining the one or more DSSS parameters based, at least in part, on the current playback objective, the estimated performance and/or the perceptual impact.

According to some examples, determining the one or more DSSS parameters may involve detecting a DSSS parameter change trigger and determining one or more new DSSS parameters corresponding to the DSSS parameter change trigger. Some such examples may involve providing the one or more new DSSS parameters to one or more audio devices of the audio environment.

In some instances, detecting the DSSS parameter change trigger may involve detecting one or more of the following: a new audio device in the audio environment; a change of an audio device location; a change of an audio device orientation; a change of an audio device setting; a change in a location of a person in the audio environment; a change in a type of audio content being reproduced in the audio environment; a change in background noise in the audio environment; an audio environment configuration change, including but not limited to a changed configuration of a door or window of the audio environment; a clock skew between two or more audio devices of the audio environment; a clock bias between two or more audio devices of the audio environment; a change in the mutual audibility between two or more audio devices of the audio environment; and/or a change in a playback objective.

In some examples, method 3300 may involve processing received microphone signals to produce preprocessed microphone signals. Some such examples may involve extracting DSSS signals from the preprocessed microphone signals. Processing the received microphone signals may, for example, involve beamforming, applying a bandpass filter and/or echo cancellation.

According to some implementations, extracting at least the second through $N^{th}$ DSSS signals from the microphone signals may involve applying a matched filter to the microphone signals or to a preprocessed version of the microphone signals, to produce second through $N^{th}$ delay waveforms. The second through $N^{th}$ delay waveforms may, for example, correspond to each of the second through $N^{th}$ DSSS signals. Some such examples may involve applying a low-pass filter to each of the second through $N^{th}$ delay waveforms.

In some examples, method 3300 may involve implementing, via the control system, a demodulator. Some such examples may involve applying the matched filter as part of a demodulation process performed by the demodulator. In some such examples, an output of the demodulation process may be a demodulated coherent baseband signal. Some examples may involve estimating, via the control system, a bulk delay and providing a bulk delay estimation to the demodulator.

In some examples, method 3300 may involve implementing, via the control system, a baseband processor configured for baseband processing of the demodulated coherent baseband signal. In some such examples, the baseband processor may be configured to output at least one estimated acoustic scene metric. In some examples, the baseband processing may involve producing an incoherently integrated delay waveform based on demodulated coherent baseband signals received during an incoherent integration period. In some such examples, producing the incoherently integrated delay waveform may involve squaring the demodulated coherent baseband signals received during the incoherent integration period, to produce squared demodulated baseband signals, and integrating the squared demodulated baseband signals. In some examples, the baseband processing may involve applying one or more of a leading edge estimating process, a steered response power estimating process or a signal-to-noise estimating process to the incoherently integrated delay waveform. Some examples may involve estimating, via the control system, a bulk delay and providing a bulk delay estimation to the baseband processor.

According to some examples, method 3300 may involve estimating, by the control system, second through $N^{th}$ noise power levels at second through $N^{th}$ audio device locations based on the second through $N^{th}$ delay waveforms. Some such examples may involve producing a distributed noise estimate for the audio environment based, at least in part, on the second through $N^{th}$ noise power levels.

In some examples, method 3300 may involve performing an asynchronous two-way ranging process for cancellation of an unknown clock bias between two asynchronous audio devices. The asynchronous two-way ranging process may, for example, be based on DSSS signals transmitted by each of the two asynchronous audio devices. Some such examples may involve performing the asynchronous two-way ranging process between each of a plurality of audio device pairs in the audio environment.

According to some examples, method 3300 may involve performing a clock bias estimation process for determining an estimated clock bias between two asynchronous audio devices. The clock bias estimation process may, for example, be based on DSSS signals transmitted by each of the two asynchronous audio devices. Some such examples may involve compensating for the estimated clock bias. Some implementations may involve performing the clock bias estimation process between each of a plurality of audio devices of the audio environment, to produce a plurality of estimated clock biases. Some such implementations may involve compensating for each estimated clock bias.

In some examples, method 3300 may involve performing a clock skew estimation process for determining an estimated clock skew between two asynchronous audio devices. The clock skew estimation process may, for example, be based on DSSS signals transmitted by each of the two asynchronous audio devices. Some such examples may involve compensating for the estimated clock skew. Some such examples may involve performing the clock skew estimation process between each of a plurality of audio device pairs of the audio environment, to produce a plurality of estimated clock skews. Some such examples may involve compensating for each estimated clock skew.

According to some examples, method 3300 may involve detecting a DSSS signal transmitted by an audio device. In some examples, the DSSS signal may correspond with a first spreading code. Some such examples may involve providing the audio device with a second spreading code for future transmissions. In some such examples, the first spreading code may be a first pseudo-random number sequence that is reserved for newly-activated audio devices.

In some examples, method 3300 may involve causing each of a plurality of audio devices in the audio environment to simultaneously play back modified audio playback signals.

In some examples, acoustic DSSS signals may be played back during one or more time intervals in which audio playback signals are not audible, which may be referred to herein as "silent intervals" or "silence." In some such examples, at least a portion of the first audio signals may correspond to silence.

Figure 34:
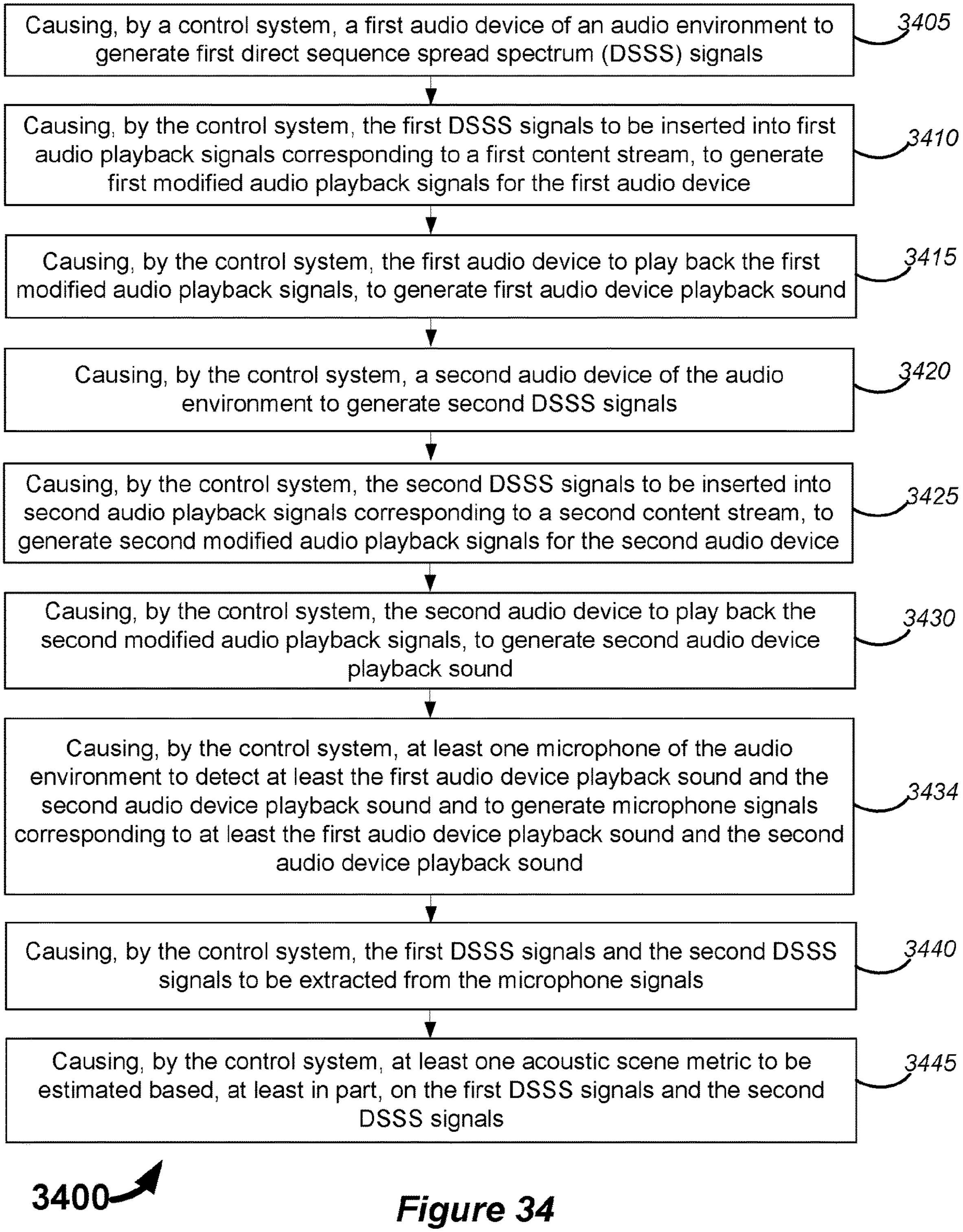
FIG. 34 is a flow diagram that outlines another example of a disclosed method.

FIG. 34 is a flow diagram that outlines another example of a disclosed method. The blocks of method 3400, like other methods described herein, are not necessarily performed in the order indicated. Moreover, such methods may include more or fewer blocks than shown and/or described. The method 3400 may be performed by an apparatus or system, such as the apparatus 150 that is shown in FIG. 1B and described above.

In some examples, the blocks of method 3400 may be performed by one or more devices within an audio environment, e.g., by an orchestrating device such as an audio system controller (e.g., what is referred to herein as a smart home hub) or by another component of an audio system, such as a smart speaker, a television, a television control module, a laptop computer, a mobile device (such as a cellular telephone), etc. In some implementations, the audio environment may include one or more rooms of a home environment. In other examples, the audio environment may be another type of environment, such as an office environment, an automobile environment, a train environment, a street or sidewalk environment, a park environment, etc. However, in alternative implementations at least some blocks of the method 3400 may be performed by a device that implements a cloud-based service, such as a server.

In this example, block 3405 involves causing, by a control system, a first audio device of an audio environment to generate first direct sequence spread spectrum (DSSS) signals. According to this example, the first DSSS signals correspond to the signals referred to herein as acoustic DSSS signals. In some instances, the first DSSS signals may be generated by one or more DSSS signal generator modules, such as the DSSS signal generator 212A and the DSSS signal modulator 220A that are described above with reference to FIG. 2, according to instructions received from an orchestrating device. Accordingly, the control system may be an orchestrating device control system. In some examples, the instructions may be received from an orchestrating module of an audio device, e.g., an orchestrating module of the first audio device.

According to this example, block 3410 involves causing, by the control system, the first DSSS signals to be inserted into first audio playback signals corresponding to a first content stream, to generate first modified audio playback signals for the first audio device. In some examples, block 3410 may be performed by the DSSS signal injector 211A that is described above with reference to FIG. 2, according to instructions received from an orchestrating device or an orchestrating module.

In this example, block 3415 involves causing, by the control system, the first audio device to play back the first modified audio playback signals, to generate first audio device playback sound. In some examples, block 3415 may involve the control system 160 of FIG. 2 controlling (according to instructions received from an orchestrating device or an orchestrating module) the loudspeaker system 110A to play back the first modified audio playback signals, to generate the first audio device playback sound.

In some implementations, blocks 3405, 3410 and 3415 may involve providing, by an orchestrating device or an orchestrating module, DSSS information (such as the DSSS information 205A that is described above with reference to FIG. 2) to the first audio device of the audio environment. As noted above, the DSSS information may include parameters to be used by a control system of the first audio device to generate DSSS signals, to modulate DSSS signals, to demodulate the DSSS signals, etc. The DSSS information may include one or more DSSS spreading code parameters and one or more DSSS carrier wave parameters, e.g., as described elsewhere herein.

According to this example, block 3420 involves causing, by the control system, a second audio device of the audio environment to generate second DSSS signals. In this implementation, block 3425 involves causing, by the control system, the second DSSS signals to be inserted into a second content stream to generate second modified audio playback signals for the second audio device. In this example, block 3430 involves causing, by the control system, the second audio device to play back the second modified audio playback signals, to generate second audio device playback sound. Blocks 3420-3430 may, for example, be performed in accordance with blocks 3405-3415. In some examples, 3420-3430 may be performed in parallel with blocks 3405-3415.

In this example, block 3435 involves causing, by the control system, at least one microphone of the audio environment to detect at least the first audio device playback sound and the second audio device playback sound and to generate microphone signals corresponding to at least the first audio device playback sound and the second audio device playback sound. The at least one microphone may be a component of one or more audio devices of the audio environment, such as the first audio device, the second audio device, another audio device (such as the orchestrating device), etc.

According to this example, block 3440 involves causing, by the control system, the first DSSS signals and the second DSSS signals to be extracted from the microphone signals. Block 3440 may, for example, be performed by one or more audio devices of the audio environment that include the at least one microphone referenced in block 3435.

In this example, block 3445 involves causing, by the control system, at least one acoustic scene metric to be estimated based, at least in part, on the first DSSS signals and the second DSSS signals. The at least one acoustic scene metric may, for example, include one or more of a time of flight, a time of arrival, a range, an audio device audibility, an audio device impulse response, an angle between audio devices, an audio device location, audio environment noise or a signal-to-noise ratio.

In some instances, causing the at least one acoustic scene metric to be estimated may involve estimating the at least one acoustic scene metric or causing another device to estimate at least one acoustic scene metric. In other words, the acoustic scene metric may be estimated by an orchestrating device or by another device of the audio environment.

In some implementations, method 3400 may involve controlling one or more aspects of audio device playback based, at least in part, on the at least one acoustic scene metric. For example, some implementations may involve controlling a noise compensation process based at least in part on one or more acoustic scene metrics. Some examples may involve controlling a rendering process and/or one or more audio device playback levels based at least in part on one or more acoustic scene metrics.

According to some implementations, the DSSS signal component of audio device playback sound may not be audible to a human being. In some instances, a first content stream component of the first audio device playback sound may cause perceptual masking of a first DSSS signal component of the first audio device playback sound. In some examples, a second content stream component of the second audio device playback sound may cause perceptual masking of a second DSSS signal component of the second audio device playback sound.

In some examples, method 3400 may involve causing, by a control system, third through $N^{th}$ audio devices of the audio environment to generate third through $N^{th}$ direct sequence spread spectrum (DSSS) signals. Some such examples may involve causing, by the control system, the third through $N^{th}$ DSSS signals to be inserted into third through $N^{th}$ content streams, to generate third through $N^{th}$ modified audio playback signals for the third through $N^{th}$ audio devices. Some such examples may involve causing, by the control system, the third through $N^{th}$ audio devices to play back a corresponding instance of the third through $N^{th}$ modified audio playback signals, to generate third through $N^{th}$ instances of audio device playback sound.

In some examples, method 3400 may involve causing each of a plurality of audio devices in the audio environment to simultaneously play back modified audio playback signals.

Some such examples may involve causing, by the control system, at least one microphone of each of the first through $N^{th}$ audio devices to detect first through $N^{th}$ instances of audio device playback sound and to generate microphone signals corresponding to the first through $N^{th}$ instances of audio device playback sound. In some such examples, the first through $N^{th}$ instances of audio device playback sound may include the first audio device playback sound, the second audio device playback sound and the third through $N^{th}$ instances of audio device playback sound. Some such examples may involve causing, by the control system, the first through $N^{th}$ DSSS signals to be extracted from the microphone signals, wherein the at least one acoustic scene metric is estimated based, at least in part, on first through $N^{th}$ DSSS signals.

In some examples, method 3400 may involve determining one or more DSSS parameters for a plurality of audio devices in the audio environment. The one or more DSSS parameters may be useable for generation of DSSS signals. Some such examples may involve providing the one or more DSSS parameters to each audio device of the plurality of audio devices. In some examples, determining the one or more DSSS parameters may involve scheduling a time slot for each audio device of the plurality of audio devices to play back modified audio playback signals. In some instances, a first time slot for a first audio device may be different from a second time slot for a second audio device.

According to some examples, determining the one or more DSSS parameters may involve determining a frequency band for each audio device of the plurality of audio devices to play back modified audio playback signals. In some instances, a first frequency band for a first audio device may be different from a second frequency band for a second audio device.

In some examples, determining the one or more DSSS parameters may involve determining a spreading code for each audio device of the plurality of audio devices. In some instances, a first spreading code for a first audio device may be different from a second spreading code for a second audio device. In some examples, determining the one or more DSSS parameters may involve determining at least one spreading code length that is based, at least in part, on an audibility of a corresponding audio device.

According to some examples, determining the one or more DSSS parameters may involve applying an acoustic model that is based, at least in part, on mutual audibility of each of a plurality of audio devices in the audio environment.

In some examples, determining the one or more DSSS parameters may involve determining a current playback objective. Some such examples may involve applying an acoustic model that is based, at least in part, mutual audibility of each of a plurality of audio devices in the audio environment, to determine an estimated performance of DSSS signals in the audio environment. Some such examples may involve applying a perceptual model based on human sound perception, to determine a perceptual impact of DSSS signals in the audio environment. Some such examples may involve determining the one or more DSSS parameters based, at least in part, on the current playback objective, the estimated performance and the perceptual impact.

According to some examples, determining the one or more DSSS parameters may involve detecting a DSSS parameter change trigger. Some such examples may involve determining one or more new DSSS parameters corresponding to the DSSS parameter change trigger. Some such examples may involve providing the one or more new DSSS parameters to one or more audio devices of the audio environment.

In some examples, detecting the DSSS parameter change trigger may involve detecting one or more of a new audio device in the audio environment, a change of an audio device location, a change of an audio device orientation, a change of an audio device setting, a change in a location of a person in the audio environment, a change in a type of audio content being reproduced in the audio environment, a change in background noise in the audio environment, an audio environment configuration change, including but not limited to a changed configuration of a door or window of the audio environment, a clock skew between two or more audio devices of the audio environment, a clock bias between two or more audio devices of the audio environment, a change in the mutual audibility between two or more audio devices of the audio environment, and/or a change in a playback objective.

According to some examples, method 3400 may involve processing received microphone signals to produce preprocessed microphone signals. In some such examples, DSSS signals may be extracted from the preprocessed microphone signals. In some such examples, processing the received microphone signals may involve one or more of beamforming, applying a bandpass filter or echo cancellation.

In some examples, causing at least the first DSSS signals and the second DSSS signals to be extracted from the microphone signals may involve applying a matched filter to the microphone signals or to a preprocessed version of the microphone signals, to produce delay waveforms. In some such examples, the delay waveforms may include at least a first delay waveform based on the first DSSS signals and a second delay waveform based on the second DSSS signals. Some examples may involve applying a low-pass filter to the delay waveforms.

According to some examples, applying the matched filter is part of a demodulation process. In some such examples, the demodulation process may be performed by the demodulator 214A that is described above with reference to FIG. 2, the demodulator 214 that is described above with reference to FIG. 17 or the demodulator 214 that is described above with reference to FIG. 18. According to some such examples, an output of the demodulation process may be a demodulated coherent baseband signal. Some examples may involve estimating a bulk delay and providing a bulk delay estimation to the demodulation process.

Some examples may involve performing baseband processing on the demodulated coherent baseband signal, e.g., by an instance of the baseband processor 218 that is disclosed herein. In some instances, the baseband processing may output at least one estimated acoustic scene metric. In some examples, the baseband processing may involve producing an incoherently integrated delay waveform based on demodulated coherent baseband signals received during an incoherent integration period. According to some such examples, producing the incoherently integrated delay waveform may involve squaring the demodulated coherent baseband signals received during the incoherent integration period, to produce squared demodulated baseband signals, and integrating the squared demodulated baseband signals. According to some implementations, the baseband processing may involve applying a leading edge estimating process, a steered response power estimating process and/or a signal-to-noise estimating process to the incoherently integrated delay waveform. Some examples may involve estimating a bulk delay and providing a bulk delay estimation to the baseband processing.

Some examples may involve estimating at least a first noise power level at a first audio device location and estimating a second noise power level at a second audio device location. In some such examples, estimating the first noise power level may be based on the first delay waveform and estimating the second noise power level may be based on the second delay waveform. Some such examples may involve producing a distributed noise estimate for the audio environment based, at least in part, on an estimated first noise power level and an estimated second noise power level.

In some examples, method 3400 may involve performing an asynchronous two-way ranging process for cancellation of an unknown clock bias between two asynchronous audio devices. In some instances, the asynchronous two-way ranging process may be based on DSSS signals transmitted by each of the two asynchronous audio devices. Some examples may involve performing the asynchronous two-way ranging process between each of a plurality of audio device pairs of the audio environment.

According to some examples, method 3400 may involve performing a clock bias estimation process for determining an estimated clock bias between two asynchronous audio devices. In some instances, the clock bias estimation process may be based on DSSS signals transmitted by each of the two asynchronous audio devices. Some such examples may involve compensating for the estimated clock bias. Some implementations may involve performing the clock bias estimation process between each of a plurality of audio devices of the audio environment, to produce a plurality of estimated clock biases. Some such examples may involve compensating for each estimated clock bias of the plurality of estimated clock biases.

In some examples, method 3400 may involve performing a clock skew estimation process for determining an estimated clock skew between two asynchronous audio devices. The clock skew estimation process may be based on DSSS signals transmitted by each of the two asynchronous audio devices. Some such examples may involve compensating for the estimated clock skew. Some examples may involve performing the clock skew estimation process between each of a plurality of audio devices of the audio environment, to produce a plurality of estimated clock skews. Some such examples may involve compensating for each estimated clock skew of the plurality of estimated clock skews.

According to some examples, method 3400 may involve detecting a DSSS signal transmitted by an audio device. In some instances, the DSSS signal may correspond with a first spreading code. Some such examples may involve providing the audio device with a second spreading code. In some examples, the first spreading code may be, or may include, a first pseudo-random number sequence that is reserved for newly-activated audio devices. In some examples, acoustic DSSS signals may be played back during one or more time intervals in which audio playback signals are not audible. In some such examples, at least a portion of the first audio playback signals, at least a portion of the second audio playback signals, or at least portions of each of the first audio playback signals and the second audio playback signals, correspond to silence.

Figure 35:
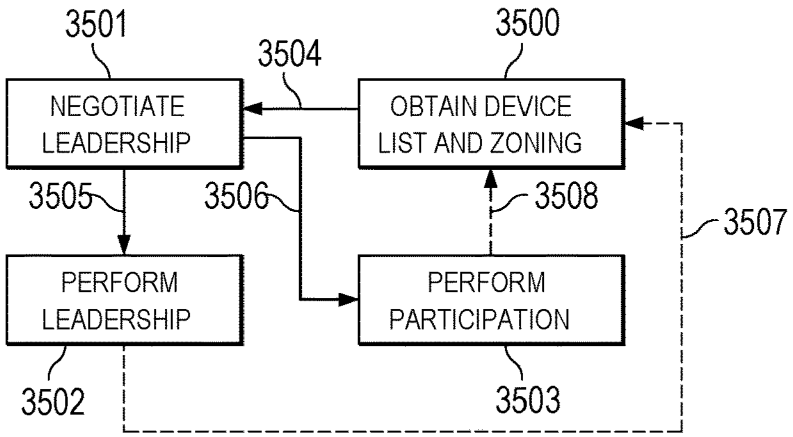
FIGS. 35, 36A and 36B are flow diagrams that show examples of how multiple audio devices coordinate measurement sessions according to some implementations.
Figure 36A:
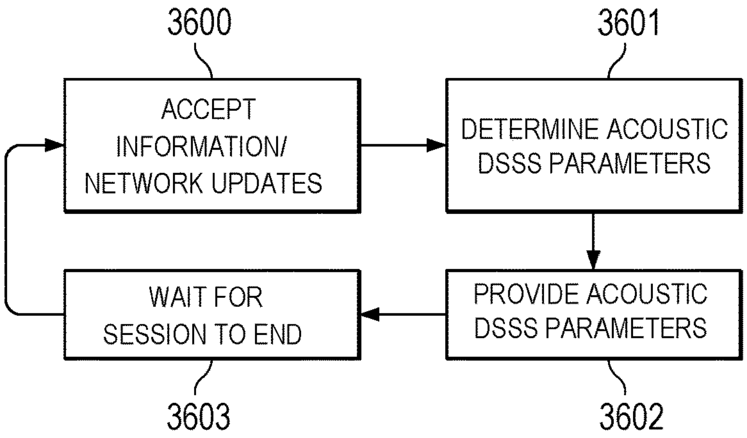
Figure 36B:
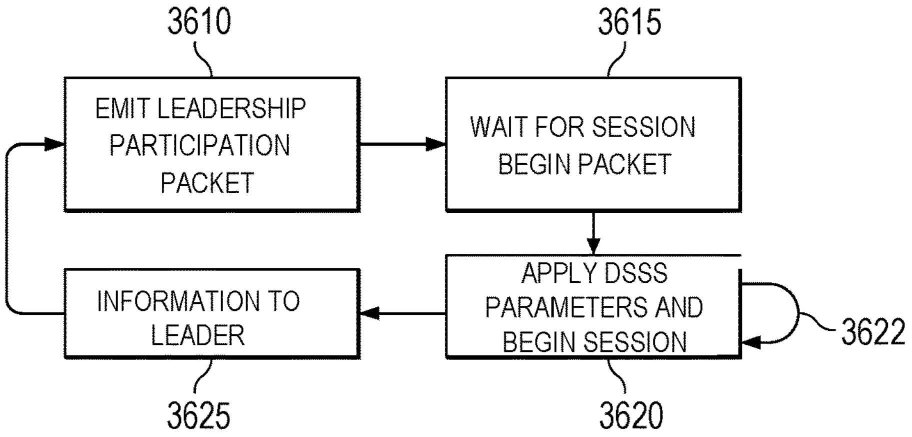

FIGS. 35, 36A and 36B are flow diagrams that show examples of how multiple audio devices coordinate measurement sessions according to some implementations. The blocks shown in FIGS. 35-36B, like those of other methods described herein, are not necessarily performed in the order indicated. For example, in some implementations the operations of block 3501 of FIG. 35 may be performed prior to the operations of block 3500. Moreover, such methods may include more or fewer blocks than shown and/or described.

According to these examples, a smart audio device is the orchestrating device (which also may be referred to herein as the "leader") and only one device may be the orchestrating device at one time. In other examples, the orchestrating device may be what is referred to herein as a smart home hub. The orchestrating device may be an instance of the apparatus 150 that is described above with reference to FIG. 1B.

FIG. 35 depicts blocks that are performed by all participating audio devices according this this example. In this example, block 3500 involves obtaining a list of all the other participating audio devices. The list of block 3500 may, for example, be created by aggregating information from the other audio devices via network packets: the other audio devices may, for example, broadcast their intention to participate in the measurement session. As audio devices are added and/or removed from the audio environment, the list of block 3500 may be updated. In some such examples, the list of block 3500 may be updated according to various heuristics in order to keep the list up to date regarding only the most important devices (e.g., the audio devices that are currently within the main living space 130 of FIG. 1A).

In the example shown in FIG. 35, the link 3504 indicates the passing of the list of block 3500 to block 3501, the negotiate leadership process. This negotiation process of block 3501 may take different forms, depending on the particular implementation. In the simplest embodiments, an alphanumeric sort for the lowest or highest device ID code (or other unique device identifier) may determine the leader without multiple communication rounds between devices, assuming all the devices can implement the same scheme. In more complex implementations, devices may negotiate with one another to determine which device is most suitable to be leader. For instance, it may be convenient for the device that aggregates orchestrated information to also be the leader for the purposes of facilitating the measurement sessions. The device with the highest uptime, the device with the greatest computational ability and/or a device connected to the main power supply may be good candidates for leadership. In general, arranging for such a consensus across multiple devices is a challenging problem, but a problem that has many existing and satisfactory protocols and solutions (for instance, the Paxos protocol). It will be understood that many such protocols exist and would be suitable.

According to this example, all participating audio devices then go on to perform block 3503, meaning that the link 3506 is an unconditional link in this example. Block 3503 is described below with reference to FIG. 36B. If a device is the leader, it will perform block 3502. In this example, the link 3505 involves a check for leadership. One example of the leadership process is described below with reference to FIG. 36A. The outputs from this leadership process, including but not limited to messages to the other audio devices, are indicated by link 3507 of FIG. 35.

FIG. 36A shows examples of processes performed by the orchestrating device or leader. Block 3601 involves determining acoustic DSSS parameters for each participating audio device. In some examples, block 3601 may involve determining one or more DSSS spreading code parameters and one or more DSSS carrier wave parameters. In some examples, block 3601 may involve determining a spreading code for each participating audio device. According to some such examples, a first spreading code for a first audio device may be different from a second spreading code for a second audio device. In some examples, block 3601 may involve determining a spreading code length that is based, at least in part, on an audibility of a corresponding audio device. According to some examples, block 3601 may be based, at least in part, on a current playback objective. In some examples, block 3601 may be based, at least in part, on whether a DSSS parameter change trigger has been detected.

According to this example, after the orchestrating device has determined acoustic DSSS parameters in block 3601, the process of FIG. 36A continues to block 3602. In this example, block 3602 involves sending the acoustic DSSS parameters determined in block 3601 to the other participating audio devices. In some examples, block 3602 may involve sending the acoustic DSSS parameters to the other participating audio devices via wireless communication, e.g., over a local Wi-Fi network, via Bluetooth, etc. In some examples, block 3602 may involve sending a "session begin" indication, e.g., as described below with reference to FIG. 36B. In some examples, the participating audio devices update their acoustic DSSS parameters in block 502.

According to this example, after block 3602, the process of FIG. 36A continues to block 3603, wherein the orchestrating device waits for the current measurement session to end. In this example, in block 3603 the orchestrating device waits for confirmations that all of the other participating audio devices have ended their sessions. In other examples, block 503 may involve waiting a predetermined period of time. In some instances, block 503 may involve waiting for a DSSS parameter change trigger to be detected.

In this example, after block 3603, the process of FIG. 36A continues to block 3600, wherein the orchestrating device is provided information about the measurement session. Such information may influence the selection and timing of future measurement sessions. In some embodiments, block 3600 involves accepting measurements that were obtained during the measurement session from all of the other participating audio devices. The type of received measurements may depend on the particular implementation. According to some examples, the received measurements may be, or may include, microphone signals. Alternatively, or additionally, in some examples the received measurements may be, or may include, audio data extracted from the microphone signals. In some implementations, the orchestrating device may perform (or cause to be performed) one or more operations on the measurements received. For example, the orchestrating device may estimate (or cause to be estimated) a target audio device audibility or a target audio device position based, at least in part, on the extracted audio data. Some implementations may involve estimating a far-field audio environment impulse response and/or audio environment noise based, at least in part, on the extracted audio data.

In the example shown in FIG. 36A, the process will revert to block 3601 after block 3600 is performed. In some such examples, the process will revert to block 3601 a predetermined period of time after block 3600 is performed. In some instances, the process may revert to block 3601 in response to user input. In some instances, the process may revert to block 3601 after a DSSS parameter change trigger has been detected.

FIG. 36B shows examples of processes performed by participating audio devices other than the orchestrating device. Here, block 3610 involves each of the other participating audio devices sending a transmission (e.g., a network packet) to the orchestrating device, signalling each device's intention to participate in one or more measurement sessions. In some embodiments, block 3610 also may involve sending the results of one or more previous measurement sessions to the leader.

In this example, block 3615 follows block 3610. According to this example, block 3615 involves waiting for notification that a new measurement session will begin, e.g., as indicated via a "session begin" packet.

According to this example, block 3620 involves applying DSSS parameters according to information provided by the orchestrating device, e.g., along with a "session begin" packet that was awaited in block 3615. In this example, block 3620 involves applying the DSSS parameters to generate modified audio playback signals that will be played back by participating audio devices during the measurement session. According to this example, block 3620 involves detect audio device playback sound via audio device microphones and generating corresponding microphone signals during the measurement session. As suggested by the link 3622, in some instances block 3620 may be repeated until all measurement sessions indicated by the orchestrating device are complete (e.g., according to a "stop" indication (for example, a stop packet) received from the orchestrating device, or after a predetermined duration of time). In some instances, block 3620 may be repeated for each of a plurality of target audio devices.

Finally, block 3625 involves providing information obtained during the measurement session to the orchestrating device. In this example, after block 3625 the process of FIG. 36B reverts back to block 3610. In some such examples, the process will revert to block 3610 a predetermined period of time after block 3625 is performed. In some instances, the process may revert to block 3610 in response to user input.

Some aspects of present disclosure include a system or device configured (e.g., programmed) to perform one or more examples of the disclosed methods, and a tangible computer readable medium (e.g., a disc) which stores code for implementing one or more examples of the disclosed methods or steps thereof. For example, some disclosed systems can be or include a programmable general purpose processor, digital signal processor, or microprocessor, programmed with software or firmware and/or otherwise configured to perform any of a variety of operations on data, including an embodiment of disclosed methods or steps thereof. Such a general purpose processor may be or include a computer system including an input device, a memory, and a processing subsystem that is programmed (and/or otherwise configured) to perform one or more examples of the disclosed methods (or steps thereof) in response to data asserted thereto.

Some embodiments may be implemented as a configurable (e.g., programmable) digital signal processor (DSP) that is configured (e.g., programmed and otherwise configured) to perform required processing on audio signal(s), including performance of one or more examples of the disclosed methods. Alternatively, embodiments of the disclosed systems (or elements thereof) may be implemented as a general purpose processor (e.g., a personal computer (PC) or other computer system or microprocessor, which may include an input device and a memory) which is programmed with software or firmware and/or otherwise configured to perform any of a variety of operations including one or more examples of the disclosed methods. Alternatively, elements of some embodiments of the inventive system may be implemented as a general purpose processor or DSP configured (e.g., programmed) to perform one or more examples of the disclosed methods, and the system also includes other elements (e.g., one or more loudspeakers and/or one or more microphones). A general purpose processor configured to perform one or more examples of the disclosed methods may be coupled to an input device (e.g., a mouse and/or a keyboard), a memory, and a display device.

Another aspect of present disclosure is a computer readable medium (for example, a disc or other tangible storage medium) which stores code for performing (e.g., coder executable to perform) one or more examples of the disclosed methods or steps thereof.

While specific embodiments of the present disclosure and applications of the disclosure have been described herein, it will be apparent to those of ordinary skill in the art that many variations on the embodiments and applications described herein are possible without departing from the scope of the disclosure described and claimed herein. It should be understood that while certain forms of the disclosure have been shown and described, the disclosure is not to be limited to the specific embodiments described and shown or the specific methods described.

The invention claimed is:

1. An audio processing method, comprising:

causing, by a control system, a first audio device of an audio environment to generate first direct sequence spread spectrum (DSSS) signals;

causing, by the control system, the first DSSS signals to be inserted into first audio playback signals corresponding to a first content stream, to generate first modified audio playback signals for the first audio device;

causing, by the control system, the first audio device to play back the first modified audio playback signals, to generate first audio device playback sound;

causing, by the control system, a second audio device of the audio environment to generate second DSSS signals;

causing, by the control system, the second DSSS signals to be inserted into a second content stream to generate second modified audio playback signals for the second audio device;

causing, by the control system, the second audio device to play back the second modified audio playback signals, to generate second audio device playback sound;

causing, by the control system, at least one microphone of the audio environment to detect at least the first audio device playback sound and the second audio device playback sound and to generate microphone signals corresponding to at least the first audio device playback sound and the second audio device playback sound;

causing, by the control system, the first DSSS signals and the second DSSS signals to be extracted from the microphone signals;

causing, by the control system, at least one acoustic scene metric to be estimated based, at least in part, on the first DSSS signals and the second DSSS signals; and controlling one or more aspects of audio device playback based, at least in part, on the at least one acoustic scene metric.

2. The audio processing method of claim 1, wherein the at least one acoustic scene metric includes one or more of a time of flight, a time of arrival, a range, an audio device audibility, an audio device impulse response, an angle between audio devices, an audio device location, audio environment noise or a signal-to-noise ratio.

3. The audio processing method of claim 1, wherein causing the at least one acoustic scene metric to be estimated involves estimating the at least one acoustic scene metric or causing another device to estimate at least one acoustic scene metric.

4. The audio processing method of claim 1, wherein a first content stream component of the first audio device playback sound causes perceptual masking of a first DSSS signal component of the first audio device playback sound.

5. The audio processing method of claim 1, wherein a second content stream component of the second audio device playback sound causes perceptual masking of a second DSSS signal component of the second audio device playback sound.

6. The audio processing method of claim 1, wherein the control system is an orchestrating device control system.

7. The audio processing method of claim 1, further comprising:

causing, by a control system, third through $N^{th}$ audio devices of the audio environment to generate third through $N^{th}$ direct sequence spread spectrum (DSSS) signals;

causing, by the control system, the third through $N^{th}$ DSSS signals to be inserted into third through $N^{th}$ content streams, to generate third through $N^{th}$ modified audio playback signals for the third through $N^{th}$ audio devices; and causing, by the control system, the third through $N^{th}$ audio devices to play back a corresponding instance of the third through $N^{th}$ modified audio playback signals, to generate third through $N^{th}$ instances of audio device playback sound.

8. The audio processing method of claim 7, further comprising:

causing, by the control system, at least one microphone of each of the first through $N^{th}$ audio devices to detect first through $N^{th}$ instances of audio device playback sound and to generate microphone signals corresponding to the first through $N^{th}$ instances of audio device playback sound, the first through $N^{th}$ instances of audio device playback sound including the first audio device playback sound, the second audio device playback sound and the third through $N^{th}$ instances of audio device playback sound; and causing, by the control system, the first through $N^{th}$ DSSS signals to be extracted from the microphone signals, wherein the at least one acoustic scene metric is estimated based, at least in part, on first through $N^{th}$ DSSS signals.

9. The audio processing method of claim 1, further comprising:

determining one or more DSSS parameters for a plurality of audio devices in the audio environment, the one or more DSSS parameters being useable for generation of DSSS signals; and providing the one or more DSSS parameters to each audio device of the plurality of audio devices.

10. The audio processing method of claim 9, wherein determining the one or more DSSS parameters involves scheduling a time slot for each audio device of the plurality of audio devices to play back modified audio playback signals, wherein a first time slot for a first audio device is different from a second time slot for a second audio device.

11. The audio processing method of claim 9, wherein determining the one or more DSSS parameters involves determining a frequency band for each audio device of the plurality of audio devices to play back modified audio playback signals.

12. The audio processing method of claim 11, wherein a first frequency band for a first audio device is different from a second frequency band for a second audio device.

13. The audio processing method of claim 9, wherein determining the one or more DSSS parameters involves determining a spreading code for each audio device of the plurality of audio devices.

14. The audio processing method of claim 13, wherein a first spreading code for a first audio device is different from a second spreading code for a second audio device.

15. The audio processing method of claim 13, further comprising determining at least one spreading code length that is based, at least in part, on an audibility of a corresponding audio device.

16. The audio processing method of claim 9, wherein determining the one or more DSSS parameters involves applying an acoustic model that is based, at least in part, on mutual audibility of each of a plurality of audio devices in the audio environment, wherein mutual audibility is a measure of how well the acoustic DSSS signals from other audio devices can be detected by microphone systems from each of the plurality of audio devices in the audio environment.

17. The audio processing method of claim 9, wherein determining the one or more DSSS parameters involves:

determining a current playback objective;

applying an acoustic model that is based, at least in part, mutual audibility of each of a plurality of audio devices in the audio environment, to determine an estimated performance of DSSS signals in the audio environment, wherein mutual audibility is a measure of how well the acoustic DSSS signals from other audio devices can be detected by microphone systems from each of the plurality of audio devices in the audio environment;

applying a perceptual model based on human sound perception, to determine a perceptual impact of DSSS signals in the audio environment; and determining the one or more DSSS parameters based, at least in part, on the current playback objective, the estimated performance and the perceptual impact.

18. The audio processing method of any claim 9, wherein determining the one or more DSSS parameters involves:

detecting a DSSS parameter change trigger;

determining one or more new DSSS parameters corresponding to the DSSS parameter change trigger; and providing the one or more new DSSS parameters to one or more audio devices of the audio environment.

19. An apparatus, comprising:

an interface system; and a control system configured to:

cause a first audio device of an audio environment to generate first direct sequence spread spectrum (DSSS) signals;

cause the first DSSS signals to be inserted into first audio playback signals corresponding to a first content stream, to generate first modified audio playback signals for the first audio device;

cause the first audio device to play back the first modified audio playback signals, to generate first audio device playback sound;

cause a second audio device of the audio environment to generate second DSSS signals;

cause the second DSSS signals to be inserted into a second content stream, to generate second modified audio playback signals for the second audio device;

cause the second audio device to play back the second modified audio playback signals, to generate second audio device playback sound;

cause at least one microphone of the audio environment to detect at least the first audio device playback sound and the second audio device playback sound and to generate microphone signals corresponding to at least the first audio device playback sound and the second audio device playback sound;

receive, via the interface system, the microphone signals;

cause the first DSSS signals and the second DSSS signals to be extracted from the microphone signals;

cause at least one acoustic scene metric to be estimated based, at least in part, on the first DSSS signals and the second DSSS signals; and control one or more aspects of audio device playback based, at least in part, on the at least one acoustic scene metric.

20. A system that includes the apparatus of claim 19, wherein the system includes one or more of the at least one microphone, the first audio device or the second audio device.

21. One or more non-transitory media having software stored thereon, the software including instructions for controlling one or more devices to perform a method comprising:

causing, by a control system, a first audio device of an audio environment to generate first direct sequence spread spectrum (DSSS) signals;

causing, by the control system, the first DSSS signals to be inserted into first audio playback signals corresponding to a first content stream, to generate first modified audio playback signals for the first audio device;

causing, by the control system, the first audio device to play back the first modified audio playback signals, to generate first audio device playback sound;

causing, by the control system, a second audio device of the audio environment to generate second DSSS signals;

causing, by the control system, the second DSSS signals to be inserted into a second content stream to generate second modified audio playback signals for the second audio device;

causing, by the control system, the second audio device to play back the second modified audio playback signals, to generate second audio device playback sound;

causing, by the control system, at least one microphone of the audio environment to detect at least the first audio device playback sound and the second audio device playback sound and to generate microphone signals corresponding to at least the first audio device playback sound and the second audio device playback sound;

causing, by the control system, the first DSSS signals and the second DSSS signals to be extracted from the microphone signals;

causing, by the control system, at least one acoustic scene metric to be estimated based, at least in part, on the first DSSS signals and the second DSSS signals; and controlling one or more aspects of audio device playback based, at least in part, on the at least one acoustic scene metric.

* * * * *